(12) United States Patent
Hashimoto et al.

(10) Patent No.: US 7,962,001 B2
(45) Date of Patent: Jun. 14, 2011

(54) CONTENT REPRODUCTION APPARATUS

(75) Inventors: Satoshi Hashimoto, New Jersey, NJ (US); Germano Leichsenring, Osaka (JP)

(73) Assignee: Panasonic Corporation, Osaka (JP)

( * ) Notice: Subject to any disclaimer, the term of this patent is extended or adjusted under 35 U.S.C. 154(b) by 1354 days.

(21) Appl. No.: 11/383,816

(22) Filed: May 17, 2006

(65) Prior Publication Data

US 2006/0269221 A1 Nov. 30, 2006

Related U.S. Application Data

(60) Provisional application No. 60/681,974, filed on May 18, 2005.

(51) Int. Cl.
*H04N 5/931* (2006.01)
*H04N 5/932* (2006.01)
*H04N 9/80* (2006.01)
*H04N 5/783* (2006.01)
*H04N 5/93* (2006.01)

(52) U.S. Cl. ........ 386/205; 386/206; 386/221; 386/222; 386/239; 386/343; 386/344; 386/350; 386/351; 386/352

(58) Field of Classification Search ............... 386/1, 46, 386/52–55, 111–112, 48, 68, 95, 123–126, 386/205, 206, 221, 222, 239, 343, 344, 350, 386/351, 352; 725/35, 46, 60, 30, 58, 88, 725/133, 141, 153
See application file for complete search history.

(56) References Cited

U.S. PATENT DOCUMENTS

| 6,092,107 | A | 7/2000 | Eleftheriadis et al. |
| 2002/0174430 | A1* | 11/2002 | Ellis et al. ...................... 725/46 |
| 2004/0067043 | A1 | 4/2004 | Duruoz et al. |
| 2004/0210949 | A1 | 10/2004 | Sugiura et al. |
| 2005/0100321 | A1 | 5/2005 | Koudo et al. |
| 2006/0078296 | A1 | 4/2006 | Takao |

FOREIGN PATENT DOCUMENTS

| JP | 2003-513555 | 4/2003 |
| WO | 01/33847 | 5/2001 |

(Continued)

OTHER PUBLICATIONS

U.S. Appl. No. 11/420,639 to Horii, which filed on May 26, 2006.

(Continued)

*Primary Examiner* — Thai Tran
*Assistant Examiner* — Daquan Zhao
(74) *Attorney, Agent, or Firm* — Greenblum & Bernstein, P.L.C.

(57) ABSTRACT

In conventional technology, when a program which operates in synchronization with reproduction of video and audio instructs a trick play of video and audio such as fast-forward and rewind, the trick play of the video and audio continues even after the program is terminated. This makes it impossible to cancel a redundant trick play which continues for an interval of time which is not expected by the program. In the present invention, a program which instructs a trick play of video and audio is retained, and when the program is terminated, it is determined whether or not the program has instructed the trick play, and if that program has instructed the trick play, the trick play of the video and audio is cancelled. As a result, it is possible to cancel such a redundant trick play which would otherwise continue for some interval of time which is not expected by the program.

6 Claims, 44 Drawing Sheets

FOREIGN PATENT DOCUMENTS

WO     WO 01/33847     *    5/2001

OTHER PUBLICATIONS

U.S. Appl. No. 11/421,146 to Horii, which filed on May 31, 2006.
U.S. Appl. No. 11/421,126 to Hashimoto et al., which filed May 31, 2006.
U.S. Appl. No. 10/596,107 to Hashimoto et al., which filed May 31, 2006.
U.S. Appl. No. 11/349,955 to Horii et al., which was filed on Feb. 9, 2006.
U.S. Appl. No. 11/421,145 to Suzuki et al., which was filed May 31, 2006.
U.S. Appl. No. 11/425,727 to Horii et al., which was filed on Jun. 22. 2006.
U.S. Appl. No. 11/420,982 to Kawakami et al., which was May 30, 2006.
ETSI ES 201 812 v1.1.1 (Dec. 2003), Digital Video Broadcasting (DVB); Multimedia Home Platform (MHP) Specification 1.0.3.
OpenCable Application Platform Specification, OCAP 1.0 Profile, OC-SP-OCAP 1.0-I14-050119.
OpenCable Application Platform Specification, OCAP Digital Video Recorder (DVR), OC-SP-. OCAP-DVR-I01-040524.
OpenCable Application Platform Specification, OCAP Digital Video Recorder (DVR), OC-SP-. OCAP-DVR-I02-040524.

* cited by examiner

FIG. 2

| Frequency Band | Application | Modulation Type |
|---|---|---|
| 5~130MHz | Out Of Band (OOB) Data exchange between broadcast station side system and terminal | QPSK |
| 130~864MHz | In-band Normal television broadcast that includes video/audio | QAM |

FIG. 3

| Frequency Band | Application |
|---|---|
| 70~74MHz | Sending data from broadcast station side system 101 to terminal apparatuses |
| 10.0~10.1MHz | Sending data from terminal apparatus A111 to broadcast station side system 101 |
| 10.1~10.2MHz | Sending data from terminal apparatus B112 to broadcast station side system 101 |
| 10.2~10.3MHz | Sending data from terminal apparatus C113 to broadcast station side system 101 |

FIG. 4

| Frequency Band | Application |
|---|---|
| 150~156MHz | TV channel 1 |
| 156~162MHz | TV channel 2 |
| ⋮ | ⋮ |
| 310~311MHz | Radio Channel 1 |
| ⋮ | ⋮ |

FIG. 9

```
        901         900           902
         ┌───────┬───────────────┐
         │Header │    Payload    │
         └───────┴───────────────┘
         ←8 Bytes→
```

903
| | |
|---|---|
| table_id | 8bit |
| section_syntax_indicator | 1bit |
| private_indicator | 1bit |
| reserved | 2bit |
| private_section_length | 12bit |
| table_id_extension | 16bit |
| reserved | 2bit |
| version_number | 5bit |
| current_next_indicator | 1bit |
| section_number | 8bit |
| last_section_number | 8bit |

FIG. 10

| PID (1001) | table_id (1002) | Details of data sent by MPEG-2 section (1003) |
|---|---|---|
| 16 | 64 | Demodulation information of TS |
| 18 | 66 | Information regarding service |
| 20 | 95 | Information regarding TV show |

| | | | | |
|---|---|---|---|---|
| Program Number | | | 101 | 1100 |
| E S | Audio | 5011 | | 1111 |
| | Video | 5012 | | 1112 |
| | Data | 5013 | AIT | 1113 |
| | Data | 5014 | DSMCC[1] | 1114 |
| | Data | 5015 | DSMCC[2] | 1115 |

| | | | |
|---|---|---|---|
| transport_stream_id | | 1000 | 1200 |
| Program | 101 | 501 | 1211 |
| | 102 | 502 | 1212 |
| | 103 | 503 | 1213 |

Record Information Management Table

| 2101 Record Identifier | 2102 Channel Identifier | 2103 Program Number | 2104 Start Time | 2105 End Time | 2106 Media Identifier |
|---|---|---|---|---|---|
| 2111 → 000 | 2 | 102 | 2005/03/30 11:00 | 2005/03/30 12:00 | TS_001 |
| 2112 → 001 | 4 | 104 | 2005/04/01 21:00 | 2005/04/01 23:00 | TS_002 |

FIG. 28

| AIT Version 2 | | | | |
|---|---|---|---|---|
| 301 | autostart | 1 | /a/TopXlet | true |
| 302 | present | 1 | /b/GameXlet | false |
| 303 | kill | 2 | /z/StudyXlet | false |
| 304 | destroy | 1 | /b/MusicXlet | false |

2200
2811
2812
2813
2814

2201 Java Program Identifier
2202 Control Information
2203 DSMCC Identifier
2204 Program Name
2805 Trick Play Compliant Flag

FIG. 29

| 2200 | AIT Version 2 | | | |
|---|---|---|---|---|
| 2911 | 301 | autostart | 1 | /a/TopXlet | false |
| 2912 | 302 | present | 1 | /b/GameXlet | false |
| 2913 | 303 | kill | 2 | /z/StudyXlet | false |
| 2914 | 304 | destroy | 1 | /b/MusicXlet | false |

2201 Java Program Identifier
2202 Control Information
2203 DSMCC Identifier
2204 Program Name
2805 Trick Play Compliant Flag

FIG. 47

| AIT Version 1 | | | |
|---|---|---|---|
| 301 | autostart | 1 | /a/TopXlet | false |
| 302 | autostart | 1 | /b/GameXlet | true |

2200
4711
4712

2201 Java Program Identifier
2202 Control Information
2203 DSMCC Identifier
2204 Program Name
4705 Trick Play Control Flag

CONTENT REPRODUCTION APPARATUS

CROSS REFERENCE TO RELATED APPLICATION

This application claims the benefit of U.S. Provisional Application No. 60/681,974, filed May 15, 2005, the contents of which are herein incorporated by reference in its entirety.

BACKGROUND OF THE INVENTION (1) Field of the Invention

The present invention relates to a recording and reproduction apparatus that is a content reproduction apparatus which accumulates contents and reproduces the accumulated contents. In particular, the present invention relates to a setup for receiving a broadcast wave including content made up of video and audio as well as data such as a program that are multiplexed into the broadcast wave in synchronization with each other and transmitted, and for accumulating the video, audio and data, as well as a setup for executing trick play such as fast-forward and rewind of the content while maintaining synchronization between the video and audio and the data such as a program.

(2) Description of the Related Art

Various contents are included in a broadcast wave sent from a broadcast station. Aside from video and audio used in a normal TV show, there are cases where data is included in the contents. There are several methods for sending the data, which can be roughly divided into a method of sending the data chronologically and a method of repeatedly sending the data per set interval. In the former method of sending the data chronologically, for example, data that continues over the course of time is sent in sequential order. This method is suitable for sending large amounts of data over a long period of time, but there is a drawback in that data that could not be received at the timing of the sending cannot be received again. On the other hand, in the latter method of repeatedly sending the data at a set interval, the same data is repeatedly sent any number of times during a fixed period. This method has an advantage in that during the period when the same data is being sent, it is acceptable to receive any one of the repeatedly-sent pieces of data, and thus the timing of receiving is not limited. Data broadcast, represented by BML, and file sending through DSM-CC data carousel are examples of this method. It is unknown, particularly in broadcast, when a recipient will select a channel and commence reception. In the method of sending the data chronologically, when the start of reception falls behind the timing of the sending and thus acquisition of the data, the data cannot be re-acquired. Therefore, when sending data such as an application program along with video and audio in the broadcast wave, the method of repeatedly sending the data per set interval is favorable.

At present, specifications for receiving a broadcast wave that includes video, audio, and an application program and for executing the application program in synchronization with video and audio, as in the above method, have been developed, and are in operation. It is possible to receive the sent application program, load the application program into a terminal, and realize various extra functions by executing the application program, rather than simply viewing the video and audio. This method for sending the application program and loading the application program into the terminal is also called "downloading". For example, a specification called Digital Video Broadcasting—Multimedia Home Platform (DVB-MHP) ETSIES201812 v1.1.1 (2003-12) has been developed in Europe, and operations according to this specification have already commenced. In addition, Open Cable Application Platform (OCAP) OC-SP-OCAP1.0-114-050119 specification, which provides the same framework in the cable broadcast environment, is being developed in the United States, and actually operations are set to commence. In these specifications, the application program is written in the Java language. Various Application Programming Interfaces (APIs) for tuning, graphics display, and the like are provided in the terminal, and the Java application program can control those functions by calling the APIs.

In addition, in North America, the OCAP-DVROC-SP-OCAP-DVR-I01-040524 specification, which is aimed at adding a function for recording and reproducing the contents in the OCAP specification, is being developed. With this specification, the video, audio, and the Java application program executed in synchronization with each other, which are sent as a cable television broadcast, are recorded as a content, and furthermore, are reproduced in the same manner as when the recorded content is directly reproduced from the broadcast wave. The application program is reproduced in synchronization with the video and audio, in the same manner as direct reproduction from the broadcast wave.

Moreover, with OCAP-DVR, trick play of the contents is realized by recording broadcast contents on a high-speed random-accessible storage medium, such as a hard disk, a semiconductor memory, and the like. Here, the trick play refers to functions for reproducing the contents at an arbitrary speed, from an arbitrary position, and so on, such as fast-forward, rewind, slow-motion, pause, skip, and the like. With OCAP-DVR, the application program loaded into the terminal from the broadcast wave can control the recording and trick play of the content. In other words, APIs for recording and trick play are provided in the terminal, and the Java application program controls each function by calling those APIs.

Typically, control information for synchronization is in advance multiplexed with a broadcast wave in order to execute an application program in synchronization with video and audio. The application programs are executed and terminated one by one in accordance with the synchronization control information. Therefore, it is possible to switch to a suitable application program to be executed for a particular scene of video and audio. By the way, in the case where trick play of content recorded by a terminal is performed according to OCAP-DVR or the like, it is necessary to switch appropriately between application programs depending on a type of the trick play. For example, in the case where video changes to another by fast-forward, an application program associated with the video in synchronization thereto also changes to another in accordance with the reproduction speed. In addition, in the case of skip, an application program, which is, for example, synchronized with the reproduction start position in the video after the skip, is executed.

By the way, in the case of fast-forward, a terminal may be unable to switch and execute an application program in accordance with its own fast-forward speed. For example, it takes time to start up an application program, so that the startup timing of the next application program is lost during the startup of the previous one. In the case of skip play, an application program, which is synchronized with any timing up to a reproduction start position after the skip, is not reproduced, but only an application program which is synchronized with the reproduction start time is executed. Here, there is a problem in the case where the executed application program uses the result of the previously executed application program.

In order to solve this problem, Japanese Translation of PCT International Application 2003-513555 provides a setup for notifying an application program about control information of an application program which has not been detected, during trick play such as skip or the like, because of the execution of the trick play. With this notification, it becomes possible to take a desired action even if application programs are executed in the order different from the primary order.

According to the invention disclosed in Japanese Translation of PCT International Application 2003-513555, it is possible to discover that a particular application program has not been detected, so that a desired action can be taken.

However, since Japanese Translation of PCT International Application 2003-513555 only notifies of the control information of the application program which has not been detected during trick play, there remains a problem in the following case. For example, it is assumed that an application program executes trick play of fast-forward of content including the application program itself. In the case where the execution period of the application program set in the synchronization control information has passed because the content is reproduced by fast-forward at a higher speed than the normal speed, the application program is forced to be terminated. Here, even if the forcibly terminated application program is actually terminated, the current trick play of fast-forward continues. However, it is not always going to be possible to take an approach of terminating the trick play of fast-forward when the application program is forcibly terminated. This is because the current trick play of fast-forward may not be the trick play executed by that forcibly terminated application program. In other words, in order to solve this problem, it is necessary to determine whether or not that application program is identical to the application program which instructed the trick play, when the application program is terminated, and to execute the processing such as continuation and termination of the trick play depending on the situation, when the application program which instructed the trick play is terminated.

SUMMARY OF THE INVENTION

A content reproduction apparatus of the present invention includes: a content reproduction unit that reproduces a recorded content; a program execution unit that starts and terminates a program; a content reproduction speed change unit that changes a reproduction speed of the recorded content based on an instruction from the program; a trick play instructing program identification unit that identifies a program which has instructed the content reproduction speed change unit to change the reproduction speed of the content; a terminated program identification unit that identifies a terminated program out of programs to be executed by the program execution unit; a trick play instructing program determination unit that determines whether or not the program which is identified by the trick play instructing program identification unit as a program which has instructed the change in the reproduction speed of the content is the terminated program identified by the terminated program identification unit; and a trick play instructing program termination processing unit that changes the reproduction speed of the content to a normal reproduction speed when the trick play instructing program determination unit determines that the program which has instructed the change in the reproduction speed of the content is the terminated program.

Accordingly, it is possible to determine whether or not an arbitrary program is a program which changed a reproduction speed of a recorded broadcast wave, and to change the reproduction speed of the recorded broadcast wave when the program is terminated. Therefore, it is possible to prevent the recorded broadcast wave from continuing to be reproduced at the reproduction speed instructed by the already terminated program.

Furthermore, the above-mentioned content includes video, audio, a program and synchronization information for synchronizing the video, the audio and the program with one another, and the program included in the content may be executed by the program execution unit based on the synchronization information.

The above-mentioned content reproduction apparatus further includes a program reception unit that receives the program, and the program received by the program reception unit may be executed by the program execution unit.

The above-mentioned program execution unit may start and terminate the program with reference to the synchronization information included in the content.

The above-mentioned synchronization information includes a trick play compliant flag that indicates whether or not the program should be forced to terminate, and the program execution unit may start and terminate the program based on the trick play compliant flag in the synchronization information included in the content.

The above-mentioned program execution unit may further force the program to terminate when an abnormality occurs during the execution of the program.

Accordingly, it is possible to terminate a program if any abnormality has occurred. Therefore, it is possible to reduce damage to software and hardware when there is a change in the reproduction speed.

Furthermore, the above-mentioned program execution unit may refer to the synchronization information included in the content, only when the reproduction speed of the content is slow. For example, the program execution unit refers to the synchronization information included in the content, only when the reproduction speed of the content is equal to or less than the normal reproduction speed.

Note that the present invention can be implemented not only as the above-mentioned content reproduction apparatus but also as a content reproduction method, a program for the method and a storage medium for storing the program.

As further information about technical background to this application, the disclosure of U.S. Provisional Application No. 60/681,974 filed May 18, 2005, including specification, drawings and claims, is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is one example of how to use a frequency band used in communications between a broadcast station side system and a terminal apparatus, in a cable television system according to the present invention;

FIG. 3 is one example of how to use a frequency band used in communications between a broadcast station side system and a terminal apparatus, in a cable television system according to the present invention;

FIG. 4 is one example of how to use a frequency band used in communications between a broadcast station side system and a terminal apparatus, in a cable television system according to the present invention;

FIG. 9 is a configuration diagram of an MPEG-2 section predefined by MPEG-2 specifications;

FIG. 10 is an example of use of an MPEG-2 section predefined by MPEG-2 specifications;

FIG. 11 is an example of use of a PMT predefined by MPEG-2 specifications;

FIG. 12 is an example of use of a PAT predefined by MPEG-2 specifications;

FIG. 21 is an example of a record information management table according to the present invention;

FIG. 28 is a schematic diagram showing the details of an AIT for extending the DVB-MHP standard according to the present invention;

FIG. 29 is a schematic diagram showing the details of an AIT for extending the DVB-MHP standard according to the present invention;

FIG. 47 is a schematic diagram showing the details of an AIT in which a trick play control flag according to the present invention is added;

DESCRIPTION OF THE PREFERRED EMBODIMENT(S)

Figure 1:
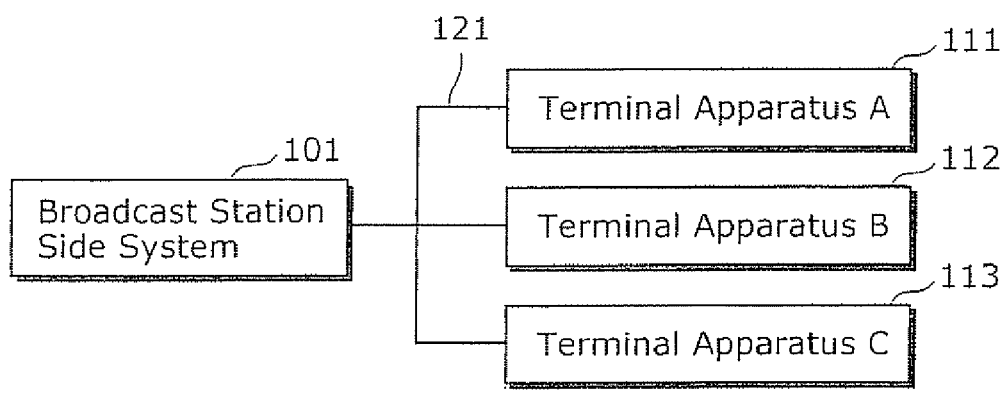
FIG. 1 is a configuration diagram of a broadcast system according to the present invention.

The first invention is a recording and reproduction apparatus which records a broadcast wave and reproduces the recorded broadcast wave, and the apparatus includes: a program information holding unit for holding information which identifies a program for changing a reproduction speed of the recorded broadcast wave; a program determination unit for determining whether or not an arbitrary program is identical to the program; and a program termination processing unit for changing the reproduction speed of the broadcast wave when the program is terminated.

According to the above first invention, it is possible to determine whether or not an arbitrary program is identical to a program which changed a reproduction speed of a recorded broadcast wave, and to change the reproduction speed of the recorded broadcast wave when the program is terminated. Therefore, it is possible to prevent the recorded broadcast wave from continuing to be reproduced at the reproduction speed instructed by the already terminated program.

The second invention is the invention which is dependent on the first invention, in which the program is terminated in the case where the program does not comply with a change in the reproduction speed of the broadcast wave during reproduction of the broadcast wave.

According to the above second invention, it is possible to terminate a program which does not comply with a change in a reproduction speed of a recorded broadcast wave. Therefore, it is possible to avoid any unexpected behavior of the program when there is a change in the reproduction speed.

The third invention is the invention which is dependent on the first invention, in which the program is terminated in the case where a specified position in the broadcast wave has been reproduced during reproduction of the broadcast wave.

According to the above third invention, it is possible to terminate a program at a specified position in a recorded broadcast wave. Therefore, it is possible to execute the program only within a fixed interval of time, when there is a change in the reproduction speed.

The fourth invention is the invention which is dependent on the first invention, in which the program is terminated in the case where one of the following has occurred during reproduction of the broadcast wave: an abnormality in the program; an abnormality in a system in which the program operates; and a lack of resources for causing the program to operate.

According to the above fourth invention, it is possible to terminate a program if any abnormality has occurred. Therefore, it is possible to reduce damage to software and hardware when there is a change in the reproduction speed.

The fifth invention is the invention which is dependent on one of the second, third and fourth inventions, in which when the program is terminated, the program termination processing unit reproduces the broadcast wave at a normal speed.

According to the above fifth invention, it is possible to set normal speed reproduction of a recorded broadcast wave when a program which changed a reproduction speed of the broadcast wave is terminated. Therefore, it is possible to set normal speed reproduction without any involvement of a user, in an interval of time in which execution of the program is not expected.

The sixth invention is the invention which is dependent on one of the second, third and fourth inventions, in which when the program is terminated, the program termination processing unit temporarily stops the broadcast wave.

According to the above sixth invention, it is possible to temporarily stop reproduction of a recorded broadcast wave when a program which changed a reproduction speed of the broadcast wave is terminated. Therefore, it is possible to temporarily stop reproduction without any involvement of a user, in an interval of time in which execution of the program is not expected.

The seventh invention is the invention which is dependent on the third invention, in which the program is terminated in the case where a specified position in the broadcast wave is reproduced during reproduction of the broadcast wave at a normal speed.

According to the above seventh invention, it is possible to terminate a program at a specified position in a recorded broadcast wave during normal speed reproduction. Therefore, it is possible to execute the program only within a fixed interval of time during normal speed reproduction.

The eighth invention is the invention which is dependent on the seventh invention, in which the program is terminated in the case where the broadcast wave is temporarily stopped within a specified range of the broadcast wave.

According to the above eighth invention, it is possible to terminate a program if the broadcast wave is temporarily stopped within a specified range of the recorded broadcast wave. Therefore, it is possible to execute the program only within a fixed interval of time during the temporary stop.

The ninth invention is the invention which is dependent on the eighth invention, in which the program is terminated in the case where a specified position in the broadcast wave is reproduced during reproduction of the broadcast wave at the less speed than a normal speed, namely, a speed ranging from a 0-times speed to 1-times speed.

According to the above ninth invention, it is possible to terminate a program at a specified position in a recorded broadcast wave during reproduction at a speed ranging from 0-times speed to 1-times speed. Therefore, it is possible to execute the program only within a fixed interval of time during reproduction at a speed ranging from 0-times speed to 1-times speed.

The tenth invention is a recording and reproduction apparatus which records a broadcast wave and reproduces the recorded broadcast wave, and the apparatus includes: a program information holding unit for holding information which identifies a program for changing a reproduction speed of the recorded broadcast wave; a program determination unit for determining whether or not an arbitrary program is identical to the program; and a program termination processing unit for performing predetermined processing when the program is terminated.

According to the above tenth invention, it is possible to determine whether or not an arbitrary program is identical to a program which changed a reproduction speed of a recorded broadcast wave, and to perform predetermined processing when the program is terminated. Therefore, it is possible to perform consistent processing when the program which changed the reproduction speed is terminated.

The eleventh invention is the invention which is dependent on the tenth invention, in which the program is terminated in the case where the program does not comply with a change in the reproduction speed of the broadcast wave during reproduction of the broadcast wave.

According to the above eleventh invention, it is possible to terminate a program which does not comply with a change in a reproduction speed of a recorded broadcast wave. Therefore, it is possible to avoid any unexpected behavior of the program when there is a change in the reproduction speed.

The twelfth invention is the invention which is dependent on the tenth invention, in which the program is terminated in the case where a specified position in the broadcast wave is reproduced during reproduction of the broadcast wave.

According to the above twelfth invention, it is possible to terminate a program at a specified position in a recorded broadcast wave. Therefore, it is possible to execute the program only within a fixed interval of time when there is a change in the reproduction speed.

The thirteenth invention is the invention which is dependent on the tenth invention, in which the program is terminated in the case where one of the following has occurred during reproduction of the broadcast wave: an abnormality in the program; an abnormality in a system in which the program operates; and a lack of resources for causing the program to operate.

According to the above thirteenth invention, it is possible to terminate a program if any abnormality has occurred. Therefore, it is possible to reduce damage to software and hardware when there is a change in the reproduction speed.

The fourteenth invention is the invention which is dependent on one of the eleventh, twelfth and thirteenth inventions, in which when the program is terminated, the program termination processing unit performs processing registered by another program.

According to the above fourteenth invention, it is possible to perform processing registered by another program, when a program which changed a reproduction speed is terminated Therefore, it is possible to replace the processing to be performed when the program which changed the reproduction speed is terminated, with another program.

The fifteenth invention is the invention which is dependent on one of the eleventh, twelfth and thirteenth inventions, in which when the program is terminated, the program termination processing unit passes statuses before and after the termination of the program to the predetermined processing, and performs the predetermined processing.

According to the above fifteenth invention, it is possible to pass the statuses before and after termination of a program which changed a reproduction speed to predetermined processing and to perform the predetermined processing. Therefore, it is possible to perform the processing depending on the statuses before and after the termination of the program.

The sixteenth invention is the invention which is dependent on the fifteenth invention, in which the statuses before and after the termination of the program, which are passed to the predetermined processing to be performed by the program termination processing unit, when the program is terminated, include information identifying the terminated program.

According to the above sixteenth invention, it is possible to pass information which identifies a terminated program which changed a reproduction speed to predetermined processing, when the program is terminated, and to perform the predetermined processing. Therefore, it is possible to perform the processing depending on the information which identifies the terminated program.

The seventeenth invention is the invention which is dependent on the fifteenth invention, in which the statuses before and after the termination of the program, which are passed to the predetermined processing to be performed by the program termination processing unit, when the program is terminated, include a reproduction speed of the broadcast wave immediately before the termination.

According to the above seventeenth invention, it is possible to pass, to predetermined processing, a reproduction speed of a broadcast wave immediately before termination of a program which changed a reproduction speed, when the program is terminated, and to perform the predetermined processing. Therefore, it is possible to perform the processing depending on the reproduction speed of the broadcast wave immediately before the termination.

The eighteenth invention is the invention which is dependent on the fifteenth invention, in which the statuses before and after the termination of the program, which are passed to the predetermined processing to be performed by the program termination processing unit, when the program is terminated, include a reproduction position in the broadcast wave at the time of the termination.

According to the above eighteenth invention, it is possible to pass, to predetermined processing, a reproduction position in a broadcast wave at the time of termination of a program which changed a reproduction speed, when the program is terminated, and to perform the predetermined processing. Therefore, it is possible to perform the processing depending on the reproduction position in the broadcast wave at the time of the termination.

The nineteenth invention is a recording and reproduction apparatus which records a broadcast wave and reproduces the recorded broadcast wave, and the apparatus includes: a program information holding unit for holding information which identifies a program for changing a reproduction speed of the recorded broadcast wave; a program determination unit for determining whether or not an arbitrary program is identical to the program; and a program termination processing unit for switching from the broadcast wave to be reproduced to another broadcast wave, when the program is terminated.

According to the above nineteenth invention, it is possible to determine whether or not an arbitrary program is identical to a program which changed a reproduction speed of a recorded broadcast wave, and to switch from the broadcast wave to be reproduced to another broadcast wave at the time of termination of the program. Therefore, it is possible to stop continuous reproduction of the recorded broadcast wave at the reproduction speed instructed by the already terminated program and to start reproduction of an alternative broadcast wave.

The twentieth invention is the invention which is dependent on the nineteenth invention, in which the program is terminated in the case where the program does not comply with a change in the reproduction speed of the broadcast wave during reproduction of the broadcast wave.

According to the above twentieth invention, it is possible to terminate a program which does not comply with a change in a reproduction speed of a recorded broadcast wave. Therefore, it is possible to avoid any unexpected behavior of the program when there is a change in the reproduction speed.

The twenty-first invention is the invention which is dependent on the nineteenth invention, in which the program is terminated in the case where a specified position in the broadcast wave is reproduced during reproduction of the broadcast wave.

According to the above twenty-first invention, it is possible to terminate a program at a specified position in a recorded broadcast wave. Therefore, it is possible to execute the program only within a fixed interval of time when there is a change in the reproduction speed.

The twenty-second invention is the invention which is dependent on the nineteenth invention, in which the program is terminated in the case where one of the following has occurred during reproduction of the broadcast wave: an abnormality in the program; an abnormality in a system in which the program operates; and a lack of resources for causing the program to operate.

According to the above twenty-second invention, it is possible to terminate a program if any abnormality has occurred. Therefore, it is possible to reduce damage to software and hardware when there is a change in the reproduction speed.

The twenty-third invention is the invention which is dependent on one of the twentieth, twenty-first and twenty-second inventions, in which when the program is terminated, the program termination processing unit switches from the broadcast wave to be reproduced to a broadcast wave which is currently being broadcasted.

According to the above twenty-third invention, it is possible to switch to a broadcast wave to be reproduced which is currently being broadcasted, at the time of termination of a program which changed a reproduction speed. Therefore, it is possible to stop reproduction of the recorded broadcast wave in an interval of time in which execution of the program is not expected, and to continue reproduction of the broadcast wave which is currently being broadcasted.

According to the content reproduction apparatus and the recording and reproduction method of the present invention, when an arbitrary application program is terminated, it is determined whether or not that application program has changed the reproduction speed of content which is currently being reproduced, and prescribed processing, such as reset of the reproduction speed of the content, is executed based on the determination result, or reproduction of alternative content is started. This prevents the continued reproduction of the content at an unintended speed that is not a normal speed, in spite of the termination of the program which has changed the reproduction speed of the content. In addition, this prevents the reproduction of the recorded content at a reproduction speed which has been changed inappropriately. Therefore, it is possible to reduce the high-load access to a semiconductor memory or the like represented by a hard disk, a Blu-ray Disc (BD), a Digital Versatile Disc (DVD), a Secure Digital (SD) memory card and the like, and to reduce the deterioration of such storage medium.

First Embodiment

Hereafter, an apparatus and a method according to the first embodiment of the present invention are described with reference to the drawings. The present invention is aimed at recording and reproduction of sent and received contents with an arbitrary medium; however, in the present embodiment, a cable television broadcast system is described as an example. In the cable television broadcast system, the broadcast recording and reproduction apparatus (content reproduction apparatus) is generally called a terminal apparatus.

FIG. 1 is a block diagram showing a relationship of apparatuses that make up a broadcast system; the broadcast system is made up of a broadcast station side system (head-end) 101, and three terminal apparatuses: a terminal apparatus A111, a terminal apparatus B112, and a terminal apparatus C113. A coupling 121 between the broadcast station side system and each terminal apparatus is, in the cable system, a wired coupling such as a coaxial cable, a fiber-optic cable, and the like. In FIG. 1, one broadcast station side system is coupled with three terminal apparatuses, but the number of terminal apparatuses is arbitrary.

The broadcast station side system 101 sends information such as video/audio/data for data broadcast in a broadcast signal to a plurality of terminal apparatuses. The broadcast signal is sent using a frequency within a frequency band set by the operational regulations of the broadcast system, the laws of a region/country in which the broadcast system is operated, and so on.

With the cable system in the present embodiment, the frequency band used in broadcast signal transmission is divided for each of data details and transmission directions (inbound, outbound) and assigned thereto. FIG. 2 is a chart indicating one example of the division of the frequency band. The frequency band is roughly divided into two types: Out Of Band (abbr OOB) and In-Band. 5 MHz to 130 MHz is assigned as OOB, and is mainly used in inbound/outbound data exchange between the broadcast station side system 110 and the terminal apparatus A111, the terminal apparatus B112, and the terminal apparatus C113. 130 MHz to 864 MHz is assigned as In-Band, and is mainly used in an outbound-only broadcast channel that includes video/audio. QPSK modulation method is used with OOB, and QAM64 or QAM256 modulation method is used with In-Band. Modulation method technology is generally known and of little concern to the present invention, and therefore detailed descriptions are omitted.

FIG. 3 is one example of a more detailed use of the OOB frequency band. 70 MHz to 74 MHz is used in outbound data sending from the broadcast station side system 101, and all of the terminal apparatus A111, the terminal apparatus B112, and the terminal apparatus C113 receive the same data from the broadcast station side system 101. On the other hand, 10.0 MHz to 10.1 MHz is used in inbound data sending from the terminal apparatus A111 to the broadcast station side system 101; 10.1 MHz to 10.2 MHz is used in inbound data sending from the terminal apparatus B112 to the broadcast station side system 101; and 10.2 MHz to 10.3 MHz is used in inbound data sending from the terminal apparatus C113 to the broadcast station side system 101. Through this, it is possible to independently send unique data from each terminal apparatus A111, B112, and C113 to the broadcast station side system 101.

FIG. 4 is one example of use of an In-Band frequency band. 150 MHz to 156 MHz and 156 MHz to 162 MHz are assigned to a TV channel 1 and a TV channel 2 respectively, and thereafter, TV channels are assigned at 6 MHz intervals. Radio channels are assigned in 1 MHz units from 310 MHz on. Each of these channels may be used as analog broadcast or as digital broadcast. Digital broadcast is sent in TS packet format based on MPEG-2 specifications, and it is also possible to send various kinds of data such as data broadcast data and TV show organization information for configuring EPG, in addition to audio and video.

The broadcast station side system 101 uses the frequency bands described above to send an appropriate broadcast signal to the terminal apparatuses, and therefore has a QPSK modulation unit, a QAM modulation unit, and so on. In addition, the broadcast station side system 101 has a QPSK demodulator for receiving data from the terminal apparatuses. Moreover, the broadcast station side system 101 can be thought of as having various devices related to the modulation unit and the demodulation unit. However, the present invention relates mainly to the terminal apparatuses, and therefore detailed descriptions are omitted.

Meanwhile, the terminal apparatuses A111, B112, and C113 each have a QAM demodulation unit and a QPSK demodulation unit in order to receive and reproduce a broadcast signal from the broadcast station side system 101. In addition, each terminal apparatus has a QSPK modulation unit in order to send its unique data to the broadcast station system side 101. In the present invention, the terminal apparatuses are broadcast recording and reproduction apparatuses, and detailed configurations are described later.

The broadcast station side system 101 modulates an MPEG-2 transport stream and transmits the stream within the broadcast signal. A terminal apparatus receives the broadcast signal, demodulates and reproduces the MPEG-2 transport stream, and extracts necessary information from the stream, and uses it. In order to describe a device function and connection structure present in the terminal apparatus, the structure of the MPEG-2 transport stream is first described in a simple manner.

Figure 5:
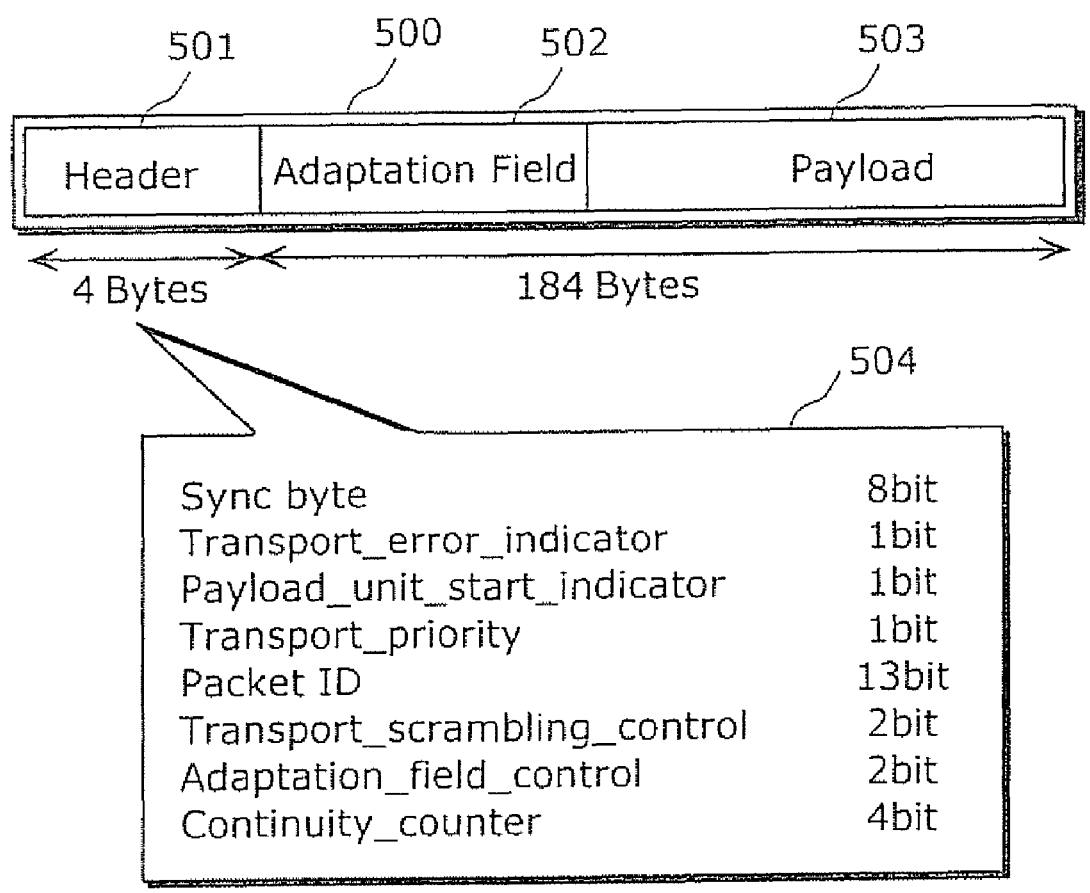
FIG. 5 is a configuration diagram of a TS packet predefined by MPEG-2 specifications.

FIG. 5 is a diagram showing the structure of a TS packet. A TS packet 500 has a length of 188 bytes, and is composed of a header 501, an adaptation field 502, and a payload 503. The header 501 holds control information of the TS packet. The header has a length of 4 bytes, and has the structure shown in 504. In the header 501, there is a field denoted as "Packet ID" (hereafter, PID), and the TS packet is identified through the value of this PID. The adaptation field 502 holds additional information such as time information. The adaptation field 502 does not necessarily have to be present, and there are cases where the adaptation field 502 is not present. The payload 503 holds information carried in the TS packets, such as video, audio, and data broadcast data.

Figure 6:
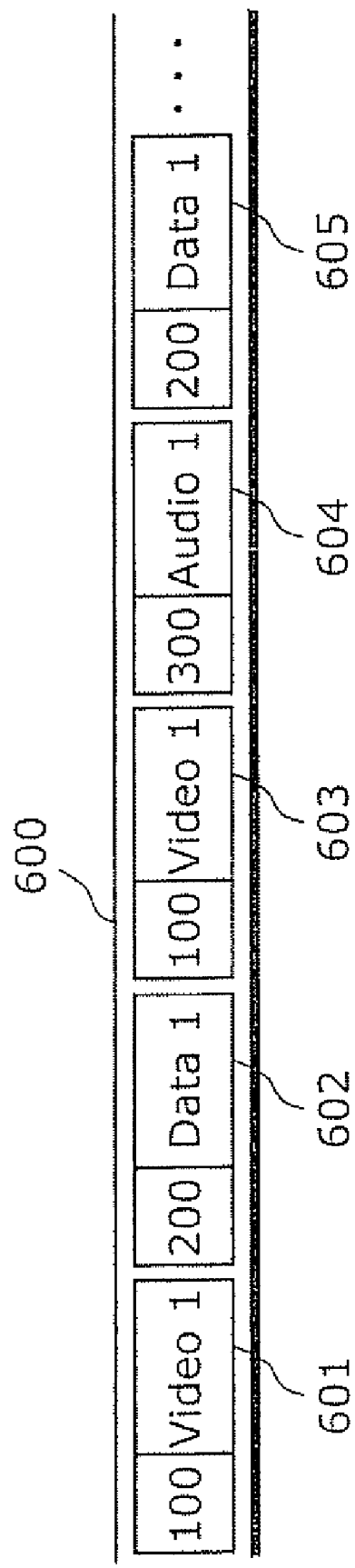
FIG. 6 is a schematic diagram of an MPEG-2 transport stream.

FIG. 6 is a schematic diagram of an MPEG-2 transport stream. The TS packet holds various information in the payload, such as video, audio, data used for data broadcast, and the like. A TS packet 601 and a TS packet 603 each hold a PID 100 in the header, and hold information regarding video 1 in the payload. A TS packet 602 and a TS packet 605 each hold a PID 200 in the header, and hold information regarding data 1 in the payload. A TS packet 604 holds a PID 300 in the header, and holds information regarding audio 1 in the payload. Mixing TS packets which hold various types of data in the payloads and sending out these packets as a series in sequence is called multiplexing. An MPEG-2 transport stream 600 is one example of a configuration in which the TS packets 601 to 605 are multiplexed.

TS packets that have identical PIDs hold identical types of information. Therefore, the terminal apparatus reproduces video and audio, and reproduces data such as TV show organization information, by receiving multiplexed TS packets and extracting, per PID, the information that the TS packet holds. In FIG. 6, the TS packet 601 and the TS packet 603 each carry information regarding the video 1, and the TS packet 602 and the TS packet 605 each carry information regarding the data 1.

Here, description is given regarding a format of each type of data contained in the payload.

Video and audio are represented by a format called a Packetized Elementary Stream (PES) packet. The PES packet includes video information or audio information of certain hours of a day, and by receiving the PES packet, the broadcast recording and reproduction apparatus can output the video and audio information contained in that PES packet to a screen and a speaker. The broadcast station transmits the PES packets without pause, and therefore it is possible for the broadcast recording and reproduction apparatus to continuously reproduce the video and audio without pause. When the PES packet is actually transmitted, the PES packet is divided and stored in the payloads of a plurality of TS packets in the case where the PES packet has a size larger than the payload of one TS packet.

Figure 7:
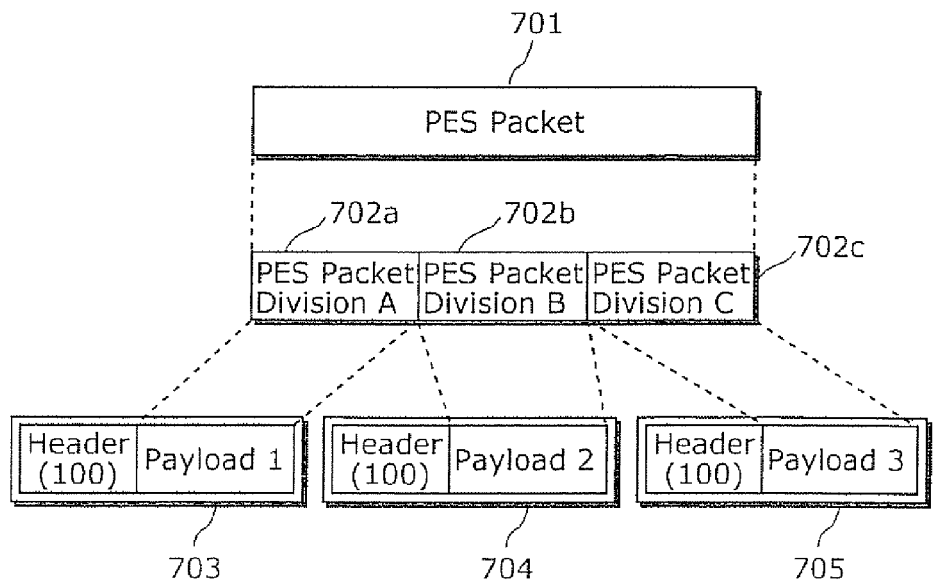
FIG. 7 is an example of division when a PES packet predefined by MPEG-2 specifications is carried in TS packets.

FIG. 7 shows an example of division when a PES packet is carried. A PES packet 701 is too large to be stored and transmitted in a payload of a single TS packet, and therefore the PES packet 701 is divided into a PES packet division A 702*a*, a PES packet division B 702*b*, and a PES packet division C 702*c*, and is carried in three TS packets 703 to 705 which have identical PIDs. In actuality, the video and audio are each obtained as an elementary stream (ES) that is obtained by concatenating data contained in the payloads of a plurality of PES packets. The format of this elementary stream is digitalized video and audio, such as defined by the MPEG-2 Video standard, the MPEG-1 and 2 Audio standard, and the like.

Figure 8:
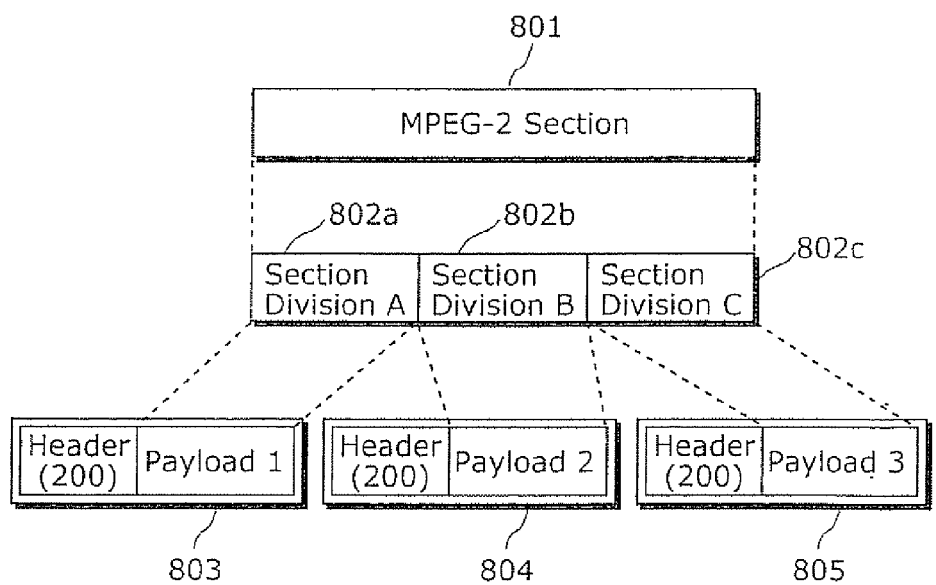
FIG. 8 is an example of division when an MPEG-2 section predefined by MPEG-2 specifications is carried in TS packets.

On the other hand, information such as the TV show organization information and data used for data broadcast is expressed using a format called MPEG-2 section. When the MPEG-2 section is actually transmitted, the MPEG-2 section is divided and stored in the payloads of a plurality of TS packets in the case where the MPEG-2 section has a size larger than the payload of one TS packet. FIG. 8 shows an example of division when the MPEG-2 section is carried. As an MPEG-2 section 801 is too large to be stored and transmitted in a payload of a single TS packet, the MPEG-2 section 801 is divided into a section division A 802*a*, a section division B 802*b*, and a section division C 802*c*, and is carried in three TS packets 803 to 805 which have identical PIDs.

FIG. 9 expresses a structure of the MPEG-2 section. An MPEG-2 section 900 is configured of a header 901 and a payload 902. The header 901 holds control information of the MPEG-2 section. That configuration is expressed by a header configuration 903. The payload 902 holds data carried in the MPEG-2 section 900. A table_id present in the header configuration 903 expresses the type of the MPEG-2 section, and a table_id_extension is an extension identifier used when further distinguishing between MPEG-2 sections with an identical table_id. The case where the TV show organization information is transmitted, as in FIG. 10, can be given as an example of use of the MPEG-2 section. In this example, as denoted in the row 1004, information necessary for demodulating the broadcast signal is denoted in the MPEG-2 section which has a table_id of 64 in the header structure 903, and this MPEG-2 section is further carried in a TS packet assigned with a PID of 16.

The PES format does not exist in the case of the MPEG-2 section. For that reason, the elementary stream (ES) is a concatenation of the payloads of TS packets identified by identical PIDs within the MPEG-2 transport stream. For example, in FIG. 8, the TS packets 803 to 805, in which the MPEG-2 section 801 is divided and carried, all are identified by the PIDs of 200. It can be said that these are the ESs which carry the MPEG-2 section 801.

A concept called a program further exists in the MPEG-2 transport stream. The program is expressed as a collection of ESs, and is used in the case where handling a plurality of ESs all together is desirable. When the program is used, it is possible to handle video/audio, as well as accompanying data broadcast data, all together For example, in the case of simultaneously handling the video/audio to be reproduced, by grouping the video ES and the audio ES as a program, the broadcast recording and reproduction apparatus should simultaneously reproduce these two ESs as one TV show.

To express the program, two tables, called a Program Map Table (PMT) and a Program Association Table (PAT) are used in MPEG-2. Detailed descriptions can be found in the specifications of ISO/IEC 13818-1, "MPEG-2 Systems". The PMT and the PAT are described hereafter in simple terms.

The PMT is a table, as many of which are included in the MPEG-2 transport stream as the number of programs The PMT is configured as an MPEG-2 section, and has a table_id of 2. The PMT holds a program number used in identifying the program and additional information of the program, as well as information regarding ESs belonging to the program. An example of the PMT is given in FIG. 11. 1100 shows program numbers. The program numbers are assigned uniquely to programs in the same transport stream, and are used in identifying the PMTs. Rows 1111 to 1114 express information regarding individual ESs. A column 1101 shows types of ESs, in which "video", "audio", "data", and so on are specified. A column 1102 shows the PIDs of the TS packets that make up each ES. A column 1103 shows additional information regarding the ESs. For example, the ES shown in the row 1111 is an audio ES, and is carried in TS packets with PIDs of 5011.

The PAT is a table, of which only one is present, in the MPEG-2 transport stream. The PAT is configured as an MPEG-2 section, has a table_id of 0, and is carried in a TS packet with a PID of 0. The PAT holds a transport_stream_id used in identification of the MPEG-2 transport stream, and information regarding all PMTs that represent programs existing in the MPEG-2 transport stream. An example of the PAT is given in FIG. 12. 1200 is a transport_stream id. The transport_stream_id is used in identifying the MPEG-2 transport stream. Rows 1211 to 1213 express information regarding the programs. A column 1201 shows the program numbers. A column 1202 shows the PIDs of the TS packets which carry the PMTs that correspond to respective programs. For example, the PMT of the program shown in the row 1211 has a program number of 101, and the corresponding PMT is carried in the TS packet with a PID of 501.

In the case where the terminal apparatus reproduces a certain program, the terminal apparatus uses the PAT and the PMT and identifies the video and audio that make up the program, and reproduces that video and audio. For example, in regards to the MPEG-2 transport stream that carries the PAT in FIG. 12 and the PMT in FIG. 11, the following procedure is followed in the case where the video and audio belonging to the program with a program number of 101 are reproduced. First, a PAT transmitted as an MPEG-2 section with a table_id of "0" is acquired from a TS packet with a PID of "0". The PAT is searched to find a program with the program number "101", and the row 1211 is obtained. From the row 1211, the PID "501", of the TS packet which carries the PMT of the program with a program number "101", is obtained. Next, the PMT carried as the MPEG-2 section with a table_id of "2" is acquired from the TS packet with the PID of "501". A row 1111, which is audio ES information, and a row 1112, which is video ES information, are obtained from the PMT. A PID "5011" of the TS packet which carries the audio ES is obtained from the row 1111. In addition, a PID "5012" of the TS packet which carries the audio ES is obtained from the row 1112. Next, an audio PES packet is acquired from the TS packet with a PID "5011", and a video PES packet is acquired from the TS packet with a PID of "5012". Through this, it is possible to obtain the video and audio PES packets to be reproduced, and the video and audio carried in these packets can be reproduced.

Note that there are cases where the MPEG-2 transport stream is scrambled. This is a setup called conditional access system. For example, by scrambling the PES packets which carry certain video and audio, only specified viewers who can descramble them are able to view that video and audio. In order to descramble and view the video and audio, a viewer must descramble them using a device called a descrambler. For example, in an OCAP-compatible terminal apparatus, a card-form adapter with an internal descrambler is used. A cable television operator distributes an adapter set to be able to descramble a specified program to each viewer, and the viewer inserts that adapter into the terminal apparatus. Upon doing so, the adapter descrambles the specified program based on descrambling information such as a descrambling key and contract information of each contract holder. A method of descrambling, a method of obtaining a descrambling key, and the like depend on the adapter, and have no influence on the implementation of the present invention.

Thus far, simple descriptions regarding the MPEG-2 specifications have been given, and hereafter, detailed definitions of terminology are given. In the present invention, two types of the term "program" exist. One is a "program" which appears in the MPEG-2 specifications, and the other is a "program" referring to an assemblage of code executed by a CPU. As the former is synonymous with the term "service" used in the operation regulations, hereafter, to avoid confusion, the former is called "service" and the latter is called simply "program". Furthermore, concerning the latter, a "program" particularly written in the Java™ language is called a "Java program".

Description has been given regarding several kinds of general information specified in the MPEG-2 specifications according to the present invention. Hereafter, the broadcast recording and reproduction terminal used in the present embodiment is described in detail.

Figure 13:
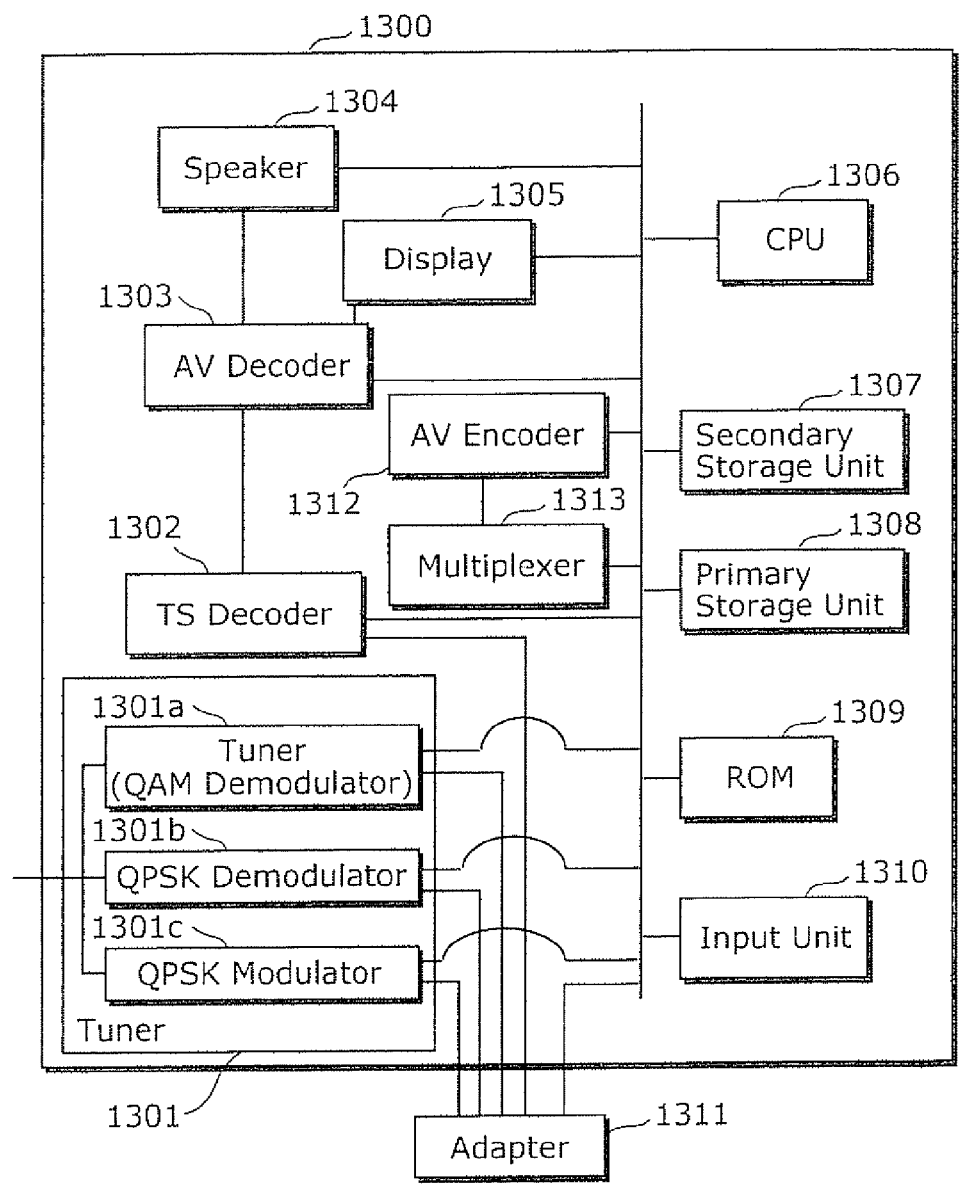
FIG. 13 is a configuration example of a hardware configuration of a broadcast recording and reproduction apparatus according to the present invention.

FIG. 13 is a block diagram showing a general hardware configuration of the broadcast recording and reproduction apparatus according to the present embodiment; in other words, a specific internal configuration of the terminal apparatuses 111, 112, and 113 shown in FIG. 1. 1300 is the broadcast recording and reproduction apparatus, which is configured of: a tuner 1301; a TS decoder (TS Demultiplexer) 1302; an AV decoder 1303; a speaker 1304; a display 1305; a CPU 1306; a secondary storage unit 1307; a primary storage unit 1308; a ROM 1309; an input unit 1310; an adapter 1311; an AV encoder 1312; and a multiplexer (MPEG-2 Transport Stream Multiplexer or the like) 1313. Note that the present embodiment is obtained by expanding a broadcast recording and reproduction terminal realized by the OCAP-DVR specifications, and the basic hardware configuration is nearly identical to that required by the OCAP-DVR specifications.

The tuner 1301 is a device which demodulates a broadcast signal modulated and transmitted from the broadcast station side system 101, in accordance with tuning information such as a frequency and the like specified by the CPU 1306. Here, tuning information is information in which a frequency, a modulation method, and the like can be specified. An MPEG-2 transport stream obtained as a result of demodulation by the tuner 1301 is sent to the TS decoder 1302 via the adapter 1311 with a descrambling function.

The TS decoder 1302 is a device which has a function to segregate PES packets and MPEG-2 sections which comply with specified conditions from the MPEG-2 transport stream, based on a PID, a section filter condition, and so on prescribed by the CPU 1306. In the case where a broadcast is received and a service is reproduced without recording, the MPEG-2 transport stream which the adapter 1311 outputs is inputted to the TS decoder 1302. On the other hand, in the case of reproducing a service recorded in the secondary storage unit 1307, the MPEG-2 transport stream which the secondary storage unit 1307 outputs is inputted to the TS decoder 1302. Which input to receive is controlled by the CPU 1306.

The PES packets of the video and audio which the TS decoder 1302 segregated are outputted to the AV decoder 1303. In addition, the MPEG-2 section segregated by the TS decoder 1302 is transferred to the primary storage unit 1308 through Direct Memory Access (DMA), and is used by a program executed by the CPU 1306.

The AV decoder 1303 is a device with a function to decode the encoded video ES and audio ES. The AV decoder fetches the ES from the PES packet that carries the audio and video information transferred from the TS decoder, and decodes the ES. An audio signal and a video signal obtained through the decoding performed by the AV decoder 1303 are outputted to the speaker 1304 and the display 1305 at the time of service reproduction, but are outputted to the AV encoder 1312 at the time of service recording. Which output route to take is controlled by the CPU 1306, according to an instruction from a user.

The speaker 1304 reproduces audio outputted from the AV decoder 1303.

The display 1305 reproduces video outputted from the AV decoder 1303.

The CPU 1306 executes a program that operates in the broadcast recording and reproduction apparatus. The CPU 1306 executes a program contained in the ROM 1309. Or, the CPU 1306 executes a program downloaded from a broadcast signal or a network and held in the primary storage unit 1308. Or, the CPU executes a program downloaded from a broadcast signal or a network and held in the secondary storage unit 1307. The tuner 1301, TS decoder 1302, AV decoder 1303, speaker 1304; display 1305, secondary storage unit 1307, primary storage unit 1308, ROM 1309, input unit 1310, adapter 1311, AV encoder 1312 and multiplexer 1313 are controlled in accordance with the instructions of the executed program. In addition, the CPU 1306 is capable of controlling the adapter 1311 through communication not only with devices present within the terminal apparatus 1300, but with the devices within the adapter 1311.

The secondary storage unit 1307 is a memory apparatus, the memory of which is not deleted even if the power supply to the device is interrupted. The secondary storage unit 1307 is configured of a device where information is not deleted even when the power to the terminal apparatus 1300 is turned off; for example, a nonvolatile memory such as a FLASH-ROM, a Hard Disk Drive (HDD), a rewritable media such as a CD-R and a DVD-R. The secondary storage unit 1307 saves information based on an instruction from the CPU 1306.

The primary storage unit 1308 is a device which has a function for temporarily saving information in accordance with an instruction from the CPU 1306, a DMA transfer-capable device, and so on, and is configured of a RAM or the like.

The ROM 1309 is a non-rewritable memory device, and to be more specific, is configured of a ROM, a CD-ROM, a DVD, and the like. The program which the CPU 1306 executes is stored in the ROM 1309.

Figure 14:
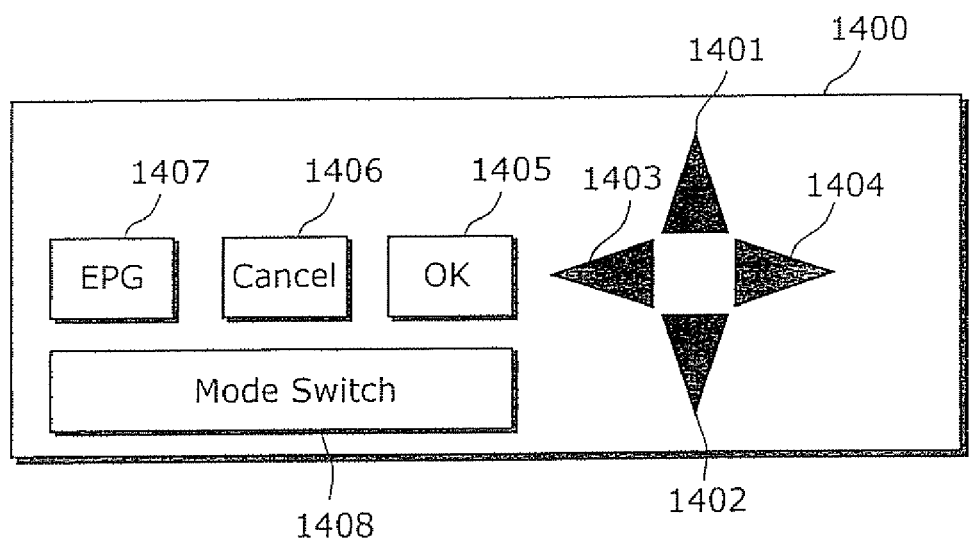
FIG. 14 is an example of a front panel of an input unit 1310 in a hardware configuration of a terminal apparatus 1200 according to the present invention.

The input unit 1310 is, to be more specific, configured of a front panel or a remote control receiver, and accepts an input from the user. FIG. 14 is one example of the case where the input unit 1310 is configured of the front panel. A front panel 1400 has seven buttons: an up cursor button 1401, a down cursor button 1402, a left cursor button 1403, a right cursor button 1404, an OK button 1405, a cancel button 1406, an EPG button 1407, and a mode switch button 1408. When the user presses a button, an identifier of the pressed button is notified to the CPU 1306.

The adapter 1311 is a device for descrambling a scrambled MPEG-2 transport stream carried in the In-band frequency range, and includes one or more descramblers. The MPEG-2 transport stream outputted by the tuner 1301a is inputted into the adapter 1311, and descrambling is carried out on the TS packet that has the PID specified by the CPU 1306. The adapter 1311 outputs the descrambled MPEG-2 transport stream to the TS decoder 1302.

Furthermore, the adapter 1311 also carries out format conversion of data sent in an OOB frequency range. Information that is sent in OOB is modulated in the QPSK modulation format. Regarding outbound transmission, the QPSK demodulator 1301b demodulates the outbound signal sent from the broadcast station side system 101, and inputs a generated bit stream into the adapter 1311. The adapter 1311 extracts information specified by the CPU 1306 from among various information included in the bit stream, converts the information to a format that can be interpreted by a program that operates in the CPU 1306, and provides this to the CPU 1306. On the other hand, regarding inbound transmission, the CPU 1306 inputs information to be sent to the broadcast station side system 101, into the adapter 1311. The adapter 1311 converts the information inputted from the CPU 1306 to a format that can be interpreted by the broadcast station side system 101, and inputs this to the QPSK modulator 1301c. The QPSK modulator 1301c QPSK-modulates the information inputted from the adapter 1311, and sends this to the broadcast station side system 101.

A CableCARD, formerly called a Point of Deployment (POD), used in the United States cable system, can be given as a specific example of the adapter 1311.

The AV encoder 1312 encodes the audio signal decoded by the AV decoder 1303 into audio in the MPEG audio format, and encodes the video signal into video in the MPEG video format. The AV encoder 1312 outputs the encoded video and audio to the multiplexer 1313.

The multiplexer 1313 is a device with a function to multiplex video and audio inputted from the AV encoder 1312, into the MPEG-2 transport stream.

An operation in which the broadcast recording and reproduction apparatus described above records a service contained in a broadcast wave into the secondary storage unit 1307, and an operation in which the broadcast recording and reproduction apparatus consecutively reads out the service from the secondary storage unit 1307 and reproduces it, are hereafter described in detail.

First, the operation in which the service contained in the broadcast wave is recorded into the secondary storage unit 1307 is described.

Figure 15:
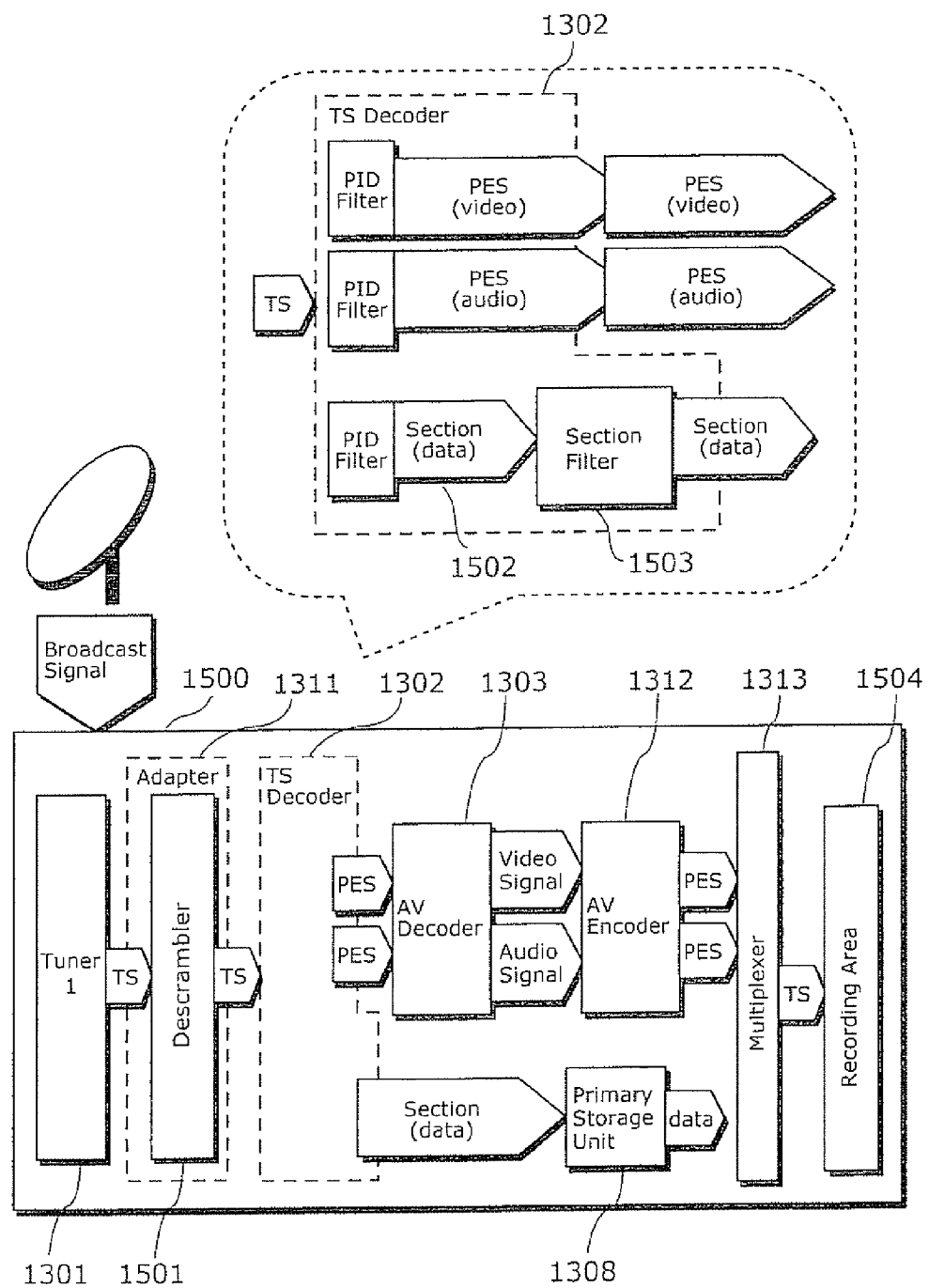
FIG. 15 is an example of a device connection at the time of recording, in the recording and reproduction apparatus according to the present invention.

FIG. 15 shows a conceptual diagram which represents the physical connection sequence, processing details, and input/output data format of each device during recording of the service 1500 is a terminal apparatus, which has: the tuner 1301; the adapter 1311; a descrambler 1501; the TS decoder 1302; a PID filter 1502; a section filter 1503; the AV decoder 1303; the primary storage unit 1308; the AV encoder 1312; the multiplexer 1313; and a recording area 1504. Constituent elements in FIG. 15 that have the same reference numbers as in FIG. 13 have the same functions and thus description is omitted.

First, the tuner 1301 performs tuning on the broadcast wave in accordance with tuning information specified by the CPU 1306. Here, tuning information is information in which a frequency, a modulation method, and the like can be specified. The tuner 1301 demodulates the broadcast wave and inputs the MPEG-2 transport stream into the adapter 1311.

The descrambler 1501, which is included in the adapter 1311, descrambles the MPEG-2 transport stream based on conditional access information for each viewer. The descrambled MPEG-2 transport stream is inputted into the TS decoder.

Two types of devices that process the MPEG-2 transport stream are present within the TS decoder 1302: the PID filter 1502 and the section filter 1503.

The PID filter 1502 extracts, from the inputted MPEG-2 transport stream, a TS packet that has a PID specified by the CPU 1306, and then extracts a PES packet and an MPEG-2 section present in that payload. For example, when the MPEG-2 transport stream in FIG. 6 is inputted in the case where the CPU 1306 has instructed PID filtering which extracts the TS packet with a PID=100, packets 601 and 603 are extracted, then concatenated, and thus a PES packet of a video 1 is reconfigured. Or, when the MPEG-2 transport stream in FIG. 6 is inputted in the case where the CPU 1306 has instructed PID filtering which extracts the TS packet with a PID=200, packets 602 and 605 are extracted, then concatenated, and thus an MPEG-2 section of data 1 is reconfigured.

The section filter 1503 extracts the MPEG-2 section which conforms to a section filter condition specified by the CPU 1306 from among the inputted MPEG-2 sections, and DMA-transfers this MPEG-2 section to the primary storage unit 1308. For example, it is assumed that the CPU 1306 specifies, for the section filter 1503, PID filtering which extracts the TS packet with a PID=200, and section filtering which extracts a section with a table_id of 64. As mentioned earlier, after the MPEG-2 section of the data 1 is reconfigured, the section filter 1503 extracts only the section with a table_id of 64 from among those MPEG-2 sections, and DMA-transfers this to the primary storage unit 1308.

The MPEG-2 section that is inputted into the primary storage unit 1308 is inputted into the multiplexer 1313.

A video PES packet and an audio PES packet extracted by the TS decoder 1302 are inputted into the AV decoder 1303.

The AV decoder decodes the video PES packet so as to convert it into the video, and inputs this into the AV encoder

1312. The AV decoder also decodes the audio PES packet so as to convert it into the audio, and inputs this into the AV encoder 1312.

The AV encoder 1312 converts the video into MPEG video and inputs this into the multiplexer 1313. The AV encoder 1312 also converts the audio into MPEG audio and inputs this into the multiplexer 1313.

The multiplexer 1313 multiplexes the MPEG video and MPEG audio inputted form the AV encoder into the MPEG-2 section inputted from the primary storage unit 1308, and thus generates an MPEG-2 transport stream. The generated MPEG-2 transport stream is recorded into the recording area 1504.

The recording area 1504 is made up of the whole or a part of the secondary storage unit 1307, or another recording area, and stores the MPEG-2 transport stream that makes up a service.

Next, the operation is described in which the service is consecutively read out from the secondary storage unit 1307 and reproduced.

Figure 16:
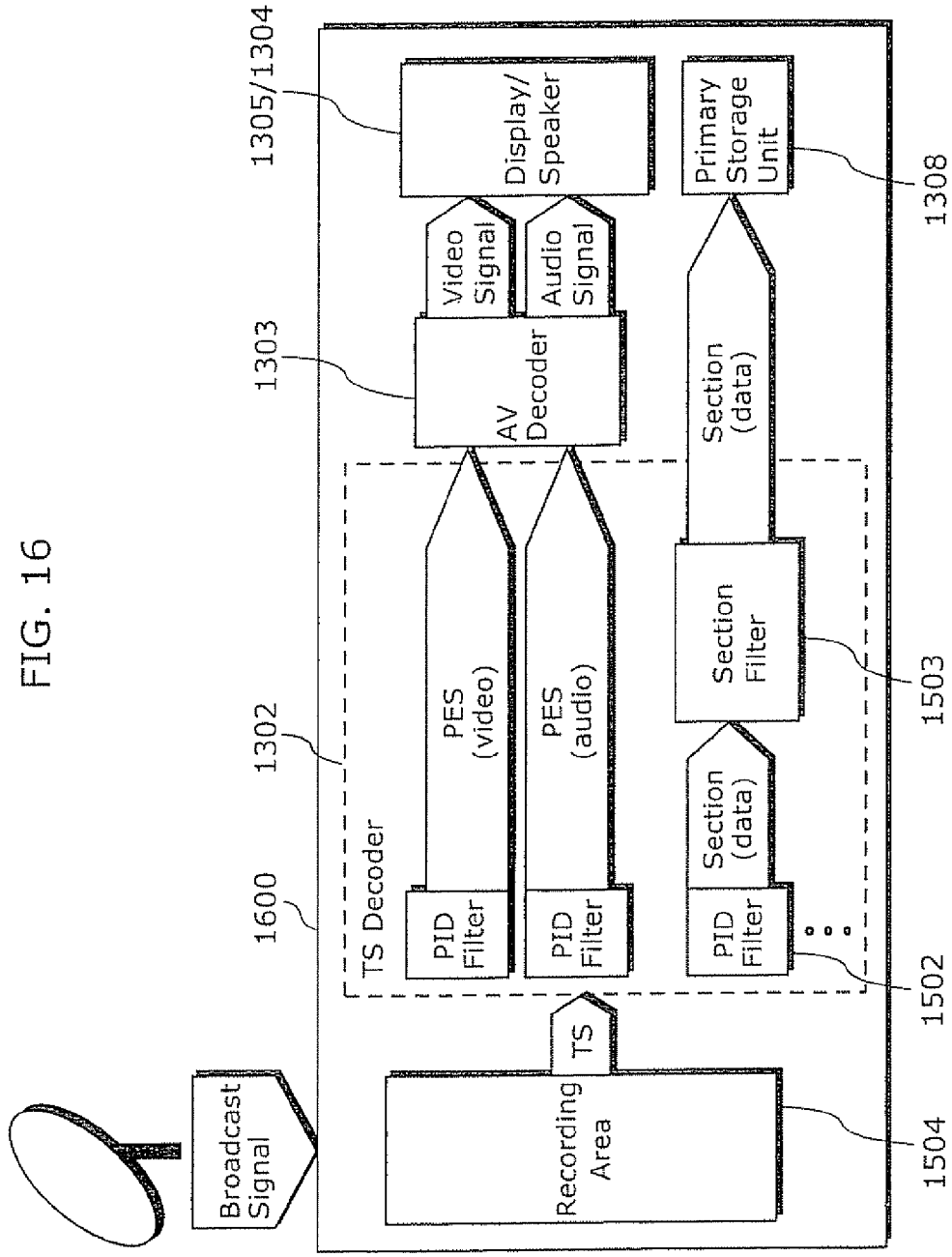
FIG. 16 is an example of a device connection at the time of reproduction, in the recording and reproduction apparatus according to the present invention.

FIG. 16 shows a conceptual diagram which represents the physical connection sequence, processing details, and input/output data format of each device during recording of the service. 1600 is a terminal apparatus, which has: the recording area 1504; the TS decoder 1302; the PID filter 1502; the section filter 1503; the AV decoder 1303; the speaker 1304; the display 1305; and the primary storage unit 1308. Constituent elements in FIG. 16 that have the same reference numbers as in FIG. 13 have the same functions, and thus description in omitted.

The MPEG-2 transport stream recorded in the recording area 1504 in the procedure described in FIG. 15 is inputted into the TS decoder 1302.

Then, a video PES and an audio PES that have the PIDs specified by the CPU 1306 are extracted by the PID filter 1502 within the TS decoder 1302. The extracted PES packets are inputted into the AV decoder 1303. Or, the MPEG-2 section that has the PID and table_id specified by the CPU 1306 is extracted by the PID filter 1502 and the section filter 1503 within the TS decoder 1302. The extracted MPEG-2 section is DMA-transferred to the primary storage unit 1308.

The video PES and the audio PES inputted into the AV decoder 1303 are decoded and outputted as an audio signal and a video signal. After that, the audio signal and the video signal are inputted into the display 1305 and the speaker 1304, thus reproducing the audio and the video.

The MPEG-2 section inputted into the primary storage unit 1308 is inputted into the CPU 1306 as appropriate.

Thus far, an example of a hardware configuration regarding the present invention has been described. Hereafter, a main function of the present invention, which is control of recording and control of trick play of a service via a Java program, is described.

Recording of the service in the present invention refers to recording video, audio, a Java program, synchronization information of the Java program, and so on that are contained in the service, into a recording medium such as a hard disk, a Blu-ray Disc (BD), a Digital Versatile Disc (DVD), and a Secure Digital (SD) memory card. Reproduction of the service refers to reproduction and execution of the video, audio and Java program recorded in the recording medium, based on the synchronization information. A reproduction result of a recorded service is required to be almost equivalent to a result of directly reproducing the service upon receiving a broadcast wave.

Figure 17:
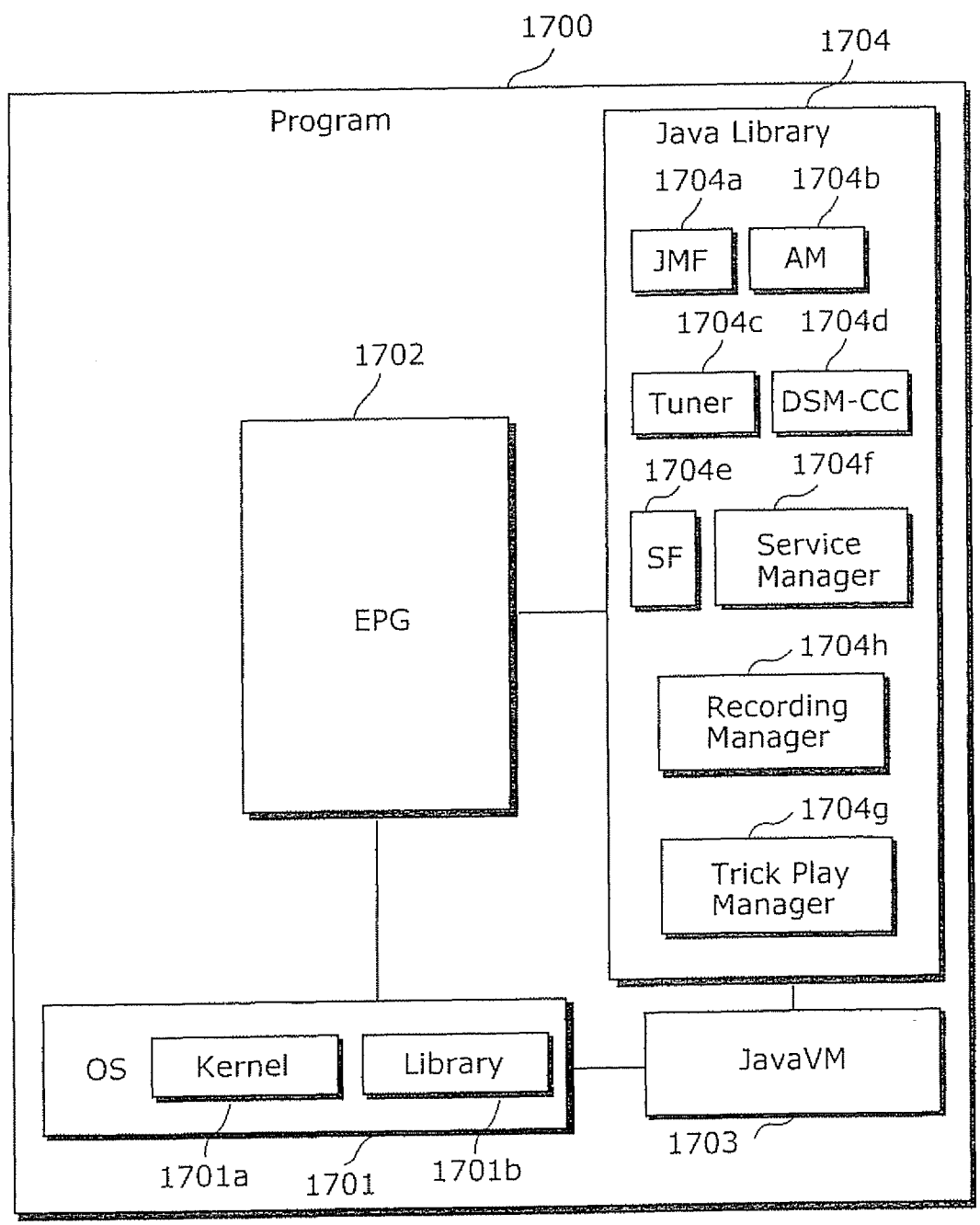
FIG. 17 is a diagram showing a structure of a program stored in a terminal apparatus according to the present invention.

FIG. 17 is a configuration diagram of a program necessary for recording and reproduction of the service, and is software recorded into the ROM 1309.

A program 1700 is made up of an OS 1701, an EPG 1702, a Java VM 1703, and a Java library 1704, which are sub-programs.

The OS 1701 is an Operating System; Linux, Windows, and the like are examples. The OS 1701 is made up of: a kernel 1701*a* for executing other sub-programs such as the EPG 1702 and the Java VM 1703; and a library 1701*b* which the sub-programs use to control the constituent elements of the terminal apparatus 1300. The kernel 1701*a* is publicly-known technology and therefore detailed description is omitted.

The library 1701*b* provides, for example, a tuning function for controlling the tuner. The library 1701*b* accepts, from another sub-program, tuning information in which a frequency, a modulation method, and the like can be specified, and supplies this to the tuner 1301. The tuner 1301 performs demodulation processing based on the provided tuning information, and can pass the demodulated MPEG-2 transport stream to the TS decoder 1302. As a result, other sub-programs can control the tuner 1301 through the library 1701*b*.

Figure 20:
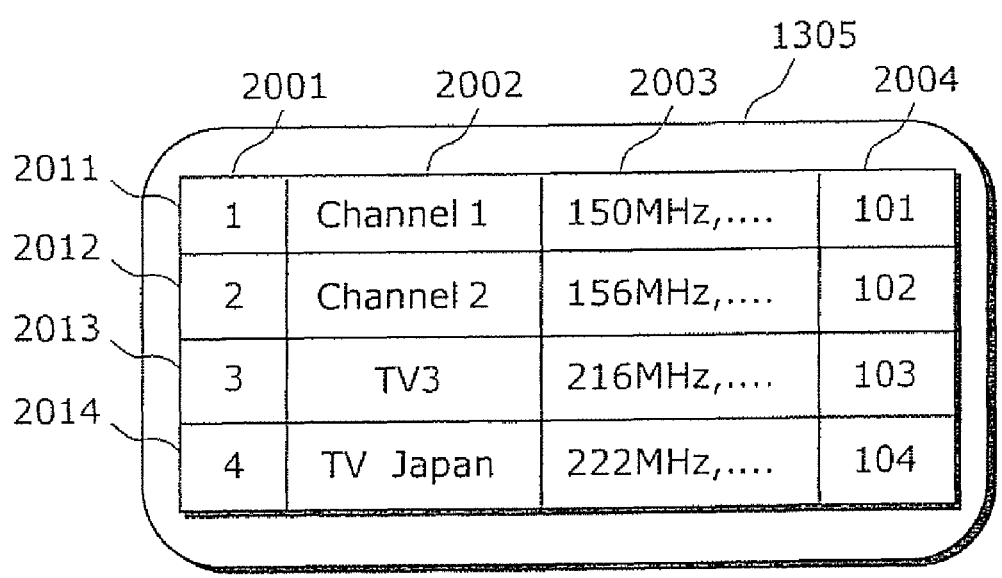
FIG. 20 is an example of information stored in a secondary storage unit according to the present invention.

Also, the library 1701*b* provides channel information for uniquely identifying a channel. An example of the channel information is shown in FIG. 20. The channel information is sent using an OOB or an In-band frequency range, is converted into a chart format by the adapter 1311, and is stored in a temporary memory unit which can be accessed by the library. A column 2001 shows channel identifiers, and is equivalent to, for example, source_IDs as defined by SCTE65 Service Information Delivered Out-Of-Band For Digital Cable Television. A column 2002 shows channel names, and is equivalent to source_name and the like, from the same SCTE65 standard. A column 2003 shows tuning information, that is information in which a frequency, a transfer rate, a modulation method, and the like can be specified, and is given to the tuner 1301. A column 2004 shows program numbers for identifying the PMTs. For example, a row 2011 is a group of service information including a channel identifier of "1", a channel name of "channel 1", a frequency of "150 MHz . . . " in the tuning information, and a program number of "101".

The JavaVM 1703 is a Java virtual machine that sequentially analyzes and executes programs written in the Java™ language. Programs written in the Java language are compiled of intermediate code which does not depend on the hardware, called bytecode. The Java virtual machine is an interpreter which executes this bytecode. The Java VM 1703 executes the Java library 1704 that is written in the Java language. Details of the Java language and Java VM are explained in publications such as "Java Language Specification" (ISBN 0-201-63451-1) and "Java Virtual Machine Specification" (ISBN 0-201-63451-X), and so on. In addition, it is possible to call or be called by other sub-programs not written in the Java language through a Java Native Interface (JNI). Details regarding the INI can be found in the book "Java Native Interface" and so on.

The Java library 1704 is a library written in the Java language and which is called by the Java program in order to control functions of the broadcast recording and reproduction apparatus. However, there are situations where a sub-program written in non-Java language, such as the library 1701*b* of the OS 1701, is used as necessary. The Java program can use a function provided by the Java library 1704 by calling a Java Application Programming Interface (API) held by the Java library 1704.

A Tuner 1704c is a Java library for controlling the In-band receiving tuner 1301a in the broadcast recording and reproduction terminal. When the Java program passes tuning information to the tuner 1704c, the tuner 1704c uses that information to call a tuning function of the library 1701b, and as a result, it is possible to control an operation of the In-band receiving tuner 1301a of the broadcast recording and reproduction terminal. Here, tuning information is information in which a frequency, a modulation method, and the like can be specified.

An SF 1704e is a lava library for controlling a function of the PID filter 1502 and the section filter 1503 of the broadcast recording and reproduction terminal. When the lava program passes filter conditions such as a PID, table_id, and the like to the SF 1704e, the SF 1704e uses a function of the library 1701b and the like based on those conditions, so as to control the PID filter 1502 and the section filter 1503, acquires an MPEG-2 section that fulfills desired filter conditions, and passes the MPEG-2 section to the Java program that set the filter conditions.

A DSM-CC 1704d is a lava library for accessing a file system of a DSM-CC object carousel. The DSM-CC object carousel is included in the MPEG-2 section acquired by the SF 1704e. The DSM-CC is defined by the ISO/IEC 13818-6 standard, and is a mechanism for using the MPEG-2 section so as to carry an arbitrary file. By using this, it is possible to send a file from a broadcast station to a terminal. A detailed method for implementing the DSM-CC is of no relation to the present invention, and therefore details are omitted.

An AM 1704b is an application manager that provides a function for managing the execution and termination of the Java application contained in the service. The AM 1704b extracts a Java program multiplexed with a specified channel of a specified MPEG-2 transport stream, and causes the execution or termination of that extracted lava program in accordance with separately-multiplexed synchronization information. A Java class file of the Java program is multiplexed into the MPEG-2 transport stream in the aforementioned DSM-CC format. In addition, the synchronization information of the lava program is multiplexed into the MPEG-2 transport stream in a format called AIT. AIT is an acronym of Application Information Table, as defined in Section 10 of the DVB-MHP specification (ETSITS 101812 DVB-MHP specification V1.0.2, and is an MPEG-2 section with a table_id of "0x74".

Figure 46:
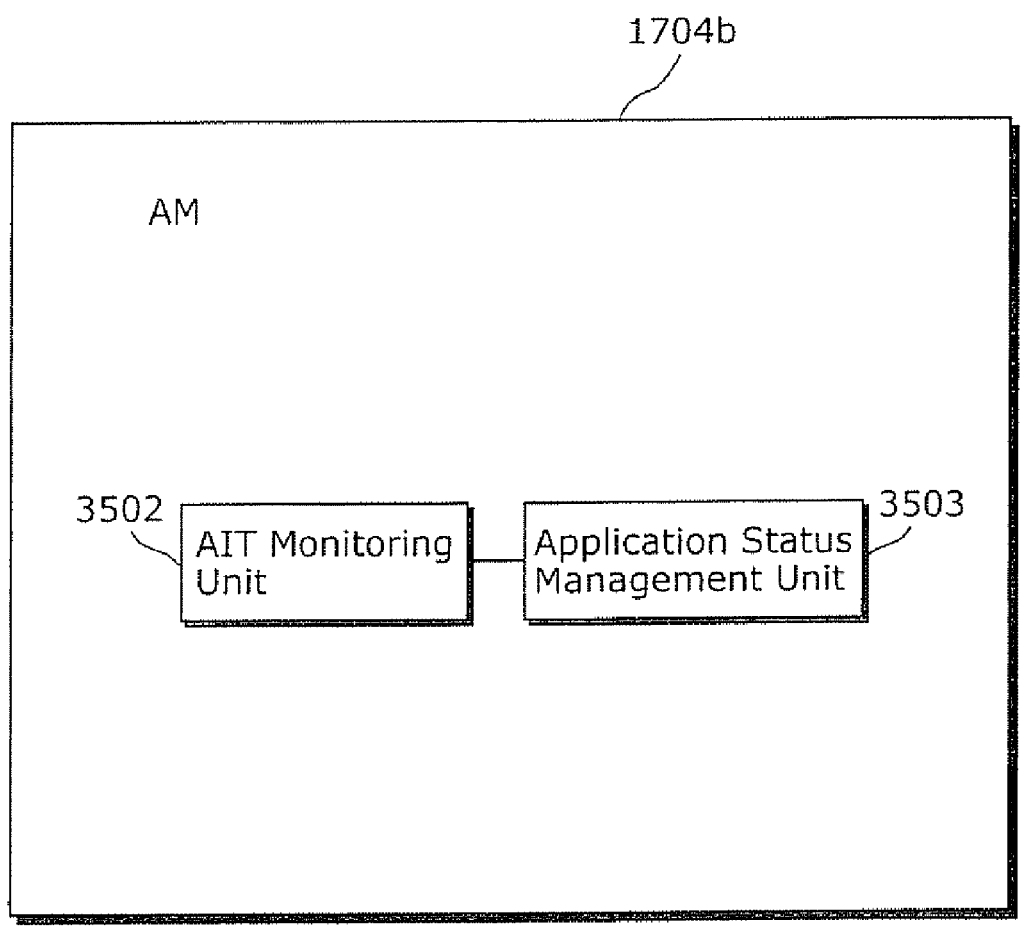
FIG. 46 is an example of a configuration of an application manager AM according to the present invention.

An internal configuration of the AM 1704b is shown in FIG. 46. The AM 1704b is configured of an AIT monitoring unit 3502 and an application status managing unit 3503.

The AIT monitoring unit 3502 monitors AIT update status, using an MPEG-2 transport stream and a channel identifier as inputs. First, the IMF 1704b searches for channel information in the library 1701b using a specified channel identifier as a key, and finds the program number. Next, using the SF 1704e and the like, a PAT is acquired from the MPEG-2 transport stream. Then, the PID of a PMT that corresponds to the obtained program number is obtained from information of the PMT. Once again, using the SF 1704e, the actual PMT is acquired. The acquired PMT is in a format as shown in FIG. 11, and has written the PID of an elementary stream that has "data" as a stream type and "AIT" as supplemental information, Furthermore, when the PID and table_id "0x74" of the AIT now obtained as the filter conditions are given to the SF 1701e, the actual AIT is obtained.

Figure 22:
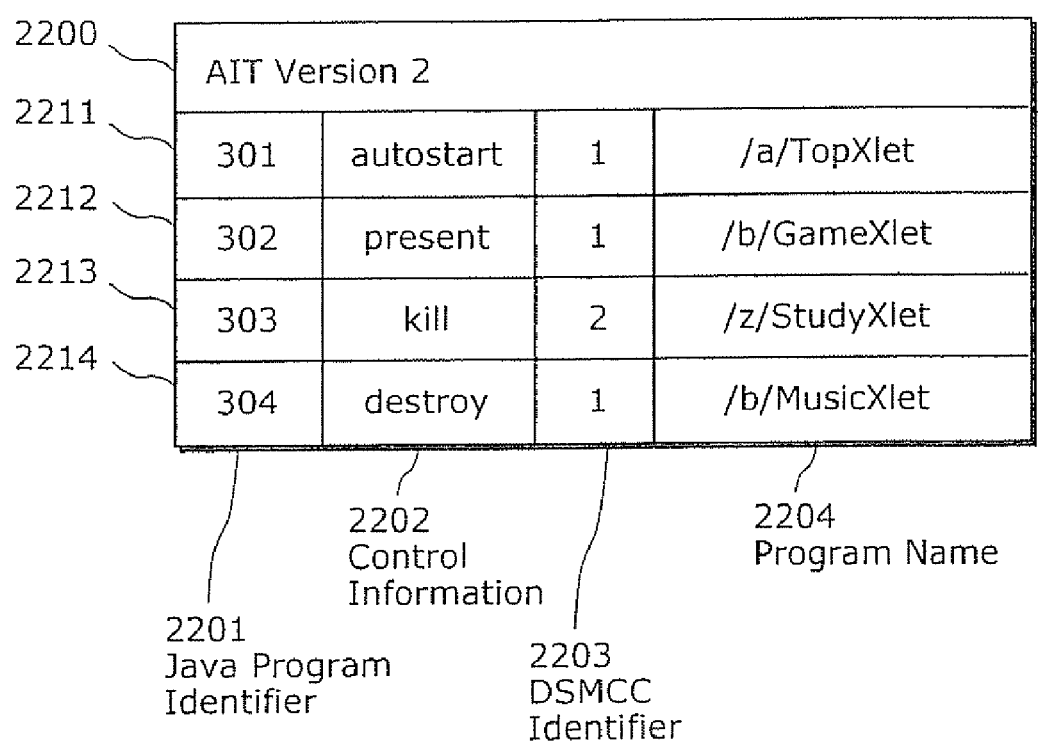
FIG. 22 is a schematic diagram showing the details of an AIT specified in the DVB-MHP standard according to the present invention.

FIG. 22 is a chart that schematically shows an example of the AIT information. An AIT version number 2200 expresses the version of that AIT. The higher the version of the AIT is, the newer the AIT is. An AIT of the same AIT version is repeatedly received, but the AM 1704b does not analyze an AIT with the same AIT version as an AIT that has already been analyzed, but analyzes only an AIT that is newer than the already-analyzed AIT and performs the corresponding processing. A column 2201 shows identifiers of the lava programs. A column 2202 shows control information of the lava programs. As the control information, there are "autostart", "present", "kill", and the like; "autostart" means that the terminal apparatus 1300 executes the Java program automatically in an instant, "present" means not performing automatic execution, and "kill" means stopping the Java program. A column 2203 shows DSM-CC identifiers for extracting the PIDs that include the lava programs in the DSM-CC format. A column 2204 shows program names of the Java programs.

Rows 2211, 2212, 2213, and 2214 are a group of the information of the Java programs. The Java program defined in the row 2211 is a group including a Java program identifier "301", control information "autostart", a DSM-CC identifier "1", and a program name "a/TopXlet". Similarly, the Java program defined in the row 2212 is a group including a Java program identifier "302", control information "present", a DSM-CC identifier "1", and a program name "a/GameXlet". Here, the three Java programs defined by the rows 2211, 2212, and 2214 have the identical DSM-CC identifiers. This indicates that three Java programs are included in one file system encoded in the DSM-CC format. Here, four types of information are prescribed for the Java program, but in reality, more types of information are defined. Details can be found in the DVB-MHP specifications.

The application status management unit 3503 analyzes the details of the updated AIT and manages the execution status of the Java program. The application status management unit 3503 finds out a Java program with "autostart" within the AIT, and extracts the corresponding DSM-CC identifier and Java program name. Referring to FIG. 22, the AM 1704b extracts the Java program from the row 2211 and acquires the DSM-CC identifier of "1" and the Java program name of "a/TopXiet". Next, the AM 1704b uses the DSM-CC identifier acquired from the AIT so as to acquire, from the PMT, the PID of the TS packet storing the Java program in the DSM-CC format. Specifically, the PID of the elementary stream with a conforming DSM-CC identifier in the supplementary information and which has a stream type of "data" is acquired from the PMT. At this time, assuming that the DSM-CC identifier is "1" and the PMT is as in FIG. 11, the elementary stream of the row 1114 conforms to them, and the PID "5014" is fetched.

The AM 1704b prescribes, to the SF 1704e, the section filter conditions, and the PID of the TS packet which sends the MPEG-2 section embedded with data in the DSM-CC format. Here, the PID "5014" is given. As a result, the AM 1704b can collect the necessary DSM-CC MPEG-2 sections. The AM 1704b reconstitutes the file system from the collected MPEG-2 sections in accordance with the DSM-CC format, and saves the file system into the primary storage unit 1308. Fetching data such as a file system from a TS packet in an MPEG-2 transport stream and saving the data into a storage means such as the primary storage unit 1308 and the secondary storage unit 1307 is hereafter called downloading.

Figure 23:
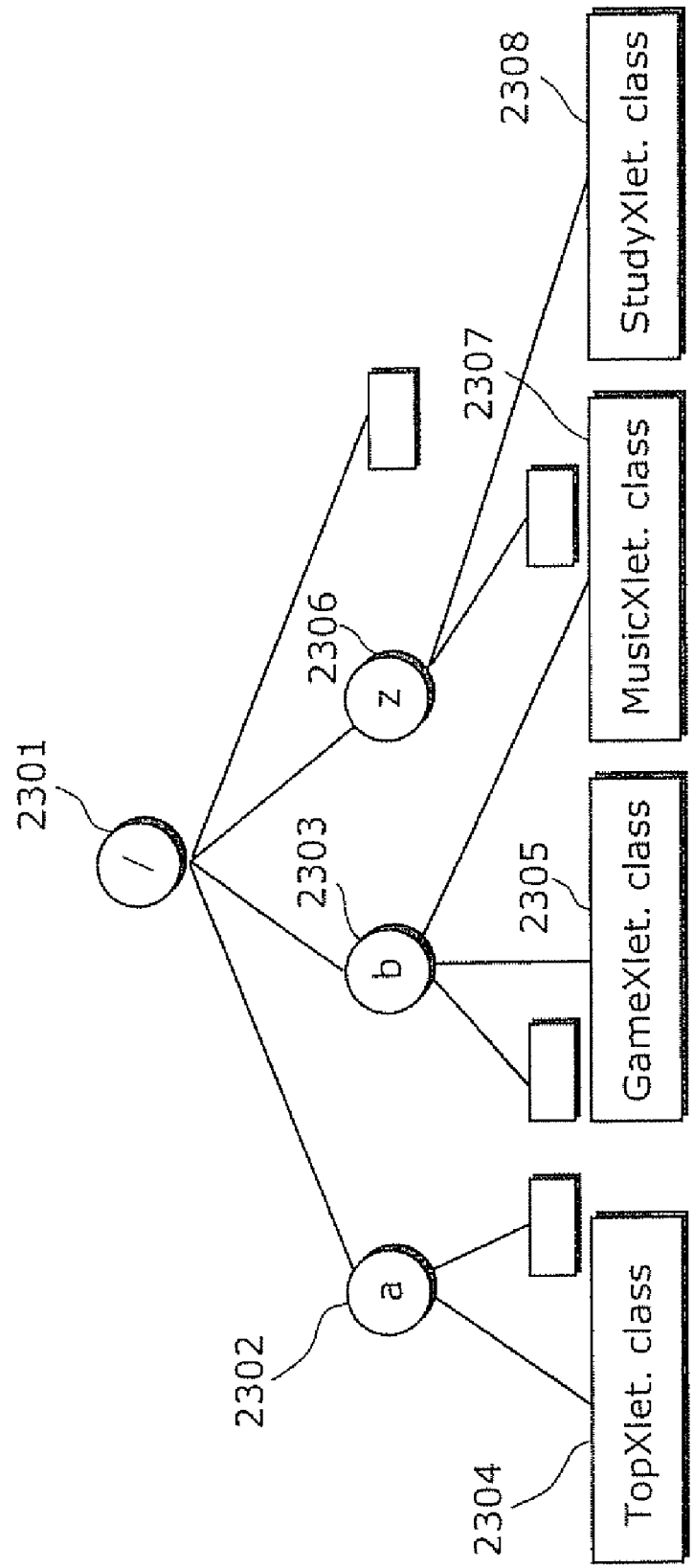
FIG. 23 is a schematic diagram showing a file system sent in DSM-CC format according to the present invention.

FIG. 23 is an example of a downloaded file system. In the diagram, a circle represents a directory and a square represents a file. 2301 is a root directory, 2302 is a directory "a", 2303 is a directory "b", 2304 is a file "TopXlet.class", 2305 is a file "GameXlet.class", 2306 is a directory "z", 2307 is a file "MusicXlet.class", and 2308 is a file "StudyXlet.class", Next, from among the downloaded file systems in the primary storage unit 1308, the AM 1704b passes the lava program to be executed to the Java VM 1703. Here, when the name of the Java program to be executed is "A/TopXlet", the file "a/TopXlet.class", in which ".class" is added to the end of the Java program name, is the file to be executed. "/" is a directory and file name division, and referring to FIG. 23, the file 2304 is the Java program which should be executed. Next, the AM 1704b passes the file 2304 to the JavaVM 1703, and the file is executed, as a Java program, on the JavaVM.

Every time receiving an AIT with a new AIT version, the AM 1704b analyzes the AIT and changes the execution status of the Java program. Here, in the case where "kill" is specified in the control information, the AM 1704b terminates the Java program and notifies the trick play instructing program determination unit 2702 of the Java program identifier of the terminated Java program.

The JMF 1704a handles control of reproduction of the video and audio contained in the service. To be more specific, the JMF 1704a inputs the video ES and audio ES multiplexed on the specified channel of the specified MPEG-2 transport stream, into the AV decoder for reproduction. In the case where the service is reproduced directly from the received broadcast wave, it is instructed to reproduce the MPEG-2 transport stream outputted from the adapter 1311. On the other hand, in the case where the service has been stored once in the secondary storage unit 1307 is reproduced, it is instructed to reproduce the MPEG-2 transport stream outputted from the recording area 1504 in the secondary storage unit 1307.

First, the JMF 1704a searches for channel information in the library 1701b with a specified channel identifier as a key, and acquires the program number. Next, using the SF 1704e and the like, a PAT is acquired from the MPEG-2 transport stream. Then, the PID of the PMT that corresponds to the acquired program number is obtained from the information of the PMT. Once again, using the SF 1704e, the actual PMT is acquired. The acquired PMT is in a format as shown in FIG. 11, and has written the PIDs of elementary streams that have "video" and "audio" as the stream types. When the JMF 1704a sets these PIDs to the PID filter 1502 of the TS decoder 1302, the video ES and audio ES multiplexed with these PIDs are reproduced through the AV decoder 1303, as shown in FIG. 15 or FIG. 16.

Here, in the case where the JMF 1704a receives, as an input, an MPEG-2 transport stream which has already been recorded in the secondary storage unit, the JMF 1704a can change the reproduction speed of video and audio by changing the reading speed and reading position in the MPEG-2 transport stream from a storage area 1607 of the secondary storage unit 1307. Thus, trick play such as fast-forward and skip becomes possible. For example, if an MPEG-2 transport stream is read out at the double speed of the normal speed, video and audio are also reproduced at the double speed. In addition, if an MPEG-2 transport stream is read out while skipping only a specific interval of time, video and audio are reproduced while skipping it. By using the function of the library 1701b, the JMF 1704a controls the secondary storage unit 1307 and changes the reading speed and reading position in an MPEG-2 transport stream. Since the method for performing such trick play smoothly and in a high level is out of the scope of the present invention, the description thereof is omitted.

In order for a Java program to instruct trick play, the MF 1704a provides an API such as setRate (float factor) to the Java program. When 1.0 is set for a parameter factor, normal speed reproduction is performed, and when 2.0 is set, trick play at the double speed is performed. Furthermore, in the case where a Java program instructs trick play through an API, the JMF 1704a notifies the trick play instructing program information holding unit 1703 of the Java program identifier identifying that Java program.

Having a channel identifier, start time, and end time as inputs, the recording manager 1704h records the service into the secondary storage unit 1307, only for the period of time between the specified start time and end time of the service. For example, if the EPG 1702 specifies the channel identifier, start time, and end time, the recording manager 1704h stands by until the start time. After that, it starts recording the specified service when the start time is reached, and it stops recording when the end time is reached. Details are described below.

At the recording start time, the recording manager 1704h first secures, within the secondary storage unit 1307, a recording area 1504 for recording the MPEG-2 transport stream from the start time to the end time specified in the secondary storage unit 1307. A media identifier is supplied to the secured recording area. Next, using a channel identifier as a key, the recording manager 1704h obtains tuning information that corresponds to that channel identifier, from the channel information held in the library 1701b. After that, when it gives the tuning information to the Tuner 1704c, the Tuner 1704c starts tuning. Here, tuning information is information in which a frequency, a modulation method, and the like can be specified. Then, as shown in FIG. 15, the MPEG-2 transport stream is inputted into the TS decoder via the adapter 1311.

Meanwhile, using the SF 1704e, the recording manager 1704h acquires the PAT from the MPEG-2 transport stream obtained through the tuning. Furthermore, it searches the library 1701b to find out the program number corresponding to the specified channel identifier, and searches the PAT to find out the PID of the PMT corresponding to the obtained program number. After that, using the SF 1704e, it acquires the actual PMT so as to obtain all the PIDs of the ESs which make up the specified channel. The recording manager 1704h sets the obtained PIDs to the PID filter 1502 of the TS decoder. The recording manager 1704h further sets the output destination of each hardware configuration element via the library 1701b, in accordance with the operation of recording the service included in the broadcast wave into the secondary storage unit 1307. Then, in accordance with the flow explained in FIG. 15, all ESs that make up a desired channel are recorded into the recording area 1504 that has been secured.

After that, when the specified end time is reached, the recording manager 1704h stops the tuning process of the Tuner 1704c, and causes the writing of the MPEG-2 transport stream into the recording area 1504 to end. In addition, a record information management table as shown in FIG. 21 is created as management information of the MPEG-2 transport stream which has been recorded earlier.

FIG. 21 is an example of the record information management table for managing the record information recorded into the recording area 1504 of the secondary storage unit 1307 and the like. The record information is recorded in chart format. A column 2101 shows record identifiers. A column 2102 shows channel identifiers. A column 2103 shows program numbers. A column 2104 shows record start times for respective services, and a column 2105 shows record end times for the services. A column 2106 shows media identifiers that identify the MPEG-2 transport streams that are recorded as services. Each of the rows 2111 to 2112 is a group of each record identifier, channel identifier, program number, start time, end time, and media identifier. For example, the row 2111 shows a record identifier of "000", a channel identifier of "2", a program number of "102", a start time of "2005/03/30 11:00", an end time of "2005/03/30 12:00", and a media identifier of "TS_001".

The service manager 1704*f* manages reproduction of the service within the MPEG-2 transport stream that has been recorded into the secondary storage unit 1307, or the service within the MPEG-2 transport stream inputted from the adapter 1311.

Hereafter, an operation in the case of managing reproduction of the service contained within the MPEG-2 transport stream which has been recorded in the secondary storage unit 1307 is described. This is equivalent to reproduction of an already-recorded service. In this case, the service manager 1704*f* has the record identifier as an input. The service already recorded in the secondary storage unit 1307 and identified by that record identifier is to be reproduced.

First, referring to the record information management table created by the recording manager 1704*h*, the service manager 1704*f* obtains the channel identifier and the media identifier of the service to be reproduced, with the specified record identifier. Then, through the library 1701*b*, the service manager 1704*f* instructs the secondary storage unit 1307 to output, to the TS decoder 1302, the MPEG-2 transport stream identified by the obtained media identifier. It also sets the output destination of each hardware configuration element, via the library 1701*b*, so that the data flows through the path shown in FIG. 16. After that, the secondary storage unit 1307 is provided to the JMF 1704*a* as the location of the MPEG-2 transport stream, and the channel identifier of the service to be reproduced is provided. Then, through the operation described above, the JMF1704*a* starts reproduction of the audio and video multiplexed into the MPEG-2 transport stream outputted from the secondary storage unit 1307. After that, the secondary storage unit 1307 is also provided to the AM 1704*b* as the location of the MPEG2 transport stream, and the channel identifier of the service to be reproduced is provided. Then, in accordance with the AIT multiplexed into the MPEG-2 transport stream outputted from the secondary storage unit 1307, the AM 1704*b* starts execution and termination of the Java program multiplexed into the MPEG-2 transport stream outputted from the secondary storage unit 1307. After that, reproduction of the above-mentioned service is continued until the end of the MPEG-2 transport stream outputted from the secondary storage unit 1307.

On the other hand, the case of managing reproduction of the service within the MPEG-2 transport stream inputted from the adapter 1311 is described hereafter. This is equivalent to reproducing the service directly from the broadcast wave. In this case, the service manager 1704*f* has the channel identifier of the service to be reproduced as an input.

Through the library 1701, the service manager 1704*f* instructs the MPEG-2 transport stream outputted from the adapter 1311 of FIG. 15 to be outputted to the TS decoder 1302. It also sets the output destination of each hardware configuration element, via the library 1701*b*, so that the data flows through the path shown in FIG. 16. After that, the adapter 1311 is provided to the JMF 1704*a* as the location of the MPEG-2 transport stream, and the channel identifier of the service to be reproduced is provided. Then, through the operation described above, the JMF 1704*a* starts reproduction of the audio and video multiplexed within the MPEG-2 transport stream outputted from the adapter 1311. Furthermore, the adapter 1311 is also provided to the AM 1704*b* as the location of the MPEG-2 transport stream, and the channel identifier of the service to be reproduced is provided. Then, in accordance with the AIT multiplexed into the MPEG-2 transport stream outputted from the adapter 1311, the AM 1704*b* commences execution and termination of the Java program multiplexed into the MPEG-2 transport stream outputted from the secondary storage unit 1307. After that, reproduction of the service is continued until the end of the MPEG-2 transport stream outputted from the secondary storage unit 1307.

The trick play manager 1704*g* monitors the execution status of an application of a service which is currently being reproduced, and monitors and controls the state of the trick play.

Figure 27:
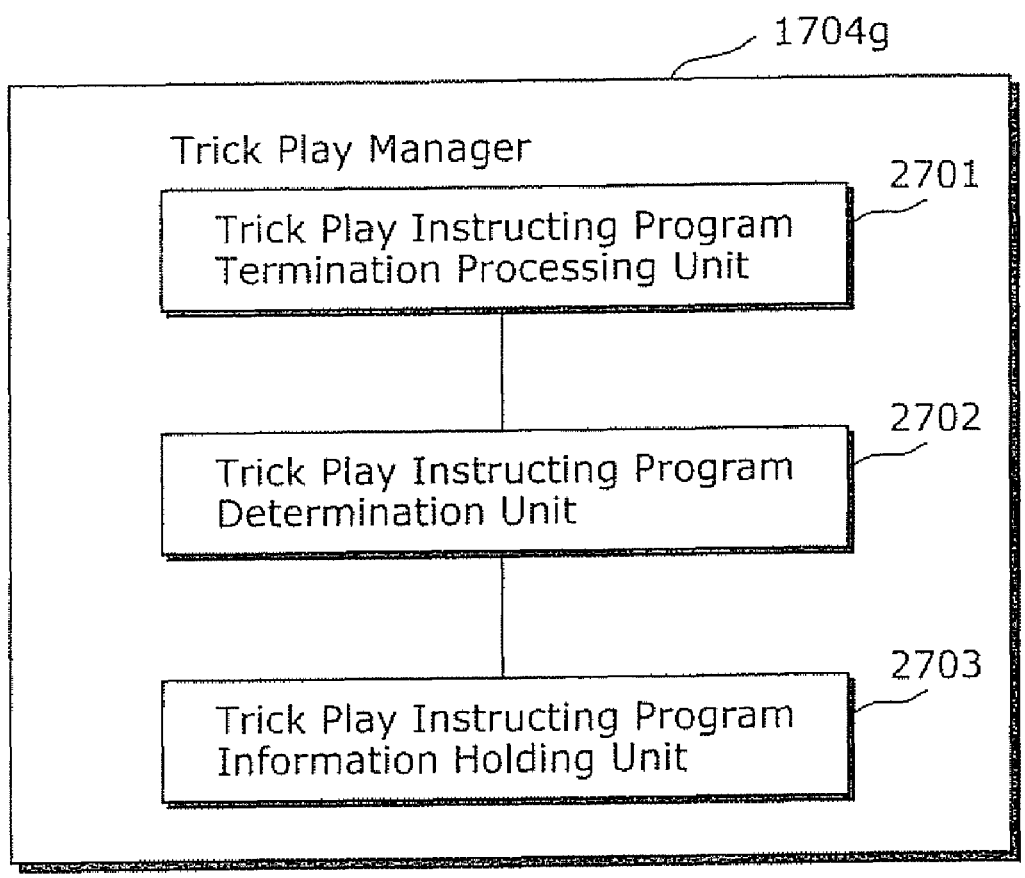
FIG. 27 is an example of a trick play manager according to the present invention.

FIG. 27 is a diagram showing a detailed configuration of the trick play manager 1704*g*.

The trick play instructing program information holding unit 2703 stores "a Java program identifier of a Java program which instructed trick play" notified from the JMF 1704*a*.

In the case where "a Java program identifier of a terminated Java program" is notified from the AM 1704*b*, the trick play instructing program determination unit 2702 judges whether or not the notified Java program identifier is identical to "the Java program identifier of the Java program which instructed the trick play" stored in the trick play instructing program information holding unit 2703. Since the fact that these Java program identifiers are identical is equivalent to that a program which instructed the current trick play for the service through the JMF 1704*a* has been terminated, the trick play instructing determination unit 2702 instructs the trick play instructing program termination processing unit 2701 to perform prescribed processing.

The trick play instructing program termination processing unit 2701 cancels the trick play for the service which is currently under the trick play. In other words, 1.0 is set as a parameter factor, so that the setRate (float factor) API of the JMF 1704*a* is called to reproduce the service at a normal speed.

The EPG 1702 is an Electric Program Guide, and is a function which causes a user to choose a TV show to be recorded and reproduced. Normal reproduction through receiving a broadcast wave is out of the scope of the present invention and thus description is omitted.

Figure 19:
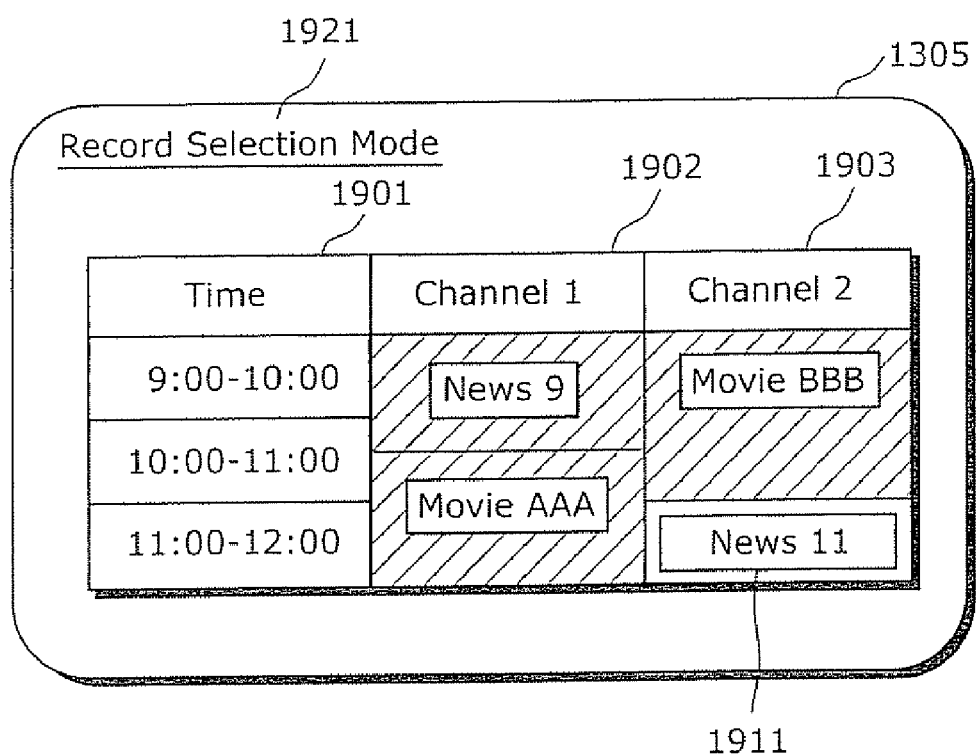
FIG. 19 is an example of an EPG executed by a terminal apparatus according to the present invention.

In the case of recording the TV show, the EPG 1702 displays a list of broadcasted TV shows, and causes the user to choose a desired TV show. FIG. 19 is an example of a screen display for causing selection of a TV show to be recorded. A time 1901 and channels 1902 and 1903 are displayed in a grid, and it is possible to check the TV shows of each recordable channel at each time. It is possible for the user to move a focus 1911 within the screen using top, bottom, right, and left cursor buttons 1401 to 1404, which are included in the input unit 1310 of the terminal apparatus 1300. Furthermore, when an OK button 1405 is pushed, the TV show which is currently highlighted is selected to be recorded. The EPG 1702 acquires the channel identifier of the TV show from the library, and when the TV show to be recorded is selected by the user, notifies the channel identifier, start time, and end time of the TV show to the recording manager 1704*h*. Based on that information, the service manager 1704*h* records the TV show into the secondary storage unit 1307.

Figure 18:
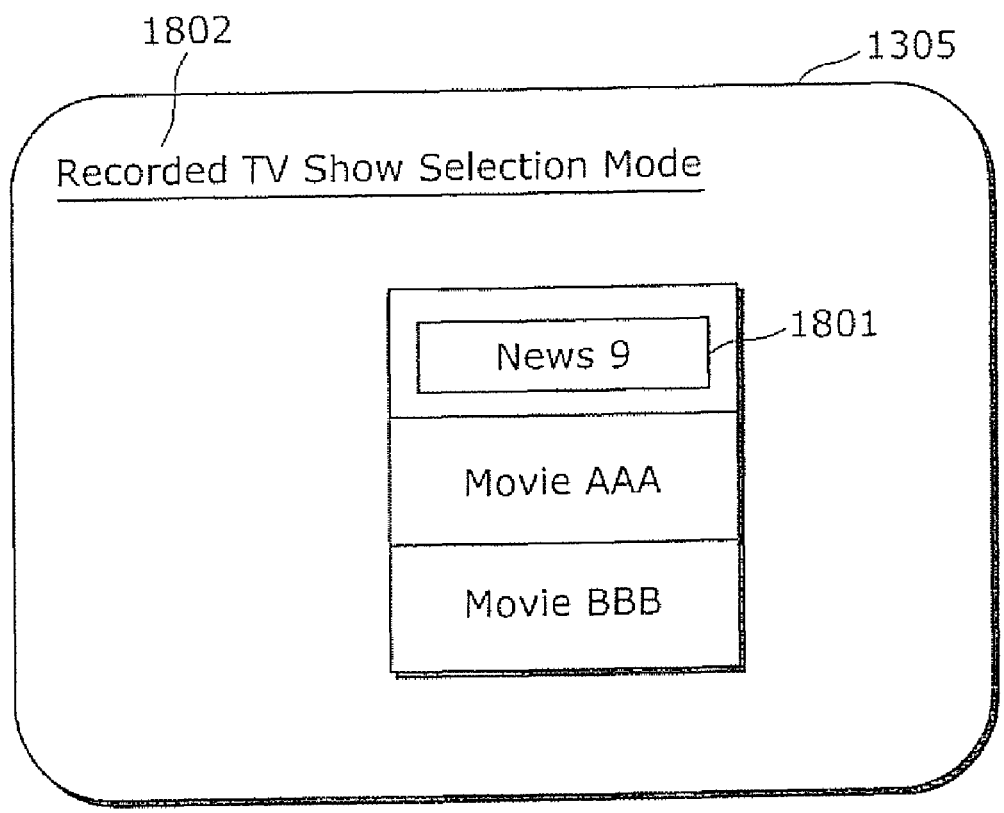
FIG. 18 is an example of an EPG executed by a terminal apparatus according to the present invention.

On the other hand, in the case of reproducing an already-recorded TV show, the EPG 1702 displays a list of the already-recorded TV shows, and causes the user to choose a desired TV show. FIG. 18 is an example of a screen display for causing selection of an already-recorded TV show. All TV shows stored in the secondary storage unit 1307 at that point in time are listed. It is possible for the user to move a focus 1801 within the screen using the top and bottom cursor buttons 1401 and 1402, which are included in the input unit 1310 of the terminal apparatus 1300. Furthermore, when the OK button 1405 is pushed, the TV show which is currently highlighted is selected to be reproduced. The EPG 1702 acquires the record identifier of the TV show from the recording manager 1704h, and when the TV show to be reproduced is selected by the user, it notifies the service manager 1704f of the record identifier of that TV show. Based on that information, the service manager 1704f reads out the TV show from the secondary storage unit 1307 and reproduces it.

A typical operation in the present embodiment having the above-explained configuration is described below using a flowchart.

Figure 30:
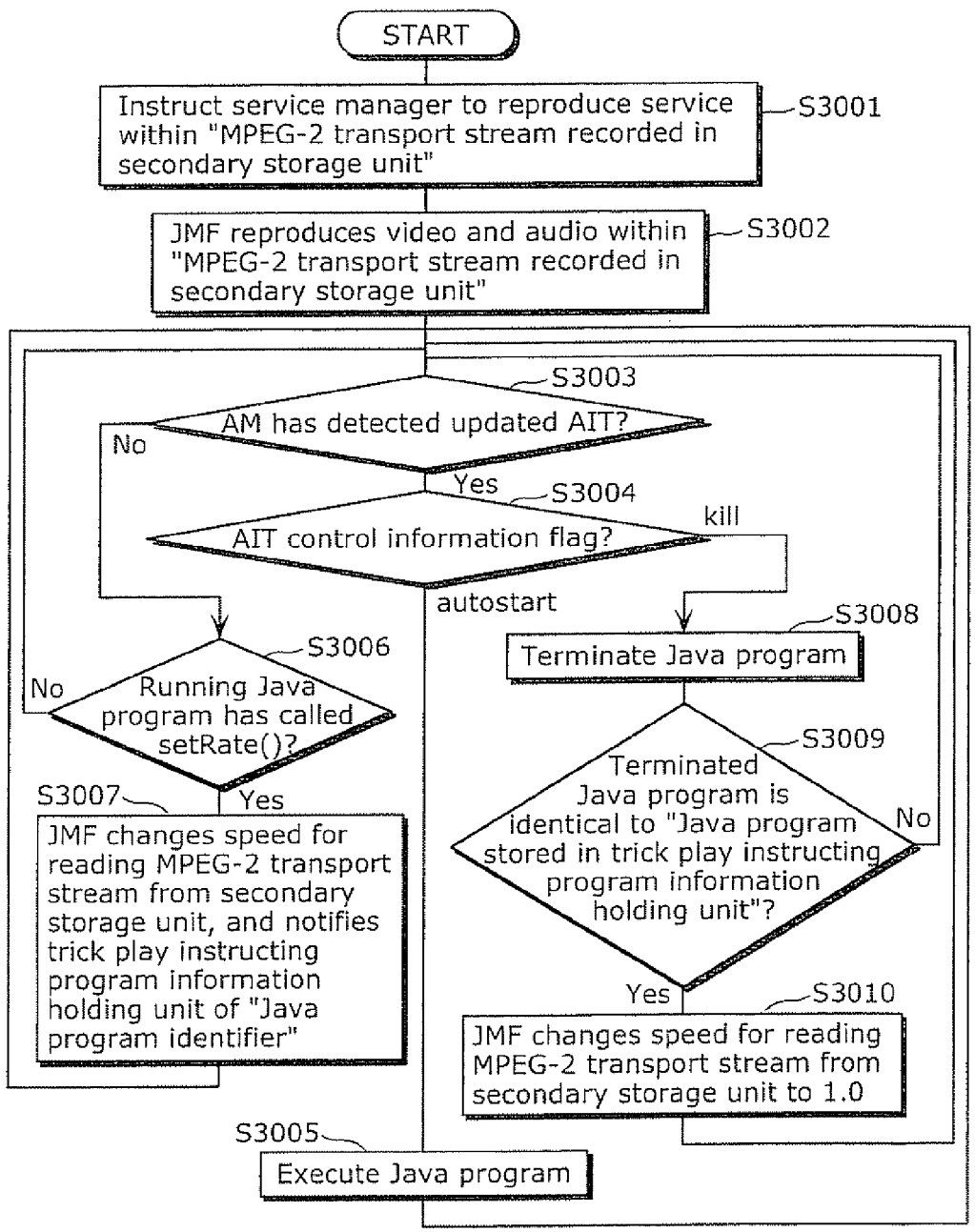
FIG. 30 is a flowchart at the time of the termination of a trick play instructing program according to the present invention.

FIG. 30 is a flowchart showing a case of reproducing a service within an MPEG-2 transport stream recorded in the secondary storage unit 1307.

First, it is assumed that a user instructs the EPG 1702 to reproduce a service within an MPEG-2 transport stream. Then, in S3001, the service manager 1704f is given an instruction to reproduce the service within the MPEG-2 transport stream recorded in the secondary storage unit 1307, and the record identifier identifying that service.

Since the service manager 1704f instructs the JMF 1704a to reproduce video and audio within the MPEG-2 transport stream recorded in the secondary storage unit 1307, the video and audio are reproduced in S3002.

In addition, since the service manager 1704f instructs the AM 1704b to detect an AIT within the MPEG-2 transport stream recorded in the secondary storage unit 1307, the AM 1704b starts detecting an AIT in S3003.

It is assumed here that an updated AIT of a new version is detected, Yes is chosen, so that the process goes to S3004. It is assumed that the Java program specified with the control information of "autostart" in AIT is found in S3004. In that case, the process goes to S3005 to execute the Java program. After that, the process returns to S3003.

Here, in the case where the updated AIT has not been detected in S3003, the process goes to S3006. It is judged in S3006 whether the Java program instructed trick play or not. Now, it is assumed that the Java program specified factor=2.0 and called setRate ( ) in S3006, that is, instructed trick play. Then, the process goes to S3007, where the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier of the Java program which has called setRate ( ), for storing it. After that, the process returns to S3003 again.

At this point of time, the service is in the trick play mode at the double speed of the normal one.

Here again, assuming that the updated AIT has been detected in S3003, the process goes to S3004. It is assumed that in the updated AIT, the control information of "kill" has been specified to the Java program which has been executed in S3005. Then, the process goes to S3008, where the AM 1704b terminates that Java program. The AM 1704b notifies the trick play instructing program determination unit 2702 of the Java program identifier of the Java program which has been terminated, and the process goes to S3009. In S3009, the trick play instructing program determination unit 2702 determines whether or not the Java program which has been terminated by the AM 1704b has a Java program identifier identical to that stored in the trick play instructing program information holding unit 2703. If they are identical, the process goes to S3010, and the trick play instructing program termination processing unit 2701 specifies factor=1.0 and calls setRate ( ). By doing so, the reproduction of the service, which has been in the trick play mode, returns to the normal reproduction speed.

As described above, according to the first embodiment, in the case where a Java program is terminated after instructing trick play of a service, the trick play of the service is automatically cancelled and returns to normal speed reproduction.

Note that it is also possible in the present embodiment to temporarily stop a service when setRate (float factor) API of the JMF 1704a is called, if the trick play instructing program termination processing unit 2701 changes the configuration for setting 0.0 as a parameter factor, instead of 1.0.

Second Embodiment

Hereafter, an apparatus and a method according to the second embodiment of the present invention are described with reference to the drawings.

Since the hardware configuration and the like used in the second embodiment are same as those in the first embodiment of the present invention, FIG. 1 to FIG. 16 are used therefor. As the constituent elements in this diagram have the same functions as in the first embodiment, descriptions are not repeated.

The software configuration of the second embodiment is same as that shown in FIG. 17 and FIG. 46. As the constituent elements other than the trick play manager 1704g are same as those in the software configuration of the first embodiment, descriptions are not repeated. As various data formats used in the second embodiment are same as shown in FIG. 20 to FIG. 23 in the first embodiment, descriptions are not repeated.

Figure 31:
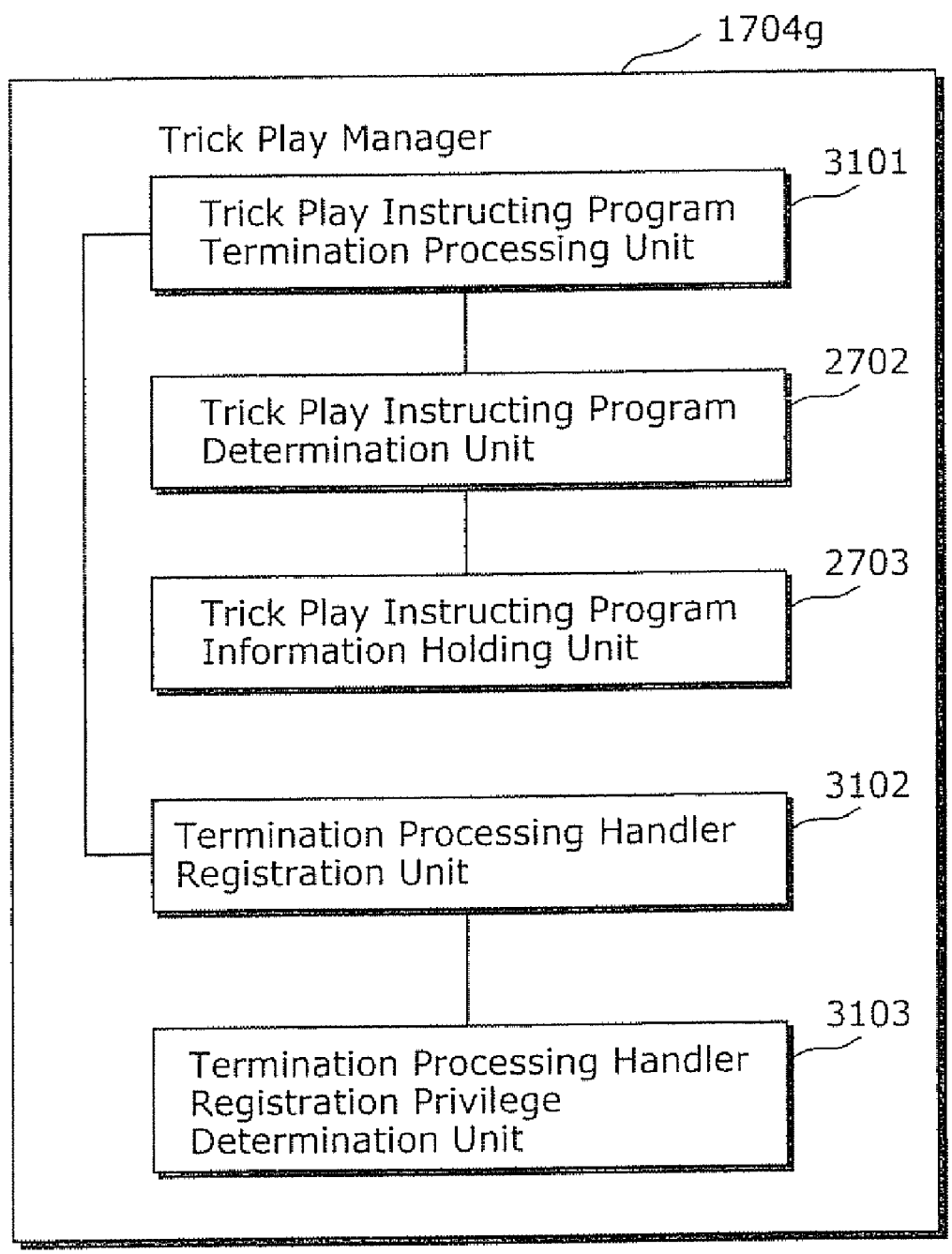
FIG. 31 is an example of a trick play manager according to the present invention.

FIG. 31 shows the configuration of the trick play manager 1704g used in the second embodiment. The trick play manager 1704g is made up of: the trick play instructing program information holding unit 2703; the trick play instructing program determination unit 2702; a trick play instructing program termination processing unit 3101; a termination processing handler registration unit 3102; and a termination processing handler registration privilege determination unit 3103.

Since the trick play instructing program information holding unit 2703 and the trick play instructing program determination unit 2702 are same as those of the first embodiment, descriptions are not repeated.

The termination processing handler registration privilege determination unit 3103 determines whether or not an identified Java program has a privilege to register a termination processing handler. When receiving a Java program identifier as an input, it checks whether or not the Java program has a permission to register a termination processing handler and outputs the result.

Here, the privilege to register the termination processing handler can be set with, for example, MonitorAppPermission and the like in the OCAP specifications. This is a method in which a permission description file is also stored in a directory where a Java program is stored and the Java program has a list of privileges permitted for the permission description file. For example, an application name is written in a file of "ocap. application name. perm" in a format like <ocap:monitorapplication name="registerTrickHandler" value=true></ocap:monitorapplication>, a Java program identified by the application name can have a privilege to register a termination processing handler The termination processing handler registration unit 3102 provides a function for allowing the Java program having the termination processing handler registration privilege to register an arbitrary Java program code as a termination processing handler A Java program code is an instance of an arbitrarily defined Java class, and using this, it is possible to write desired processing in Java language. The termination processing handler registration unit 3102 provides a Java API of registerHandler (Handler h). When this API is called with an instance of an arbitrary Java class, as a parameter h, the termination processing handler registration unit 3102 inputs the Java program identifier of the Java program into the termination processing handler registration privilege determination unit 3103 so as to inquire whether or not the Java program has a termination processing handler registration privilege. If the Java program has the termination processing handler registration privilege, the termination processing hander registration unit 3102 internally stores the termination processing handler h instance, as a termination processing handler.

The trick play instructing program termination processing unit 3101 executes the instance of the Java class stored in the termination processing handler registration unit 3101. As for the execution of an instance, a Java language code written in the instance is executed as in the execution of a Java program. There is no limit to the code details, and arbitrary program code can be written.

A typical operation in the present embodiment having the above-explained configuration is described below using a flowchart.

Figure 32:
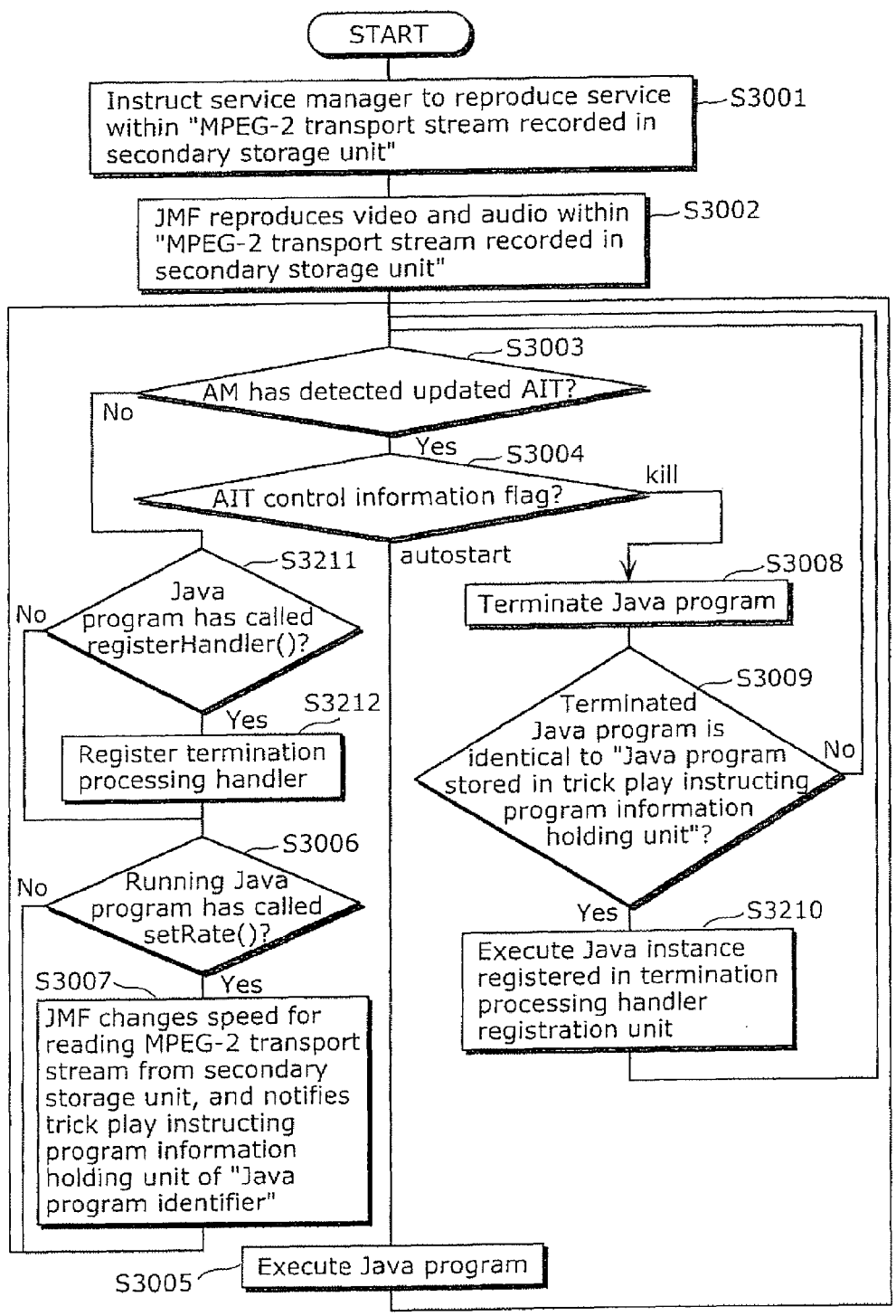
FIG. 32 is a flowchart at the time of termination of a trick play instructing program according to the present invention.

FIG. 32 is a flowchart showing the case of reproducing a service within an MPEG-2 transport stream recorded in the secondary storage unit 1307.

First, it is assumed that a user instructs the EPG 1702 to reproduce a service within an MPEG-2 transport stream. Then, in S3001, the service manager 1704f is given an instruction to reproduce the service within the MPEG-2 transport stream recorded in the secondary storage unit 1307, and the record identifier identifying that service.

Since the service manager 1704f instructs the JMF 1704a to reproduce video and audio within the MPEG-2 transport stream recorded in the secondary storage unit 1307, the video and audio are reproduced in S3002.

In addition, since the service manager 1704f instructs the AM 1704b to detect an AIT within the MPEG-2 transport stream recorded in the secondary storage unit 1307, the AM 1704b starts detecting an AIT in S3003.

Figure 33:
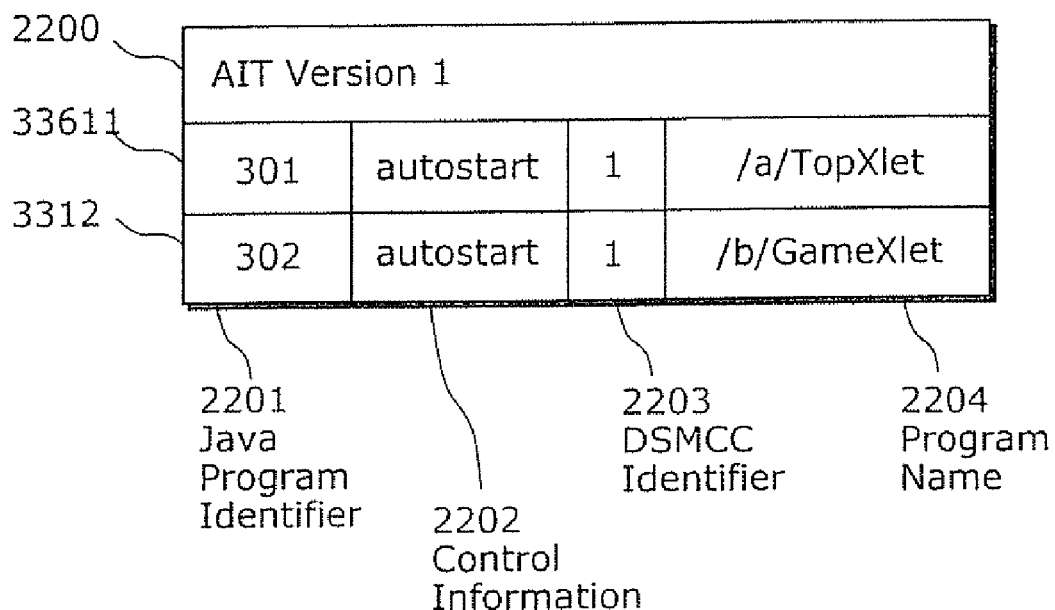
FIG. 33 is a schematic diagram showing the details of an AIT specified in the DVB-MHP standard according to the present invention.
Figure 34:
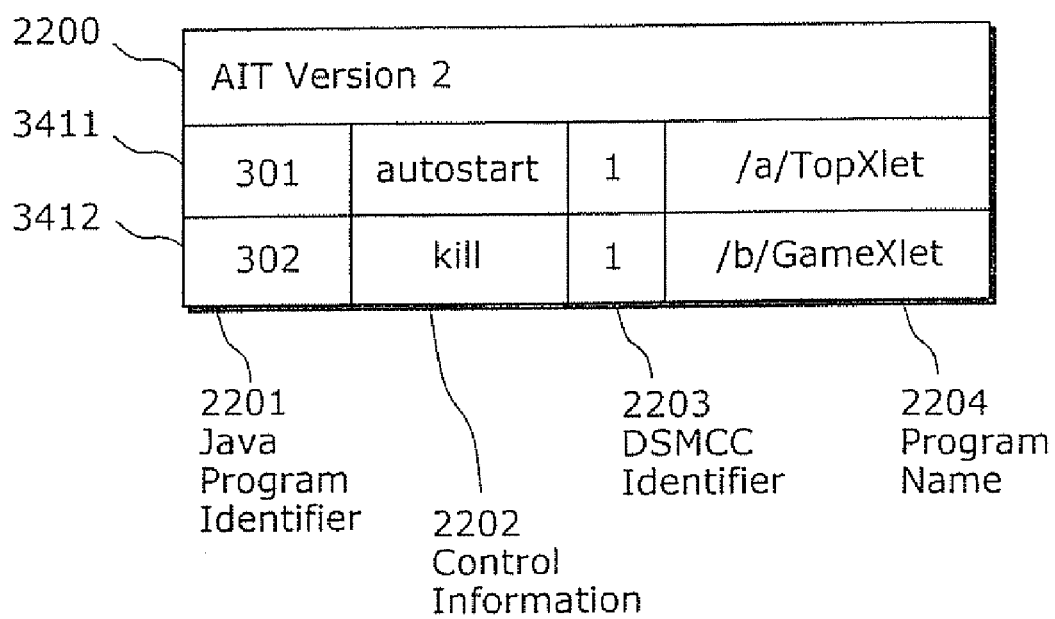
FIG. 34 is a schematic diagram showing the details of an AIT specified in the DVB-MHP standard according to the present invention.

In the second embodiment, it is assumed that the AIT of the version 1 shown in FIG. 33 and the AIT of the version 2 shown in FIG. 34 are multiplexed into the MPEG-2 transport stream. Each element in these diagrams has the same meaning as described in the first embodiment.

It is assumed here that the AIT of the version 1 is newly detected, Yes is chosen, so that the process goes to S3004. In S3004, Java program identifiers 301 and 302 are found as Java programs specified with control information of "autostart" in AIT. Therefore, regarding these Java programs, the process goes to S3005, where the Java programs are executed. After that, the process returns to S3003.

Here, in the case where the AIT updated is not detected in S3003, the process goes to S3211. It is assumed here that the Java program with the Java program identifier 302 has its own termination processing handler h. It is assumed that in that termination processing handler, setRate (1.0) is written as a Java language code for returning trick play to the normal speed. Then, the Java program with the Java program identifier 302 calls registerHandler (h) so as to register the handler h in the termination processing handler registration unit. Note that it is assumed that the Java program with the Java program identifier 302 has a privilege of registering a termination processing handler. Then, the process goes to S3006. Meanwhile, since the Java program with the Java program identifier 301 does not have a termination processing handler, it goes to S3006 without registering the termination processing handler.

It is assumed that the Java program with the Java program identifier 302 specified factor=2.0 and called setrate ( ), that is, instructed trick play in S3006. Then, the process goes to S3007. Meanwhile, the Java program with the Java program identifier 301 goes to S3007 without instructing trick play. In S3007, the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier 302 of the Java program which called setrate ( ), for storing it. After that, the process returns to S3003 again.

At this point of time, the service is in the trick play mode at the double speed of a normal one.

Assuming here that the AIT of the version 2 shown in FIG. 34 has been detected in S3003, the process goes to S3004. In the updated AIT of the version 2, "autostart" is specified for the Java program with the Java program identifier 301 executed in S3005. Since the Java program with the Java program identifier 301 has already been executed, the process goes to S3005, where the execution thereof continues. On the other hand, it is assumed that the control information of "kill" is specified to the Java program with the Java program identifier 302. Regarding the Java program with the Java program identifier 302, the process goes to S3008, where this program is terminated. The AM 1704b notifies the trick play instructing program determination unit 2702 of the Java program identifier of the Java program which has been terminated, and the process goes to S3009. In S3009, the trick play instructing program determination unit 2702 determines whether or not the Java program which has been terminated by the AM 1704b has a Java program identifier identical to that stored in the trick play instructing program information holding unit 2703. In this case, since both identifiers are 302 and identical, the process goes to S3010, where the trick play instructing program termination processing unit 2701 invokes the termination processing handler h of the Java program identifier 302 registered in the termination processing handler registration unit 3102. More specifically, it calls the Java language code of setRate (1.0) written in the termination processing handler h. By doing so, the reproduction of the service, which has been in the trick play mode, returns to the normal reproduction speed.

As described above, according to the second embodiment, it is possible to execute a separately registered termination processing handler when a Java program is terminated after the Java program instructs trick play of a service, so as to execute arbitrary Java language code.

Third Embodiment

Hereafter, an apparatus and a method according to the third embodiment of the present invention are described with reference to the drawings.

Since the hardware configuration and the like used in the third embodiment are same as those in the first embodiment of the present invention, FIG. 1 to FIG. 16 are used therefor, As the constituent elements in this diagram have the same functions as in the first embodiment, descriptions are not repeated.

The software configuration of the third embodiment is same as that shown in FIG. 17. As the constituent elements other than the AM 1704b are same as those in the software configuration of the first embodiment, descriptions are not repeated. As various data formats used in the third embodiment are same as shown in FIG. 20 to FIG. 23 in the first embodiment, descriptions are not repeated.

Figure 35:
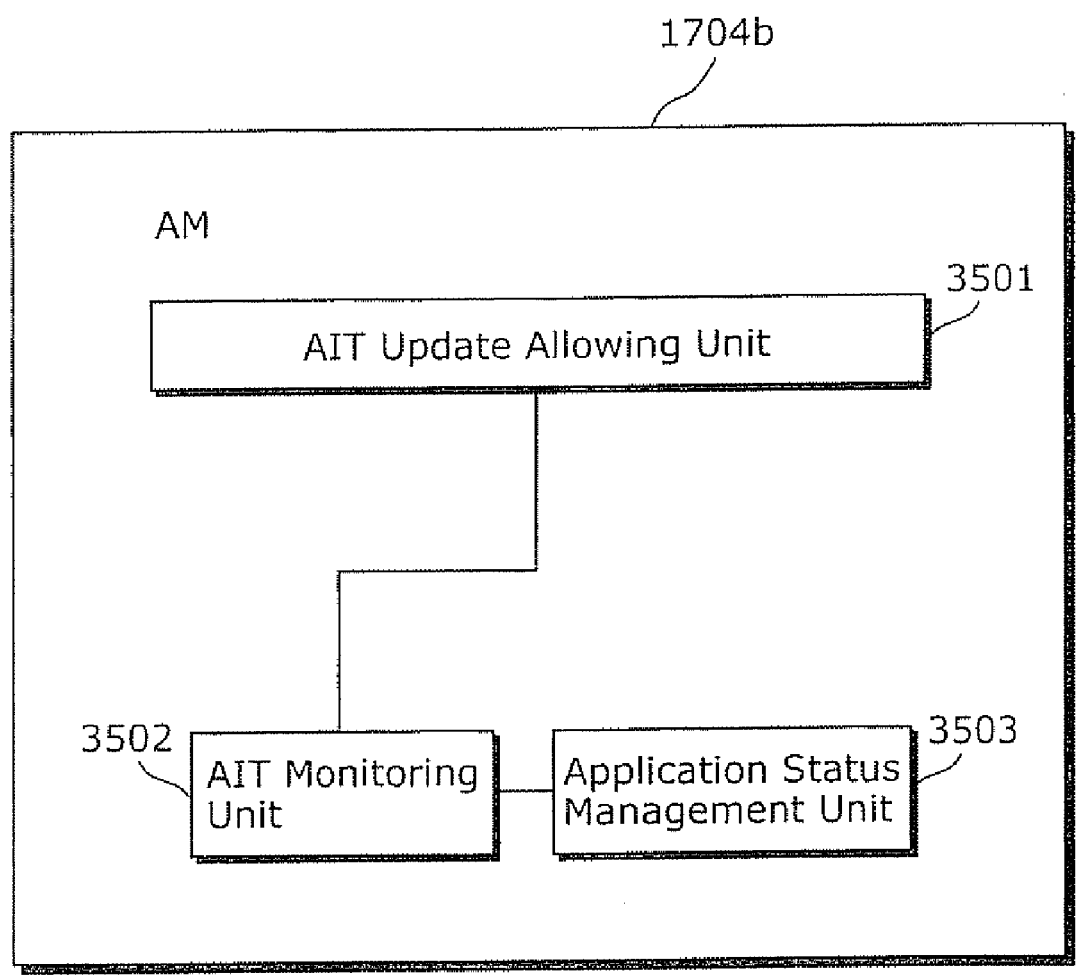
FIG. 35 is an example of a configuration of an application manager according to the present invention.

The AM 1704b has a function of ignoring an update of an AIT in accordance with the current reproduction speed, in addition to the functions of the first embodiment. FIG. 35 shows a configuration diagram of the AM 1704b in the third embodiment. Since the AIT monitoring unit 3502 and the application status management unit 3503 are same as the AIT monitoring unit 3502 and the application status management unit 3503 in the first embodiment, descriptions are not repeated. However, the present embodiment is different from the first embodiment in that an AIT update by a version-upgrade is executed only when the AIT update allowing unit 3501 allows the update. To be more specific, when the AIT monitoring unit 3502 detects a version-upgrade of an AIT, it requests the AIT update allowing unit 3501 to determine whether or not to analyze the version-upgraded AIT.

Only in the case where the speed of the trick play which is currently effective for the service is within the range of 0.0<=reproduction speed<=1.0, the AIT update allowing unit 3501 allows the analysis of the updated new AIT. When requested to determine whether to allow the analysis of the AIT, the AIT update allowing unit 3501 inquires of the JMF 1704a about the current reproduction speed. The JMF 1704a sends back the trick play speed set in setRate ( ). If the reproduction speed is in the range of 0.0<=reproduction speed<=1.0, the JMF 1704a replies that the update of the AIT is allowed, in response to the request to determine whether to update the AIT.

A typical operation in the present embodiment having the above-explained configuration is described below using a flowchart.

Figure 36:
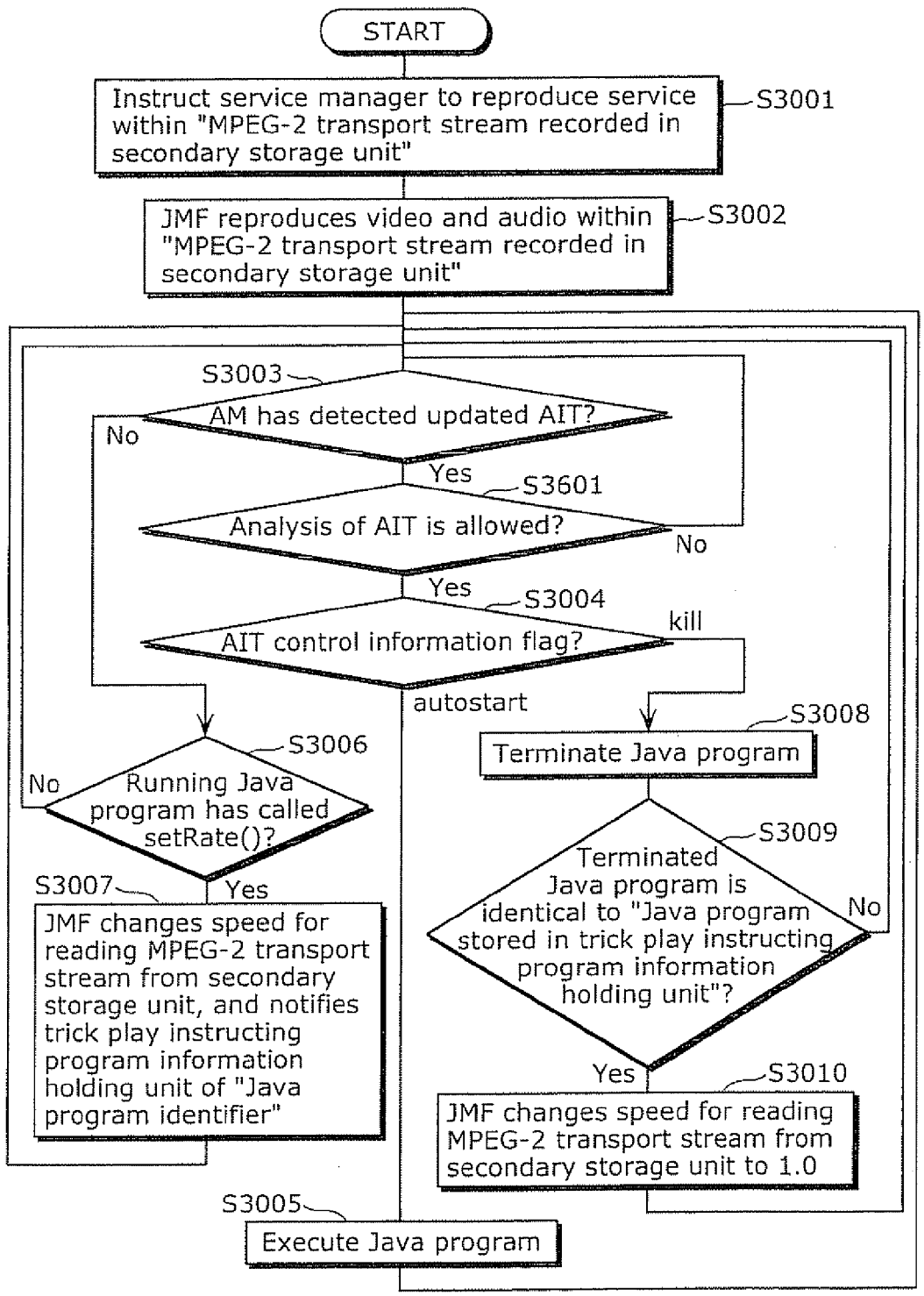
FIG. 36 is a flowchart at the time of termination of a trick play instructing program according to the present invention.

FIG. 36 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream. Then, in S3001, the service manager 1704f is given an instruction to reproduce the service within the MPEG-2 transport stream recorded in the secondary storage unit 1307, and the record identifier identifying that service.

Since the service manager 1704f instructs the JMF 1704a to reproduce video and audio within the MPEG-2 transport stream recorded in the secondary storage unit 1307, the video and audio are reproduced in S3002.

In addition, since the service manager 1704f instructs the AM 1704b to detect an AIT within the MPEG-2 transport stream recorded in the secondary storage unit 1307, the AIT monitoring unit 3502 of the AM 1704b starts detecting an AIT in S3003.

It is assumed here that an updated AIT of a new version is detected, Yes is chosen, so that the process goes to S3601. No Java program is now being executed, and no trick play is specified. Therefore, the reproduction speed is 1.0, and the AIT allowing unit 3501 allows the update of the AIT. In response to this, the AIT monitoring unit 3502 starts analyzing the AIT. In other words, Yes is chosen, so that the process goes to S3004. It is assumed that the Java program specified with the control information of "autostart" in the AIT is found in S3004. In that case, the process goes to S3005 to execute the Java program. After that, the process returns to S3003.

Here, in the case where the updated AIT has not been detected in S3003, the process goes to S3006. It is judged in S3006 whether the Java program instructed trick play or not. Now, it is assumed that the Java program specified factor=2.0 and called setRate ( ) in S3006, that is, instructed trick play. Then, the process goes to S3007, where the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier of the Java program which has called setRate ( ), for storing it. After that, the process returns to S3003 again.

At this point of time, the service is in the trick play mode at the double speed of the normal one.

Here, assuming that the updated AIT was detected again in S3003, the process goes to S3601. The AIT monitoring unit 3502 inquires of the AIT allowing unit 3501 whether or not the update of the AIT is allowed, but the current reproduction speed is 2.0 and therefore the update of the AIT is not allowed. Therefore, even if the control information of "kill" is written in the updated AIT for the running Java program, the Java program is not terminated and continued to be executed. The control returns to S3003 again.

Unless the further updated AIT is detected in S3003, the process goes to S3006. It is assumed that the Java program specified factor=0.5 and called setRate ( ), that is, instructed trick play in S3006. Then, the process goes to S3007, where the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier of the Java program which has called setRate ( ), for storing it. After that, the process returns to S3003 again.

Here, assuming that the updated AIT has been detected in S3003, the process goes to S3004. The AIT monitoring unit 3502 inquires of the AIT allowing unit 3501 whether or not the update of the AIT is allowed, but the current reproduction speed is 0.5 and therefore the update of the AIT is allowed. In response to this, the AIT monitoring unit 3502 starts analyzing the AIT which was detected this time. In other words, Yes is chosen, so that the process goes to S3004.

In S3004, it is assumed that in the updated AIT, the control information of "kill" has been specified to the Java program which was first executed in S3005. Then, the process goes to S3008, where the AM 1704b terminates that Java program. The AM 1704b notifies the trick play instructing program determination unit 2702 of the Java program identifier of the Java program which has been terminated, and the process goes to S3009. In S3009, the trick play instructing program determination unit 2702 determines whether or not the Java program which has been terminated by the AM 1704b has a Java program identifier identical to that stored in the trick play instructing program information holding unit 2703. Since they are identical this time, the process goes to S3010, and the trick play instructing program termination processing unit 2701 specifies factor=1.0 and calls setRate ( ). By doing so, the reproduction of the service, which has been in the trick play mode, returns to the normal reproduction speed.

As described above, according to the third embodiment, the analysis of the AIT is executed only in the case of the range of 0.0<=reproduction speed<=1.0. And in the case where a Java program is terminated in accordance with control information of an AIT after instructing trick play of the service, the trick play of the service is automatically cancelled and returns to normal speed reproduction.

Note that it is also possible in the present embodiment to temporarily stop a service when setrate (float factor) API of the JMF 1704a is called, if the trick play instructing program termination processing unit 2701 changes the configuration for setting 0.0 as a parameter factor, instead of 1.0.

Fourth Embodiment

Hereafter, an apparatus and a method according to the fourth embodiment of the present invention are described with reference to the drawings Since the hardware configuration and the like used in the fourth embodiment are same as those in the third embodiment of the present invention, FIG. 1 to FIG. 16 are used therefor. As the constituent elements in these diagrams have the same functions as in the third embodiment, descriptions are not repeated.

The software configuration of the fourth embodiment is same as that shown in FIG. 17 and FIG. 35. As the constituent elements except for the trick play manager 1704g are same as those in the software configuration of the third embodiment and the trick play manager 1704g is identical to that of the second embodiment, descriptions are not repeated. As various data formats used in the fourth embodiment are same as shown in FIG. 20 to FIG. 23 in the first embodiment, descriptions are not repeated.

A typical operation in the present embodiment having the above-explained configuration is described below using a flowchart.

Figure 37:
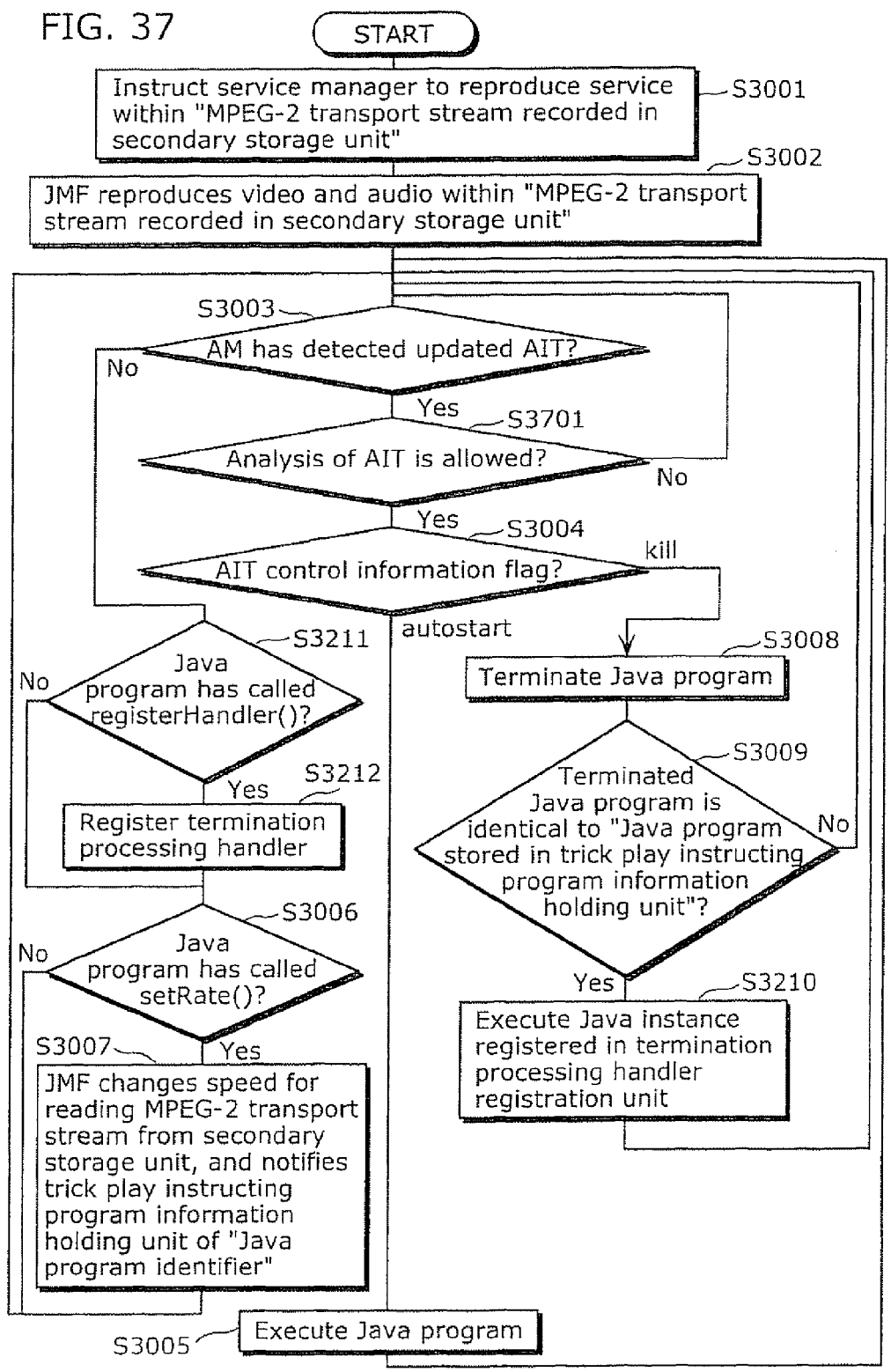
FIG. 37 is a flowchart at the time of termination of a trick play instructing program according to the present invention.

FIG. 37 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream. Then, in S3001, the service manager 1704f is given an instruction to reproduce the service within the MPEG-2 transport stream recorded in the secondary storage unit 1307, and the record identifier identifying that service.

Since the service manager 1704f instructs the JMF 1704a to reproduce video and audio within the MPEG-2 transport stream recorded in the secondary storage unit 1307, the video and audio are reproduced in S3002.

In addition, since the service manager 1704f instructs the AM 1704b to detect an AIT within the MPEG-2 transport stream recorded in the secondary storage unit 1307, the AIT monitoring unit 3502 of the AM 1704b starts detecting an AIT in S3003.

Figure 38:
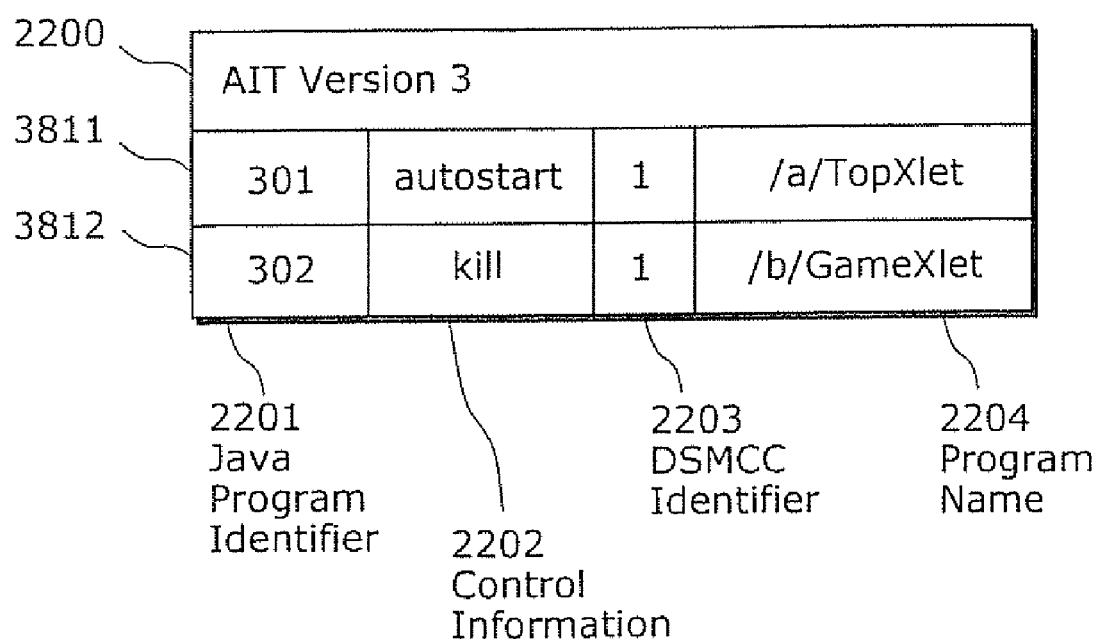
FIG. 38 is a schematic diagram showing the details of an AIT specified in the DVB-MHP standard according to the present invention.

In the fourth embodiment, it is assumed that the AIT of the version 1 shown in FIG. 33, the AIT of the version 2 shown in FIG. 34 and the AIT of the version 3 shown in FIG. 38 are multiplexed into the MPEG-2 transport stream. Each element in these diagrams has the same meaning as described in the first embodiment.

Assuming here that the AIT of the version 1 was detected, Yes is chosen and the process goes to S3701. No Java program is now being executed, and no trick play is specified. Therefore, the reproduction speed is 1.0, and the AIT allowing unit 3501 allows the update of the AIT. In response to this, the AIT monitoring unit 3502 starts analyzing the AIT. In other words, Yes is chosen, so that the process goes to S3004.

In S3004, Java program identifiers 301 and 302 are found as Java programs specified with control information of "autostart" in AIT. Therefore, regarding these Java programs, the process goes to S3005, where the lava programs are executed. After that, the process returns to S3003.

Here, in the case where a newly updated AIT is not detected in S3003, the process goes to S3211. It is assumed here that the Java program with the Java program identifier 302 has its own termination processing handler h. It is assumed that in that termination processing handler, setRate (1.0) is written as Java language code for returning trick play to the normal speed. Then, the Java program with the Java program identifier 302 calls registerHandler (h) so as to register the handler h in the termination processing handler registration unit. Note that it is assumed that the Java program with the Java program identifier 302 has a privilege of registering a termination processing handler. Then, the process goes to S3006. Meanwhile, since the Java program with the Java program identifier 301 does not have a termination processing handler, it goes to S3006 without registering the termination processing handler.

It is assumed that the Java program with the Java program identifier 302 specified factor=2.0 and called setrate ( ), that is, instructed trick play in S3006. Then, the process goes to S3007. Meanwhile, the Java program with the Java program identifier 301 goes to S3007 without instructing trick play. In S3007, the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier 302 of the Java program which called setRate ( ), for storing it. After that, the process returns to S3003 again.

At this point of time, the service is in the trick play mode at the double speed of the normal one.

Here, assuming that the updated AIT of the version 2 was detected in S3003, the process goes to S3701. The AIT monitoring unit 3502 inquires of the AIT allowing unit 3501 whether or not the update of the AIT is allowed, but the current reproduction speed is 2.0 and therefore the update of the AIT is not allowed, Therefore, even if the control information of "kill" is written in the updated AIT for the running Java program, the Java program is not terminated and continued to be executed. The process returns to S3003 again.

Unless the further updated AIT is detected in S3003, the process goes to S3006. It is assumed that the Java program with the Java program identifier 302 specified factor=0.5 and called setRate ( ), that is, instructed trick play of the speed of half the normal speed in S3006. Then, the process goes to S3007, where the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier of the Java program which has called setrate ( ), for storing it. After that, the process returns to S3003 again At this point of time, the service is in the trick play mode at the double speed of the normal one.

Here, assuming that the updated AIT of the version 3 was detected in S3003, the process goes to S3601. The AIT monitoring unit 3502 inquires of the AIT allowing unit 3501 whether or not the update of the AIT is allowed, but the current reproduction speed is 0.5 and therefore the update of the AIT is allowed. In response to this, the AIT monitoring unit 3502 starts analyzing the AIT which was detected this time. In other words, Yes is chosen, so that the process goes to S3004.

In the updated AIT of the version 3, "autostart" is specified to the Java program with the Java program identifier 301 executed in S3005. Since the Java program with the Java program identifier 301 has already been executed, the process goes to S3005, where the execution thereof continues. On the other hand, it is assumed that the control information of "kill" is specified to the Java program with the Java program identifier 302. Regarding the lava program with the Java program identifier 302, the process goes to S3008, where this program is terminated. The AM 1704b notifies the trick play instructing program determination unit 2702 of the Java program identifier of the Java program which has been terminated, and the process goes to S3009.

In S3009, the trick play instructing program determination unit 2702 determines whether or not the Java program which has been terminated by the AM 1704b has a Java program identifier identical to that stored in the trick play instructing program information holding unit 2703. In this case, since both identifiers are 302 and identical, the process goes to S3010, where the trick play instructing program termination processing unit 2701 invokes the termination processing handler h of the Java program identifier 302 registered in the termination processing handler registration unit 3102. More specifically, it calls the Java language code of setRate (1.0) written in the termination processing handler h. By doing so, the reproduction of the service, which has been reproduced in trick play mode, returns to the normal reproduction speed.

As described above, according to the fourth embodiment, the analysis of the AIT is executed only in the case of the range of 0.0<=reproduction speed<=1.0. And, it is possible to execute a separately registered termination processing handler when a Java program is terminated after the Java program instructs trick play of a service, so as to execute arbitrary Java language code.

Fifth Embodiment

Hereafter, an apparatus and a method according to the fifth embodiment of the present invention are described with reference to the drawings.

Since the hardware configuration and the like used in the fifth embodiment are same as those in the first embodiment of the present invention, FIG. 1 to FIG. 16 are used therefor. As the constituent elements in this diagram have the same functions as in the first embodiment, descriptions are not repeated.

The software configuration of the fifth embodiment is same as that shown in FIG. 17. As the constituent elements other than the AM 1704b are identical to those in the software configuration of the first embodiment, descriptions are not repeated. As various data formats used in the fifth embodiment are same as shown in FIG. 20 to FIG. 23 in the first embodiment, descriptions are not repeated.

Figure 40:
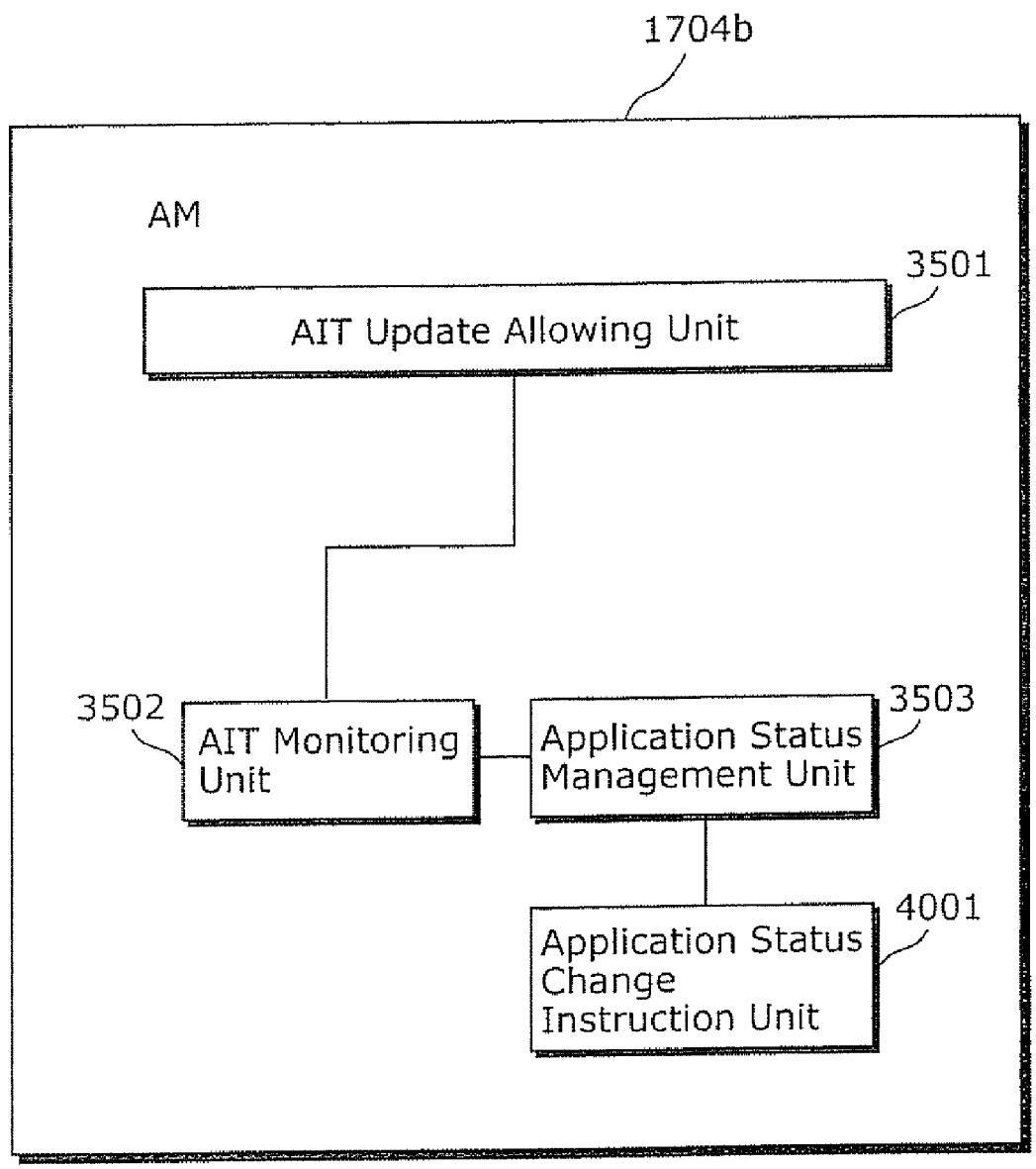
FIG. 40 is an example of a configuration of an application manager according to the present invention.

The AM 1704b has the configuration shown in FIG. 40. Since the constituent elements other than the AIT update allowing unit 3501 and the AIT monitoring unit 3502 are same as those of the third embodiment, descriptions are not repeated.

The AIT update allowing unit 3501 has the same function as in the third embodiment, but it is assumed that it allows the update of the AIT only in the case of reproduction speed=1.0.

The AIT monitoring unit 3502 not only detects version-upgrades of an AIT all the time, but also starts section filtering in accordance with an instruction from the after-mentioned trick play instructing program termination processing unit 2701 and detects the up-to-date AIT which can be obtained at the time of the section filtering.

The application status change instruction unit 4001 provides a function for allowing a Java program to change the status of itself and another Java program. For example, it is possible for a Java program to forcibly terminate the execution of another Java program. The application status change instruction unit 4001 provides an AIT for allowing a Java program to terminate an arbitrary Java program. For example, when a Java program identifier is specified, the application status change instruction unit 4001 provides a Java program with an instance of a proxy class AppProxy for controlling the status of the Java program corresponding to that Java program identifier. AppProxy has methods such as start ( ) for starting the execution of the Java program, stop ( ) for forcibly terminating the execution, and the like.

If a Java program calls these methods, it is possible to start and terminate the execution of a Java program corresponding to AppProxy. For example, when stop ( ) is called, the application status change instruction unit 4001 performs, on the Java program corresponding to AppProxy, the same processing as in the case where the control information of "kill" is specified in AIT. To be more specific, the application status change instruction unit 4001 terminates the Java program, and then notifies the trick play instructing program determination unit 2702 of the Java program identifier of the lava program which has been terminated.

FIG. 27 shows a detailed configuration of the trick play manager 1704g.

The trick play instructing program termination processing unit 2701 cancels the trick play for the service which is currently under the trick play, and then forces detection of an AIT. In other words, 1.0 is set as a parameter factor, so that the setRate (floatfactor) API of the JMF 1704a is called to reproduce the service at the normal speed. After that, the trick play instructing program termination processing unit 2701 instructs the AIT monitoring unit 3502 to detect the up-to-date AIT which can be obtained at that time.

A typical operation in the present embodiment having the above-explained configuration is described below using a flowchart.

Figure 39:
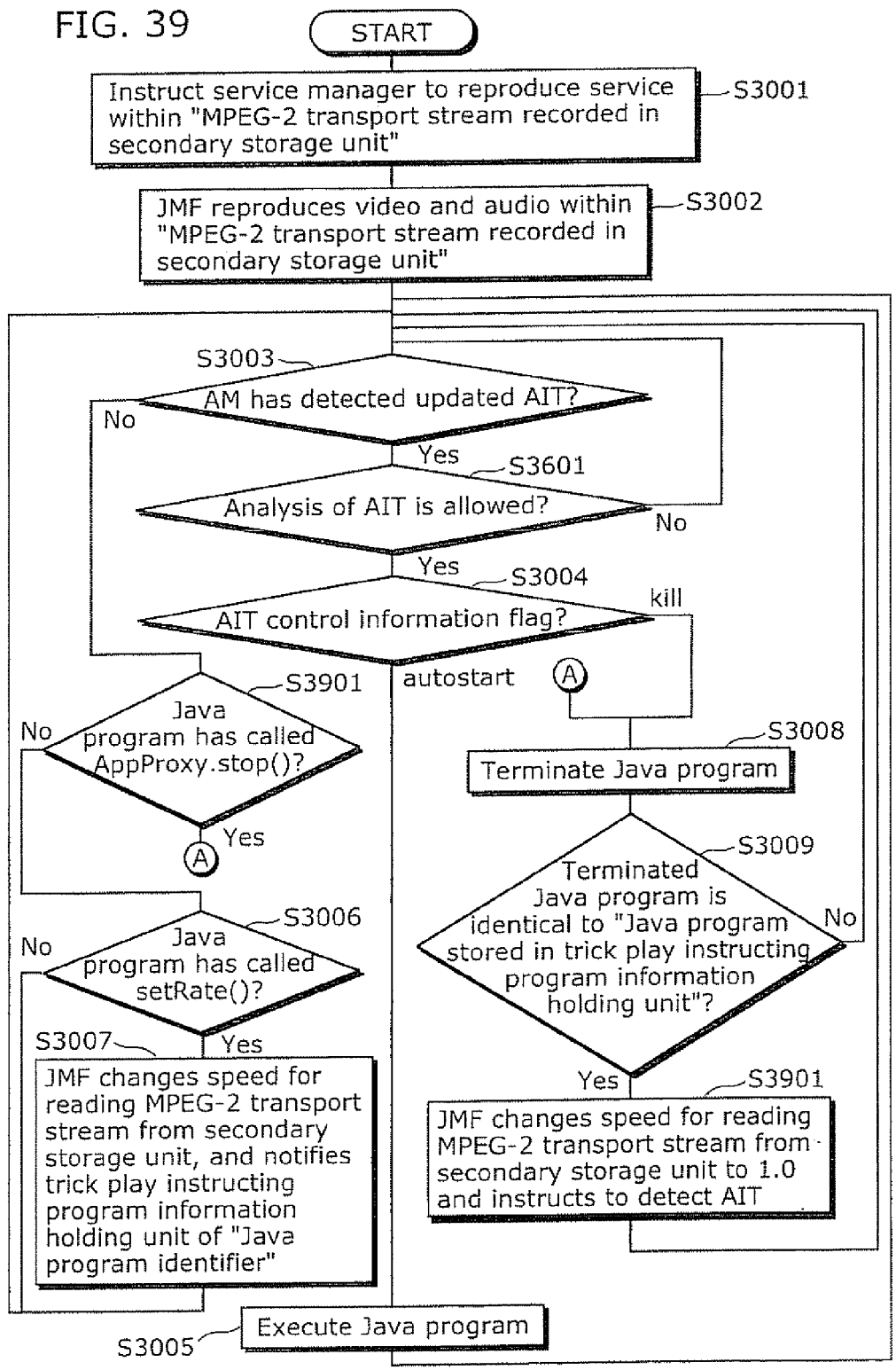
FIG. 39 is a flowchart at the time of termination of a trick play instructing program according to the present invention.

FIG. 39 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream. Then, in S3001, the service manager 1704f is given an instruction to reproduce the service within the MPEG-2 transport stream recorded in the secondary storage unit 1307, and the record identifier identifying that service.

Since the service manager 1704f instructs the IMF 1704a to reproduce video and audio within the MPEG-2 transport stream recorded in the secondary storage unit 1307, the video and audio are reproduced in S3002.

In addition, since the service manager 1704f instructs the AM 1704b to detect an AIT within the MPEG-2 transport stream recorded in the secondary storage unit 1307, the AIT monitoring unit 3502 of the AM 1704b starts detecting an AIT in S3003.

It is assumed here that an updated AIT of a new version is detected, Yes is chosen, so that the process goes to S3601. No Java program is now being executed, and no trick play is specified. Therefore, the reproduction speed is 1.0, and the AIT allowing unit 3501 allows the update of the AIT. In response to this, the AIT monitoring unit 3502 starts analyzing the AIT. In other words, Yes is chosen, so that the process goes to S3004. It is assumed that the Java program specified with the control information of "autostart" in AIT is found in S3004. In that case, the process goes to S3005 to execute the Java program. After that, the process returns to S3003.

Here, in the case where the AIT updated in S3003 is not detected, the process goes to S3901. Now, assuming that AppProxy.stop ( ) was not called in S3501, the process goes to S3006. It is judged in S3006 whether the Java program instructed trick play or not. Now, it is assumed that the Java program specified factor=2.0 and called setrate ( ) in S3006, that is, instructed trick play. Then, the process goes to S3007, where the JMF 1704a controls the secondary storage unit 1307 to set the speed for reading the MPEG-2 transport stream at the double speed of the normal one. At the same time, the JMF 1704*a* notifies the trick play instructing program information holding unit 2703 of the Java program identifier of the Java program which has called setrate ( ), for storing it. After that, the process returns to S3003 again.

At this point in time, the service is in the trick play mode at the double speed of the normal one.

Here, assuming that the updated AIT was detected again in S3003, the process goes to S3601. The AIT monitoring unit 3502 inquires of the AIT allowing unit 3501 whether or not the update of the AIT is allowed, but the current reproduction speed is 2.0 and therefore the update of the AIT is not allowed. Therefore, even if the control information of "kill" is written in the updated AIT for the running Java program, the Java program is not terminated and continued to be executed. The control returns to S3003 again.

Unless the further updated AIT is detected in S3003, the process goes to S3901. Here, it is assumed that in S3901, the Java program specified its own Java program identifier to obtain an AppProxy instance, and called its stop ( ) method. Then, the process goes to S3008, where the application status change instruction unit 4001 operates so as to cause the AM 1704*b* to terminate the Java program. Furthermore, the AM 1704*b* notifies the trick play instructing program determination unit 2702 of the Java program identifier of the Java program which has been terminated, and the process goes to S3009. In S3009, the trick play instructing program determination unit 2702 determines whether or not the Java program which has been terminated by the AM 1704*b* has a Java program identifier identical to that stored in the trick play instructing program information holding unit 2703. Since they are identical this time, the process goes to S3910, and the trick play instructing program termination processing unit 2701 specifies factor=1.0 and calls setRate ( ).

By doing so, the reproduction of the service, which has been in the trick play mode, returns to the normal reproduction speed. Furthermore, the trick play instructing program termination processing unit 2701 instructs the AIT monitoring unit 3502 to start detecting an AIT Therefore, the process returns to S3003 again, where the Java program is executed or terminated based on the detected AIT. Since the reproduction speed is 1.0 at this point in time, the analysis of the AIT which is detected subsequently is allowed in S3601.

As described above, according to the fifth embodiment, the analysis of the AIT is executed only in the case of the reproduction speed=1.0. And in the case where a Java program is terminated in accordance with control information of an AIT after instructing trick play of a service, the trick play of the service is automatically cancelled, returns to normal speed reproduction, and the analysis of the up-to-date AIT at that point in time is executed.

Sixth Embodiment

Hereafter, an apparatus and a method according to the sixth embodiment of the present invention are described with reference to the drawings.

Since the hardware configuration and the like used in the sixth embodiment are same as those in the first embodiment of the present invention, FIG. 1 to FIG. 16 are used here again. As the constituent elements in this diagram have the same functions as in the first embodiment, descriptions are not repeated.

The software configurations of the sixth embodiment are same as those shown in FIG. 17 and FIG. 40. As the constituent elements other than the AM 1704*b* and the trick play manager 1704*g* are same as those in the software configuration of the fifth embodiment, descriptions are not repeated. As various data formats used in the sixth embodiment are same as shown in FIG. 20 to FIG. 23 in the first embodiment, descriptions are not repeated.

The AM 1704*b* has the configuration shown in FIG. 40. Since the constituent elements other than the application status management unit 3503 are same as those of the fifth embodiment, descriptions are not repeated.

In addition to performing the same functions as in the fifth embodiment, the application status management unit 3503 forces termination of a Java program as in the case where the control information of "kill" is specified in AIT, for example, in the case where the Java program does not work due to lack of resources such as a memory and the like, or in the case where something abnormal occurs in a system function required for operating the Java program and the system can not keep executing that Java program, or in the case where the Java program itself is abnormally terminated because of an error or something abnormal which occurs therein, or the like. In any case, the application status management unit 3503 notifies the trick play instructing program determination unit 2702 of the Java program identifier of the Java program which has been terminated.

A typical operation in the present embodiment having the above-explained configuration is described below using a flowchart.

Figure 41:
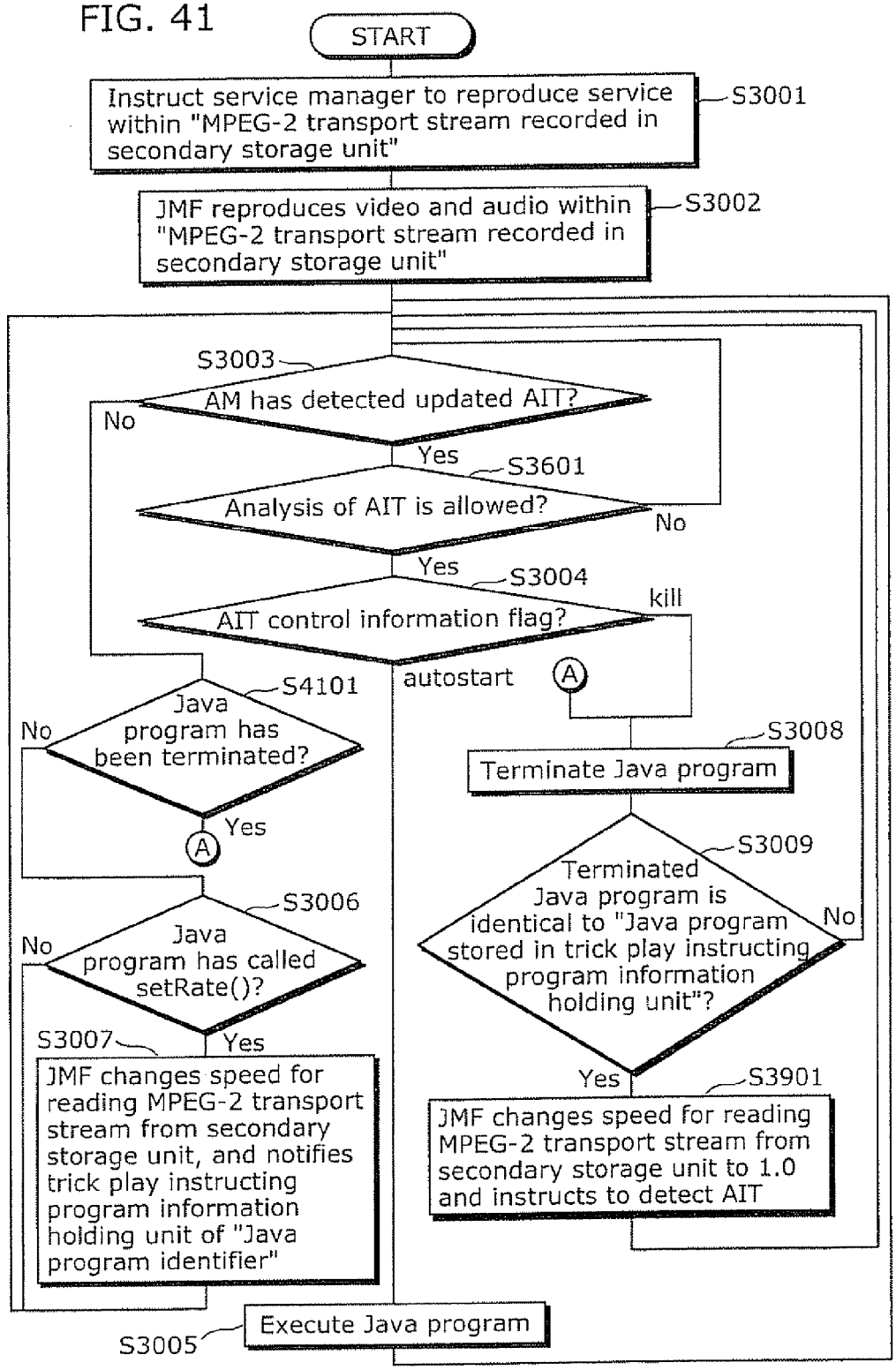
FIG. 41 is a flowchart at the time of termination of a trick play instructing program according to the present invention.

FIG. 41 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream. Then, in S3001, the service manager 1704*f* is given an instruction to reproduce the service within the MPEG-2 transport stream recorded in the secondary storage unit 1307, and the record identifier identifying that service.

Since the service manager 1704*f* instructs the JMF 1704*a* to reproduce video and audio within the MPEG-2 transport stream recorded in the secondary storage unit 1307, the video and audio are reproduced in S3002.

In addition, since the service manager 1704*f* instructs the AM 1704*b* to detect an AIT within the MPEG-2 transport stream recorded in the secondary storage unit 1307, the AIT monitoring unit 3502 of the AM 1704*b* starts detecting an AIT in S3003.

It is assumed here that an updated AIT of a new version is detected, Yes is chosen, so that the process goes to S3601. No Java program is now being executed, and no trick play is specified. Therefore, the reproduction speed is 1.0, and the AIT allowing unit 3501 allows the update of the AIT. In response to this, the AIT monitoring unit 3502 starts analyzing the AIT. In other words, Yes is chosen, so that the process goes to S3004. It is assumed that the Java program specified with the control information of "autostart" in AIT is found in S3004. In that case, the process goes to S3005 to execute the Java program. After that, the process returns to S3003.

Here, in the case where the updated AIT has not been detected in S3003, the process goes to S3901. Now, in S4101, assuming that nothing abnormal causing termination of the Java program occurred, the process goes to S3006. It is judged in S3006 whether the Java program instructed trick play or not. Now, it is assumed that the Java program specified factor=2.0 and called setRate ( ) in S3006, that is, instructed trick play. Then, the process goes to S3007, where the JMF 1704*a* controls the secondary storage unit 1307 to set the speed for reading the MPEG-2 transport stream at the double speed of the normal one. At the same time, the JMF 1704*a* notifies the trick play instructing program information holding unit 2703 of the Java program identifier of the Java program which has called setRate ( ), for storing it. After that, the process returns to S3003 again.

At this point of time, the service is in the trick play mode at the double speed of the normal one.

Here, assuming that the updated AIT was detected again in S3003, the process goes to S3601. The AIT monitoring unit 3502 inquires of the AIT allowing unit 3501 whether or not the update of the AIT is allowed, but the current reproduction speed is 2.0 and therefore the update of the AIT is not allowed. Therefore, even if the control information of "kill" is written in the updated AIT for the running Java program, the Java program is not terminated and continued to be executed. The process returns to S3003 again.

Unless the further updated AIT is detected in S3003, the process goes to S3901. Here, it is assumed in S3901 that the Java program fell into an abnormal state in which it has to be terminated because of its own error. Then, the process goes to S3008, where the application status management unit 3503 terminates the Java program. Furthermore, the application status management unit 3503 notifies the trick play instructing program determination unit 2702 of the Java program identifier of the Java program which has been terminated, and the process goes to S3009. In S3009, the trick play instructing program determination unit 2702 determines whether or not the Java program which has been terminated by the AM 1704b has a Java program identifier identical to that stored in the trick play instructing program information holding unit 2703. Since they are identical this time, the process goes to S3910, and the trick play instructing program termination processing unit 2701 specifies factor=1.0 and calls setrate ( ).

By doing so, the reproduction of the service, which has been in the trick play mode, returns to the normal reproduction speed. Furthermore, the AIT monitoring unit 3502 is instructed to start detecting an AIT. Therefore, the process returns to S3003 again, where the Java program is executed or terminated based on the detected AIT. Since the reproduction speed is 1.0 at this point in time, the analysis of the AIT which is detected subsequently is allowed in S3601.

As described above, according to the sixth embodiment, the analysis of the AIT is executed only in the case of the reproduction speed=1.0. And in the case where a Java program is abnormally terminated after instructing trick play of a service, the trick play of the service is automatically cancelled, returns to normal speed reproduction, and the analysis of the up-to-date AIT at that point in time is executed.

Note that it is also possible to configure the function of the trick play instructing program termination processing unit 2701 so that it can temporarily stop reproduction of a service which is in the trick play mode by specifying the trick play speed of 0.0 for the service and then detecting an AIT forcibly, instead of by canceling the trick play of the service which is now in the trick play mode and then detecting the AIT forcibly. In other words, 0.0 is set as a parameter factor, so that the setrat (floatfactor) API of the JMF 1704a is called to temporarily stop the reproduction of the service. After that, the AIT monitoring unit 3502 is instructed to detect the up-to-date AIT which can be obtained at that time.

Seventh Embodiment

Hereafter, an apparatus and a method according to the seventh embodiment of the present invention are described with reference to the drawings.

Since the hardware configuration and the like used in the seventh embodiment are same as those in the first embodiment of the present invention, FIG. 1 to FIG. 16 are used here again. As the constituent elements in this diagram have the same functions as in the first embodiment, descriptions are not repeated.

The software configurations of the seventh embodiment are same as those shown in FIG. 17 and FIG. 40. As the constituent elements other than the trick play manager 1704g are same as those in the software configuration of the sixth embodiment, descriptions are not repeated. As various data formats used in the seventh embodiment are same as shown in FIG. 20 to FIG. 23 in the first embodiment, descriptions are not repeated.

Figure 42:
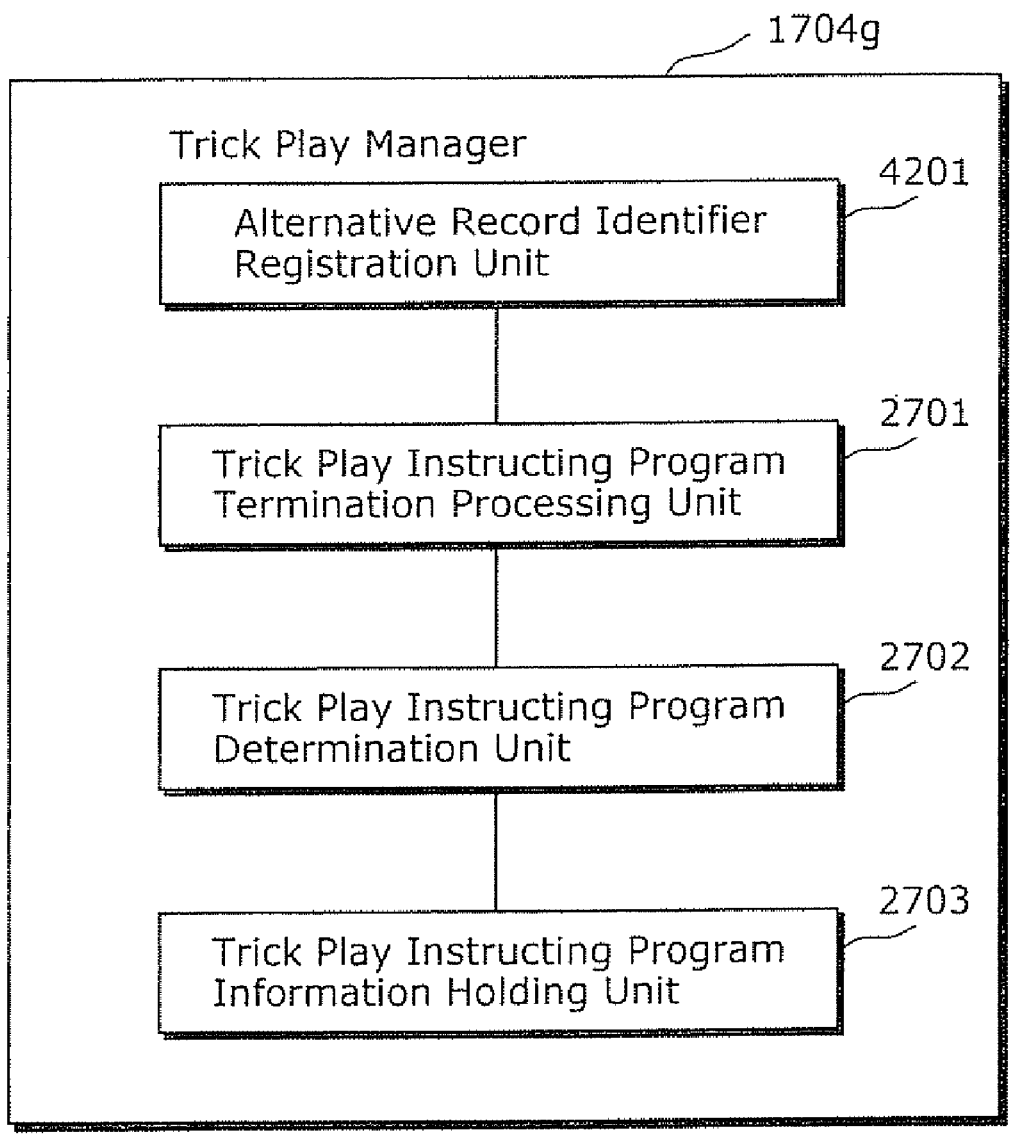
FIG. 42 is an example of a trick play manager according to the present invention.

The trick play manager 1704g has a configuration shown in FIG. 42. Since the trick play instructing program determination unit 2702 and the trick play instructing program information holding unit 2703 are same as those of the sixth embodiment, descriptions are not repeated.

The trick play instructing program termination processing unit 2701 specifies a record identifier to the service manager 1704f so as to cause it to start reproducing a new service. The record identifier to be specified is obtained from the after-mentioned alternative record identifier registration unit 4201. At the same time, the reproduction speed of the service is set to be a normal speed by calling setRate (1.0) using the JMF 1704a.

The alternative record identifier registration unit 4201 causes a Java program to input a record identifier. Reproduction of an running service is terminated when the Java program is terminated, and reproduction of a new service identified by this record identifier starts. The alternative record identifier registration unit 4201 provides the Java program with a registerRecordID (int recordID) method as an API. When the Java program sets a record identifier as recordID and calls this method, the alternative record identifier registration unit 4201 stores the record identifier. This record identifier is given to the trick play instructing program termination processing unit 2701.

A typical operation in the present embodiment having the above-explained configuration is described below using a flowchart.

Figure 43:
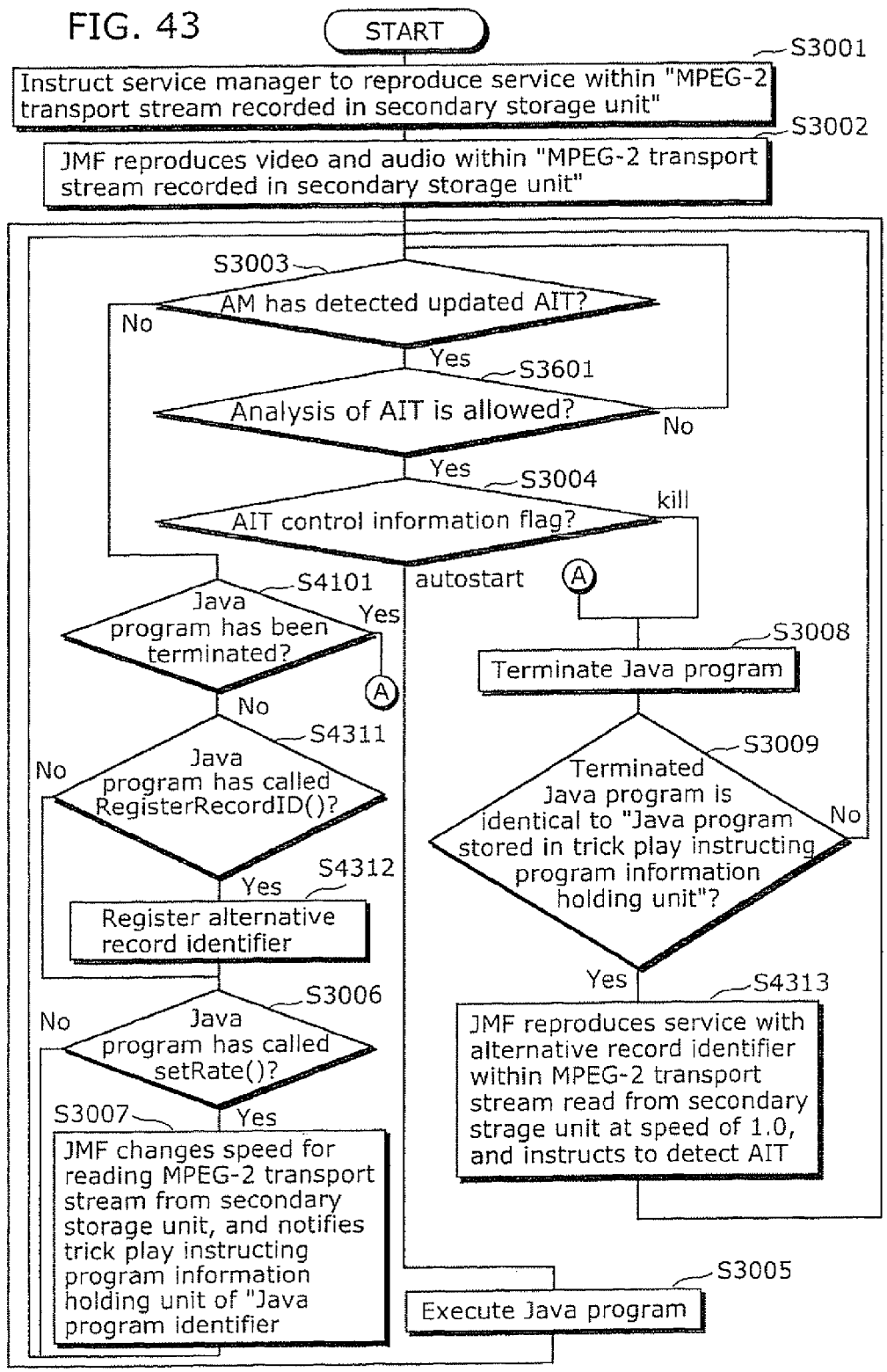
FIG. 43 is a flowchart at the time of termination of a trick play instructing program according to the present invention.

FIG. 43 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream, Then, in S3001, the service manager 1704f is given an instruction to reproduce the service within the MPEG-2 transport stream recorded in the secondary storage unit 1307, and the record identifier identifying that service.

Since the service manager 1704f instructs the JMF 1704a to reproduce video and audio within the MPEG-2 transport stream recorded in the secondary storage unit 1307, the video and audio are reproduced in S3002.

In addition, since the service manager 1704f instructs the AM 1704b to detect an AIT within the MPEG-2 transport stream recorded in the secondary storage unit 1307, the AIT monitoring unit 3502 of the AM 1704b starts detecting an AIT in S3003.

It is assumed here that an updated AIT of a new version is detected, Yes is chosen, so that the process goes to S3601. No lava program is now being executed, and no trick play is specified. Therefore, the reproduction speed is 1.0, and the AIT allowing unit 3501 allows the update of the AIT. In response to this, the AIT monitoring unit 3502 starts analyzing the AIT. In other words, Yes is chosen, so that the process goes to S3004. It is assumed that the Java program specified with the control information of "autostart" in AIT is found in S3004. In that case, the process goes to S3005 to execute the Java program. After that, the process returns to S3003.

Here, in the case where the updated AIT has not been detected in S3003, the process goes to S3901. Now, in S4101, assuming that nothing abnormal causing termination of the lava program occurred, the process goes to S4311. It is assumed that in S4311, the lava program called a method of registerRecordID (RecordID) for identifying an alternative record identifier, using the alternative record identifier registration unit 4201. Then, the process goes to S4312, where the alternative record identifier registration unit 4201 stores that record identifier.

Next, it is assumed that the Java program specified factor=2.0 and called setRate ( ) in S3006, that is, instructed trick play. Then, the process goes to S3007, where the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier of the lava program which has called setRate ( ), for storing it. After that, the process returns to S3003 again.

At this point of time, the service is in the trick play mode at the double speed of the normal one.

Here, assuming that the updated AIT was detected again in S3003, the process goes to S3601. The AIT monitoring unit 3502 inquires of the AIT allowing unit 3501 whether or not the update of the AIT is allowed, but the current reproduction speed is 2.0 and therefore the update of the AIT is not allowed. Therefore, even if the control information of "kill" is written in the updated AIT for the running Java program, the Java program is not terminated and continued to be executed. The control returns to S3003 again.

Unless the further updated AIT is detected in S3003, the process goes to S3901. Here, it is assumed in S3901 that the Java program fell into an abnormal state in which it has to be terminated because of its own error. Then, the process goes to S3008, where the application status management unit 3503 terminates the Java program. Furthermore, the application status management unit 3503 notifies the trick play instructing program determination unit 2702 of the Java program identifier of the Java program which has been terminated, and the process goes to S3009. In S3009, the trick play instructing program determination unit 2702 determines whether or not the Java program which has been terminated by the AN 1704b has a Java program identifier identical to that stored in the trick play instructing program information holding unit 2703. Since they are identical this time, the process goes to S4313, where the trick play instructing program termination processing unit 2701 specifies the alternative record identifier obtained from the alternative record identifier registration unit 4201, to the service manager 1704f, so as to cause it to start reproducing a new service. At the same time, the trick play instructing program termination processing unit 2701 specifies factor=1.0 and calls setrate ( ).

By doing so, the reproduction of the service, which has been in the trick play mode, returns to the normal reproduction speed. In other words, the reproduction of the service identified by the alternative service record identifier starts at the normal speed. Furthermore, the AIT monitoring unit 3502 is instructed to start detecting an AIT. Therefore, the process returns to S3003 again, where the Java program is executed or terminated based on the detected AIT. Since the reproduction speed is 1.0 at this point in time, the analysis of the AIT which is detected subsequently is allowed in S3601.

As described above, according to the seventh embodiment, the analysis of the AIT is executed only in the case of the reproduction speed=1.0. And in the case where a Java program is terminated in accordance with control information of an AIT after instructing trick play of a service, reproduction of a separately identified alternative service is started, while trick play of the service is automatically cancelled and returns to normal speed reproduction, and the analysis of the up-to-date AIT at that point in time is executed.

Note that it is also possible to configure the function of the trick play instructing program termination processing unit 2701 so that it can temporarily stop reproduction of a service which is in the trick play mode by specifying the trick play speed of 0.0 for the service and then detecting an AIT forcibly, instead of by canceling the trick play of the service which is now in the trick play mode and then detecting the AIT forcibly. In other words, 0.0 is set as a parameter factor, so that the setRat (floatfactor) API of the JMF 1704a is called to temporarily stop the reproduction of the service. After that, the AIT monitoring unit 3502 is instructed to detect the up-to-date AIT which can be obtained at that time.

Eighth Embodiment

Hereafter, an apparatus and a method according to the eighth embodiment of the present invention are described with reference to the drawings.

Since the hardware configuration and the like used in the eighth embodiment are same as those in the first embodiment of the present invention, FIG. 1 to FIG. 16 are used here again. As the constituent elements in these diagrams have the same functions as in the first embodiment, descriptions are not repeated.

As various data formats used in the eighth embodiment are same as shown in FIG. 20, FIG. 21 and FIG. 23 in the first embodiment, as well as shown in FIG. 28 and FIG. 29 which are additionally used in the eighth embodiment. Since descriptions of FIG. 20, FIG. 21 and FIG. 23 are same as in the first embodiment, such descriptions are not repeated. FIG. 28 and FIG. 29 show AITs in which a trick play compliant flag 2805 is added to the AIT shown in FIG. 22. The trick play compliant flag is a flag specifying whether the Java program is to be executed or not during the trick play of the service. To be more specific, a Java program in which the trick play compliant flag 2805 indicates "true" is executed even during the trick play of the service. On the other hand, a Java program in which the trick play compliant flag 2805 indicates "false" is forcibly terminated immediately after the trick play of the service starts.

The software configuration of the eighth embodiment is same as that shown in FIG. 17, FIG. 27 and FIG. 46. In FIG. 17, as the constituent elements other than the JMF 1704a, the AM 1704b and the trick play manager 1704g are same as those in the software configuration of the first embodiment, descriptions are not repeated.

In addition to the operations described in the first embodiment, the JMF 1704a notifies the application status management unit of the AM 1704b that trick play has been started, when setRate (float factor) of the value other than factor=1.0 is called.

In addition to the operations described in the first embodiment, the application status management unit in the AM 1704b performs the following operations. When the JMF 1704a notifies the application status management unit that trick play has been started, the application status management unit examines the trick play compliant flag written in the AIT regarding the running Java program. If the value of the trick play compliant flag of the running Java program is true, the JMF 1704a continues the execution of the Java program. If the value of the trick play compliant flag of the running Java program is false, the JMF 1704*a* terminates the Java program immediately, and further notifies the trick play instructing program determination unit 2702 of the Java program identifier of the Java program which has been terminated, In other words, the JMF 1704*a* performs the same operations as in the case where the control information kill is specified to that Java program.

A typical operation in the present embodiment having the above-explained configuration is described below using a flowchart.

Figure 44:
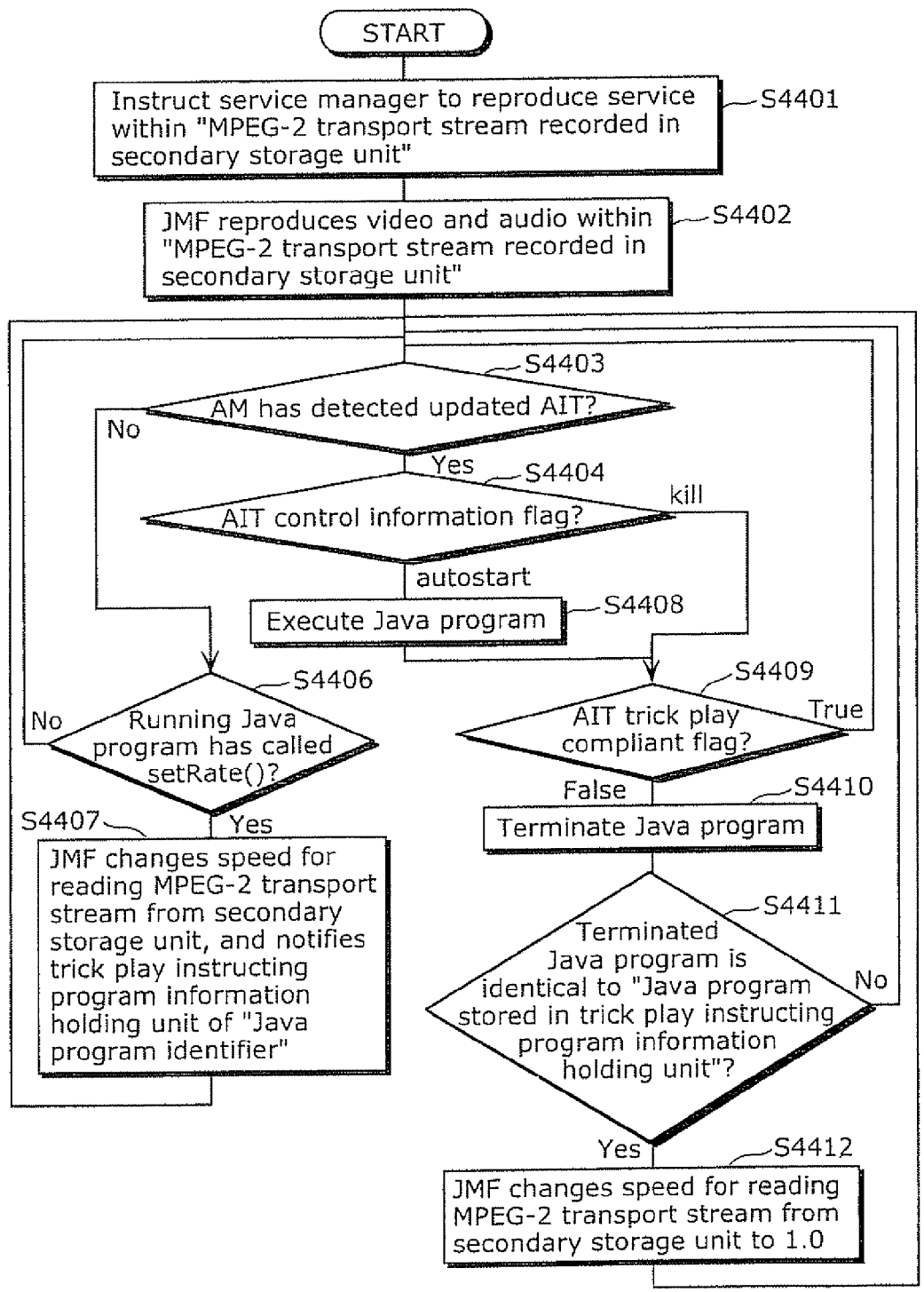
FIG. 44 is a flowchart at the time of termination of a trick play instructing program according to the present invention.

FIG. 44 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream. Then, in S4401, the service manager 1704*f* is given an instruction to reproduce the service within the MPEG-2 transport stream recorded in the secondary storage unit 1307, and the record identifier identifying that service.

Since the service manager 1704*f* instructs the JMF 1704*a* to reproduce video and audio within the MPEG-2 transport stream recorded in the secondary storage unit 1307, the video and audio are reproduced in S4402.

In addition, since the service manager 1704*f* instructs the AM 1704*b* to detect an AIT within the MPEG-2 transport stream recorded in the secondary storage unit 1307, the AIT monitoring unit 3502 of the AM 1704*b* starts detecting an AIT in S4403.

Assuming here that an AIT shown in FIG. 28 was detected, Yes is chosen and the process goes to S4404. It is assumed that a Java program with a Java program identifier=301 specified with the control information of "autostart" in AIT was found in S4404. In that case, the process goes to S4408, where the Java program with the Java program identifier=301 is executed. After that, the process goes to S4409. Here, since the running Java program is the Java program with the Java program identifier=301 only, the trick play compliant flag thereof is read. As the flag indicates true in this case, the process returns to S4403.

In S4403, an updated AIT is not detected because the AIT shown in FIG. 28 is still being received, and the process goes to S4406.

Next, it is assumed that the Java program with the Java program identifier=301 specified factor=2.0 and called setRate ( ), that is, instructed trick play in S4406. Then, the process goes to S4407, where the JMF 1704*a* controls the secondary storage unit 1307 to set the speed for reading the MPEG-2 transport stream at the double speed of the normal one. At the same time, the JMF 1704*a* notifies the trick play instructing program information holding unit 2703 of the Java program identifier=301 of the Java program which called setRate ( ), for storing it. After that, the process returns to S4403 again.

At this point of time, the service is in the trick play mode at the double speed of a normal one.

Here, assuming that the updated AIT shown in FIG. 29 was detected in S4404, the process goes to S4404. In the AIT shown in FIG. 29, autostart is specified as the control information of the Java program with the Java program identifier=301, and therefore the process goes to S4408. However, nothing is done there because the execution of the Java program with the Java program identifier=301 has already been started, and the process goes to S4409.

In S4409, it is confirmed that the value of the trick play compliant flag specified in the running Java program with the Java program identifier=301 is false, with reference to the AIT shown in FIG. 29. Then, the process goes to S4410, where the Java program is terminated and the Java program identifier=301 is notified to the trick play instructing program determination unit. Then, the trick play instructing program determination unit compares the value of the Java program identifier stored in the trick play instructing program information holding unit with the value of the notified identifier of the terminated Java program. Both values are 301 and identical, and therefore the process goes to S4412. In S4412, the speed for reading the MPEG-2 transport stream from the secondary storage unit is changed to 1.0. In other words, the service is reproduced at the normal speed.

As described above, according to the eighth embodiment, in the case where a Java program is terminated in accordance with the change of a trick play compliant flag in AIT after instructing trick play of a service, the trick play of the service is automatically cancelled and returns to normal speed reproduction.

Note that it is also possible to configure the function of the trick play instructing program termination processing unit 2701 so that it can temporarily stop reproduction of a service which is now being reproduced in trick play mode by specifying the trick play speed of 0.0 for the service and then calling setRate (float factor) API of the JMF 1704*a*, instead of by canceling the trick play of the service which is now being reproduced in trick play mode.

Ninth Embodiment

Hereafter, an apparatus and a method according to the ninth embodiment of the present invention are described with reference to the drawings.

Since the hardware configuration and the like used in the ninth embodiment are same as those in the first embodiment of the present invention, FIG. 1 to FIG. 16 are used here again. As the constituent elements in these diagrams have the same functions as in the first embodiment, descriptions are not repeated.

Various data formats used in the ninth embodiment are same as shown in FIG. 20, FIG. 21, FIG. 23 and FIG. 28 in the eighth embodiment. Because these are the same ones as described in the eighth embodiment, descriptions are not repeated.

The software configuration of the ninth embodiment is same as that shown in FIG. 17, FIG. 31 and FIG. 46. As the constituent elements shown in FIG. 17 are same as those in the software configuration of the eighth embodiment, descriptions are not repeated. As the constituent elements shown in FIG. 31 are same as those in the software configuration of the second embodiment, descriptions are not repeated.

A typical operation in the present embodiment having the above-explained configuration is described below using a flowchart.

Figure 45:
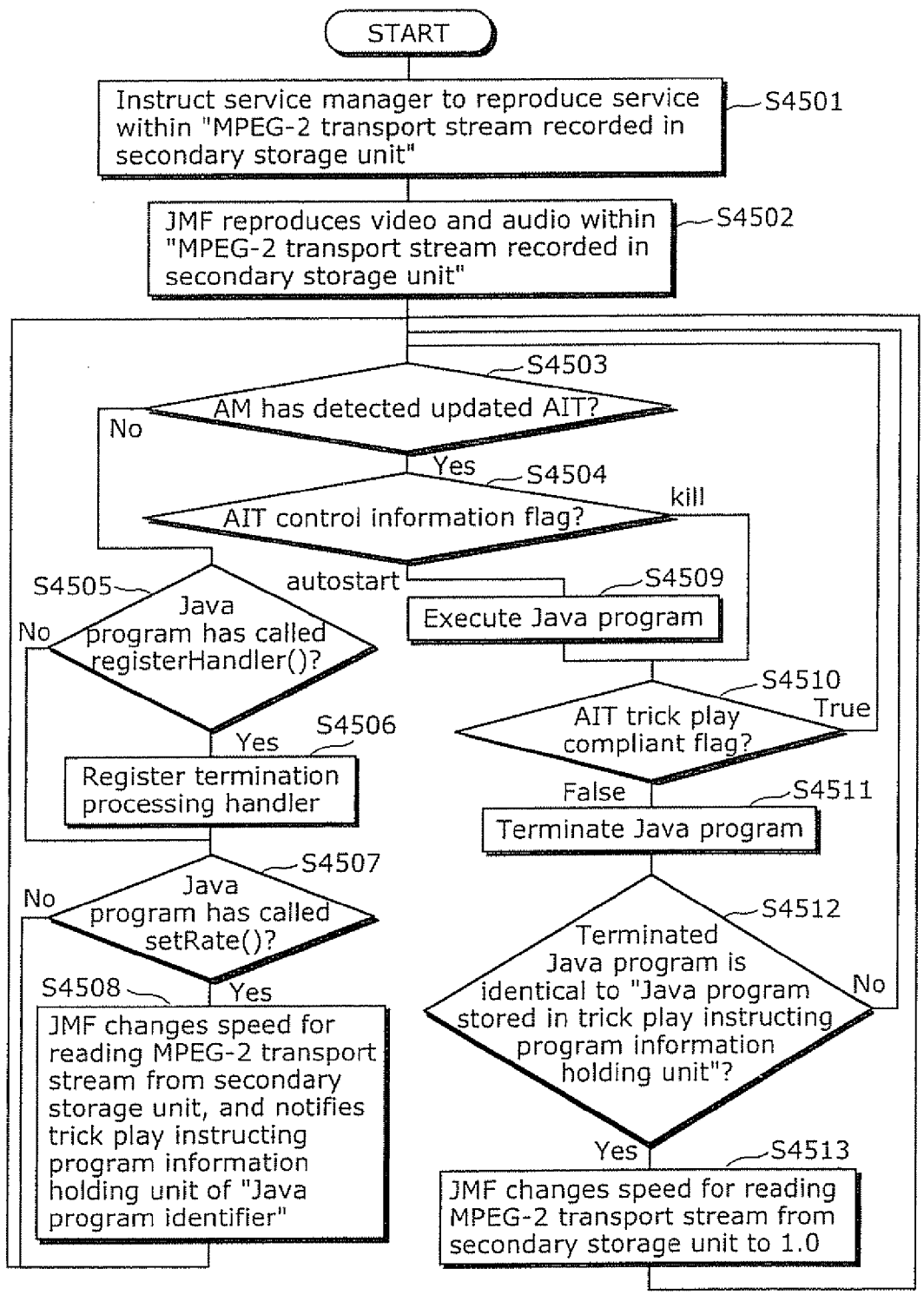
FIG. 45 is a flowchart at the time of termination of a trick play instructing program according to the present invention.

FIG. 45 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream. Then, in S4501, the service manager 1704*f* is given an instruction to reproduce the service within the MPEG-2 transport stream recorded in the secondary storage unit 1307, and the record identifier identifying that service.

Since the service manager 1704*f* instructs the JMF 1704*a* to reproduce video and audio within the MPEG-2 transport stream recorded in the secondary storage unit 1307, the video and audio are reproduced in S4502.

In addition, since the service manager 1704f instructs the AM 1704b to detect an AIT within the MPEG-2 transport stream recorded in the secondary storage unit 1307, the AIT monitoring unit 3502 of the AM 1704b starts detecting an AIT in S4503.

Assuming here that an AIT shown in FIG. 28 was detected, Yes is chosen and the process goes to S4504. It is assumed that a Java program with a Java program identifier=301 specified with the control information of "autostart" in AIT was found in S4504. In that case, the process goes to S4509, where the Java program with the Java program identifier=301 is executed. After that, the process goes to S4510. Here, since the running Java program is the Java program with the Java program identifier=301 only, the trick play compliant flag thereof is read. As the flag indicates true in this case, the process returns to S4503.

In S4503, an updated AIT is not detected because the AIT shown in FIG. 28 is still being received, and the process goes to S4505.

It is assumed here in S4505 that the Java program with the Java program identifier 301 has its own termination processing handler h. It is assumed that in that termination processing handler, setRate (1.0) is written as Java language code for returning trick play to a normal speed. Then, the Java program with the Java program identifier 301 calls registerHandler (h) so as to register the handler h in the termination processing handler registration unit. Note that it is assumed that the Java program with the Java program identifier 301 has a privilege of registering a termination processing handler. Then, the process goes to S4507.

Next, it is assumed that the Java program with the Java program identifier=301 specified factor=2.0 and called setRate ( ), that is, instructed trick play in S4507. Then, the process goes to S4508, where the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier=301 of the Java program which called setRate ( ), for storing it. After that, the process returns to S4503 again.

At this point of time, the service is in the trick play mode at the double speed of the normal one.

Here, assuming that the updated AIT shown in FIG. 29 was detected in S4404, the process goes to S4504, In the AIT shown in FIG. 29, autostart is specified as the control information of the Java program with the Java program identifier=301, and therefore the process goes to S4509. However, nothing is done there because the execution of the Java program with the Java program identifier=301 has already been started, and the process goes to S4510.

In S4510, it is confirmed that the value of the trick play compliant flag specified in the running Java program with the Java program identifier=301 is false, with reference to the AIT shown in FIG. 29. Then, the process goes to S4410, where the Java program is terminated and the Java program identifier=301 is notified to the trick play instructing program determination unit. Then, the trick play instructing program determination unit compares the value of the Java program identifier stored in the trick play instructing program information holding unit with the value of the notified identifier of the terminated Java program. Both values are 301 and identical, and therefore the process goes to S4513.

In 4513, the trick play instructing program termination processing unit 2701 invokes the termination processing handler h of the Java program identifier 302 registered in the termination processing handler registration unit 3102. More specifically, it calls the Java language code of setrate (1.0) written in the termination processing handler h. By doing so, the reproduction of the service, which has been in the trick play mode, returns to the normal reproduction speed.

As described above, according to the ninth embodiment, it is possible to execute a separately registered termination processing handler when a Java program is terminated in accordance with a change in a trick play compliant flag in AIT after the Java program instructs trick play of a service, so as to execute arbitrary Java language code.

Tenth Embodiment

Hereafter, an apparatus and a method according to the tenth embodiment of the present invention are described with reference to the drawings.

Since the hardware configuration and the like used in the tenth embodiment are same as those in the first embodiment of the present invention, FIG. 1 to FIG. 16 are used here again. As the constituent elements in these diagrams have the same functions as in the first embodiment, descriptions are not repeated.

Since descriptions of FIG. 20, FIG. 21 and FIG. 23 are same as in the first embodiment, such descriptions are not repeated. FIG. 47 shows an AIT in which a trick play control flag 4705 is added to the AIT shown in FIG. 22. The trick play control flag is a flag specifying whether a lava program is to be started up or terminated in accordance with the control information 2202 of an AIT during trick play of a service. To be more specific, a Java program in which the trick play control flag 4705 indicates "true" is started up or terminated in accordance with a change in the control information 2202 even during trick play of a service. On the other hand, a Java program in which the trick play control flag 4705 indicates "false" ignores a change in the control information 2202 as is the case with the fifth embodiment after the trick play of the service starts.

The software configuration of the tenth embodiment is same as that shown in FIG. 17. As the constituent elements other than the AM 1704b are same as those in the software configuration of the First embodiment, descriptions are not repeated.

The AM 1704b has a function of ignoring an update of an AIT in accordance with the current reproduction speed and the trick play control flag 4705, in addition to the functions of the first embodiment. FIG. 35 shows a configuration diagram of the AM 1704b in the tenth embodiment. Since the AIT monitoring unit 3502 and the application status management unit 3503 are same as the AIT monitoring unit 3502 and the application status management unit 3503 in the third embodiment, descriptions are not repeated. In addition, they are same as in the third embodiment in that an update of an AIT by a version-upgrade is allowed only in the case where the ATT update allowing unit 3501 allows to do so, but different from the third embodiment in the conditions for allowing such update of an AIT by a version-upgrade.

The AIT update allowing unit 3501 allows the analysis of a new updated AIT in the case where a trick play speed which is currently effective to a service is 1.0, or in the case where the trick play speed is a value other than 1.0 and the value of a trick play control flag is "true". When requested to determine whether or not to allow the analysis of the AIT, the AIT update allowing unit 3501 inquires of the JMF 1704a about the current reproduction speed. The IMF 1704a sends back the trick play speed set in setRate ( ).

A typical operation in the present embodiment having the above-explained configuration is described below using a flowchart.

FIG. 36 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream. Then, in S3001, the service manager 1704f is given an instruction to reproduce the service within the MPEG-2 transport stream recorded in the secondary storage unit 1307, and the record identifier identifying that service.

Since the service manager 1704f instructs the JMF 1704a to reproduce video and audio within the MPEG-2 transport stream recorded in the secondary storage unit 1307, the video and audio are reproduced in S3002.

In addition, since the service manager 1704f instructs the AM 1704b to detect an AIT within the MPEG-2 transport stream recorded in the secondary storage unit 1307, the AIT monitoring unit 3502 of the AM 1704b starts detecting an AIT in S3003.

It is assumed here that an updated AIT of a new version is detected, Yes is chosen, so that the process goes to S3601. No Java program is now being executed, and no trick play is specified. Therefore, the reproduction speed is 1.0, and the AIT allowing unit 3501 allows the update of the AIT. In response to this, the AIT monitoring unit 3502 starts analyzing the AIT. In other words, Yes is chosen, so that the process goes to S3004. It is assumed that a Java program specified control information of "autostart" and a trick play control flag of "false" was found in S3004. In that case, the process goes to S3005 to execute the Java program. After that, the process returns to S3003.

Here, in the case where the AIT updated in S3003 was not detected, the process goes to S3006. It is judged in S3006 whether the Java program instructed trick play or not. Now, it is assumed that the Java program specified factor=2.0 and called setRate ( ) in S3006, that is, instructed trick play. Then, the process goes to S3007, where the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier of the Java program which has called setRate ( ), for storing it. After that, the process returns to S3003 again.

At this point of time, the service is in the trick play mode at the double speed of the normal one.

Here, assuming that the updated AIT was detected again in S3003, the process goes to S3601. The AIT monitoring unit 3502 inquires of the AIT allowing unit 3501 whether or not to allow the update of the AIT, but the current reproduction speed is 2.0 and the value of the trick play control flag written in the AIT is "false", and therefore the update of the AIT is not allowed. Therefore, even if the control information of "kill" is written in the updated AIT for the running Java program, the Java program is not terminated and continued to be executed. The control returns to S3003 again.

Unless the further updated AIT is detected in S3003, the process goes to S3006.

Assuming that an updated AIT of a new version was detected in S3003 when the reading speed of the MPEG-2 transport stream is a normal speed, Yes is chosen, so that the process goes to S3601. No Java program is now being executed, and no trick play is specified. Since the reproduction speed is 1.0, the AIT allowing unit 3501 allows the update of the AIT. In response to this, the AIT monitoring unit 3502 starts analyzing the AIT. In other words, Yes is chosen, so that the process goes to S3004. It is assumed that a Java program specified control information of "autostart" and a trick play control flag of "true" was found in S3004. In that case, the process goes to S3005 to execute the Java program. After that, the process returns to S3003.

Here, in the case where the AIT updated in S3003 was not detected, the process goes to S3006. It is judged in S3006 whether the Java program instructed trick play or not. Now, it is assumed that the Java program specified factor=2.0 and called setRate ( ) in S3006, that is, instructed trick play. Then, the process goes to S3007, where the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier of the Java program which has called setRate ( ), for storing it. After that, the process returns to S3003 again.

At this point of time, the service is in the trick play mode at the double speed of the normal one.

Here, assuming that the updated AIT was detected again in S3003, the process goes to S3601. The AIT monitoring unit 3502 inquires of the AIT allowing unit 3501 whether or not to allow the update of the AIT, but the current reproduction speed is 2.0 and the value of the trick play control flag is "true", and therefore the update of the AIT is allowed. In response to this, the AIT monitoring unit 3502 starts analyzing the AIT which was detected this time. In other words, Yes is chosen, so that the process goes to S3004.

In S3004, it is assumed that in the updated AIT, the control information of "kill" has been specified for the Java program which was first executed in S3005. Then, the process goes to S3008, where the AN 1704b terminates that Java program. The AM 1704b notifies the trick play instructing program determination unit 2702 of the Java program identifier of the Java program which has been terminated, and the process goes to S3009. In S3009, the trick play instructing program determination unit 2702 determines whether or not the Java program which has been terminated by the AM 1704b has a Java program identifier identical to that stored in the trick play instructing program information holding unit 2703. Since they are identical this time, the process goes to S3010, and the trick play instructing program termination processing unit 2701 specifies factor=1.0 and calls setRate ( ). By doing so, the reproduction of the service, which has been in the trick play mode, returns to the normal reproduction speed.

As described above, according to the tenth embodiment, the analysis of the AIT is executed only in the case where the reproduction speed is 1.0, or in the case where the reproduction speed is a value other than 1.0 and the value of the trick play control flag is "true". And in the case where a Java program is terminated in accordance with control information of an AIT after instructing trick play of a service, the trick play of the service is automatically cancelled and returns to normal speed reproduction.

Note that it is also possible in the present embodiment to temporarily stop a service when setrate (float factor) API of the JMF 1704a is called, if the trick play instructing program termination processing unit 2701 changes the configuration for setting 0.0 as a parameter factor, instead of 1.0.

Eleventh Embodiment

Hereafter, an apparatus and a method according to the eleventh embodiment of the present invention are described with reference to the drawings.

Since the hardware configuration and the like used in the eleventh embodiment are same as those in the tenth embodiment of the present invention, FIG. 1 to FIG. 16 are used here again. As the constituent elements in these diagrams have the same functions as in the tenth embodiment, descriptions are not repeated.

The software configuration of the eleventh embodiment is same as that shown in FIG. 17 and FIG. 35. As the constituent elements other than the trick play manager 1704g are same as those in the software configuration of the tenth embodiment, and the trick play manager 1704g is same as that in the second embodiment, descriptions are not repeated. As various data formats used in the eleventh embodiment are same as shown in FIG. 20, FIG. 21 and FIG. 23 in the first embodiment, as well as shown in FIG. 47 in the tenth embodiment, descriptions are not repeated.

A typical operation in the present embodiment having the above-explained configuration is described below using a flowchart.

FIG. 37 is a flowchart showing the case where a service is reproduced from an MPEG-2 transport stream recorded in the secondary storage unit 1307.

First, it is assumed that a user instructs the EPG 1702 to reproduce a service within an MPEG-2 transport stream. Then, in S3001, the service manager 1704f is given an instruction to reproduce the service within the MPEG-2 transport stream recorded in the secondary storage unit 1307, and the record identifier identifying that service.

Since the service manager 1704f instructs the JMF 1704a to reproduce video and audio within the MPEG-2 transport stream recorded in the secondary storage unit 1307, the video and audio are reproduced in S3002.

In addition, since the service manager 1704f instructs the AM 1704b to detect an AIT within the MPEG-2 transport stream recorded in the secondary storage unit 1307, the AIT monitoring unit 3502 of the AM 1704b starts detecting an AIT in S3003.

Figure 48:
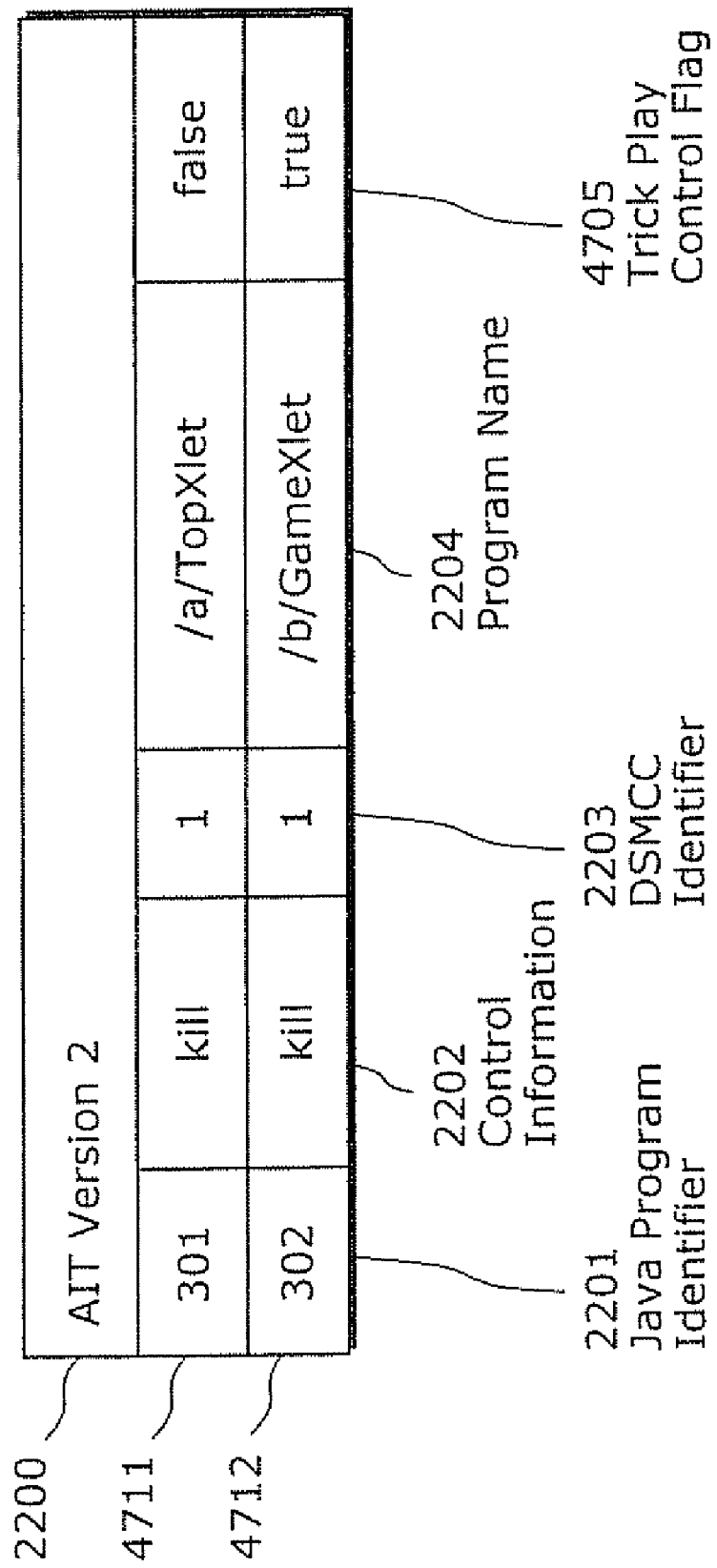
FIG. 48 is a schematic diagram showing the details of another AIT in which a trick play control flag according to the present invention is added.
Figure 49:
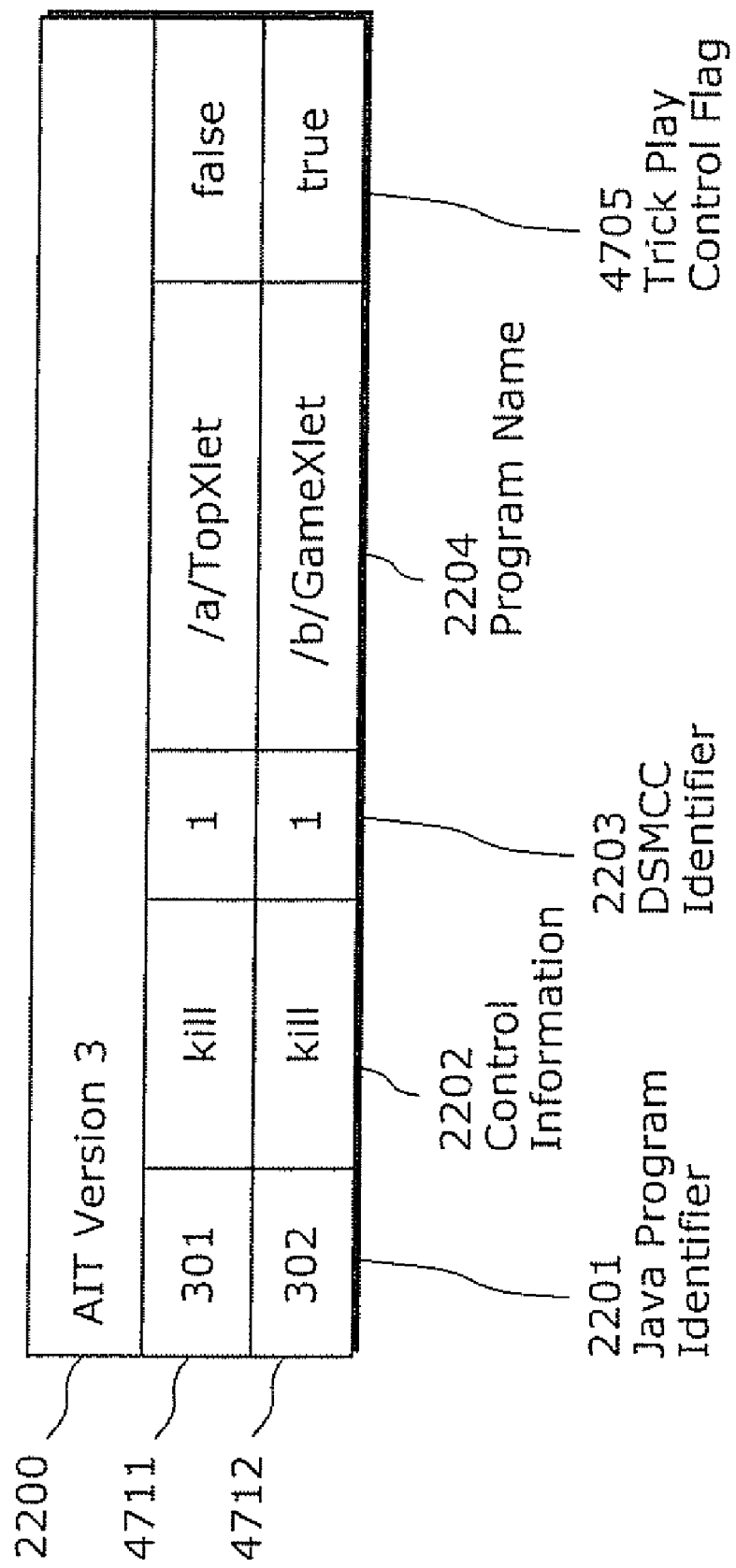
FIG. 49 is a schematic diagram showing the details of still another AIT in which a trick play control flag according to the present invention is added.

In the eleventh embodiment, it is assumed that the AIT of the version 1 shown in FIG. 47, the AIT of the version 2 shown in FIG. 48 and the AIT of the version 3 shown in FIG. 49 are multiplexed into the MPEG-2 transport stream. Each element in these diagrams has the same meaning as described in the tenth embodiment.

Assuming here that the AIT of the version 1 was detected, Yes is chosen and the process goes to S3701. No Java program is now being executed, and no trick play is specified. Therefore, the reproduction speed is 1.0, and the AIT allowing unit 3501 allows the update of the AIT. In response to this, the AIT monitoring unit 3502 starts analyzing the AIT. In other words, Yes is chosen, so that the process goes to S3004.

In S3004, Java program identifiers 301 and 302 are found as Java programs specified with control information of "autostart" in AIT. Therefore, regarding these Java programs, the process goes to S3005, where the Java programs are executed. After that, the process returns to S3003.

Here, in the case where the AIT newly updated in S3003 is not detected, the process goes to S3211. It is assumed here that the Java program with the Java program identifier 302 has its own termination processing handler h. It is assumed that in that termination processing handler, setRate (1.0) is written as Java language code for returning trick play to a standard speed. Then, the Java program with the Java program identifier 302 calls registerHandler (h) so as to register the handler h in the termination processing handler registration unit. Note that it is assumed that the Java program with the Java program identifier 302 has a privilege of registering a termination processing handler. Then, the process goes to S3006. Meanwhile, since the Java program with the Java program identifier 301 does not have a termination processing handler, it goes to S3006 without registering the termination processing handler.

It is assumed that the Java program with the Java program identifier 302 specified factor=2.0 and called setrate ( ), that is, instructed trick play in S3006. Then, the process goes to S3007. Meanwhile, the Java program with the Java program identifier 301 goes to S3007 without instructing trick play. In S3007, the JMF 1704a controls the secondary storage unit 1307 to set the speed for reading the MPEG-2 transport stream at the double speed of the normal one. At the same time, the JMF 1704a notifies the trick play instructing program information holding unit 2703 of the Java program identifier 302 of the Java program which called setRate ( ), for storing it. After that, the process returns to S3003 again.

At this point of time, the service is in the trick play mode at the double speed of the normal one.

Here, assuming that the updated AIT of the version 2 was detected in S3003, the process goes to S3701. The AIT monitoring unit 3502 inquires of the AIT allowing unit 3501 whether or not to allow the update of the AIT. As the current reproduction speed is 2.0 and the trick play control flags corresponding to the Java program identifiers 301 and 302 are "false" and "true" respectively, the update of the AIT is allowed only for the Java program of the Java program identifier 302. The control information of "kill" is written in the updated AIT for the Java program with the Java program identifier 302. Therefore, regarding this Java program with the Java program identifier 302, the process goes to S3008, where the AM 1704b terminates this Java program. The AM 1704b notifies the trick play instructing program determination unit 2702 of the Java program identifier of the Java program which has been terminated, and the process goes to S3009.

In S3009, the trick play instructing program determination unit 2702 determines whether or not the Java program which has been terminated by the AM 1704b has a Java program identifier identical to that stored in the trick play instructing program information holding unit 2703. In this case, since both identifiers are 302 and identical, the process goes to S3010, where the trick play instructing program termination processing unit 2701 invokes the termination processing handler h of the Java program identifier 302 registered in the termination processing handler registration unit 3102. More specifically, it calls the Java language code of setRate (1.0) written in the termination processing handler h. By doing so, the reproduction of the service, which has been in the trick play mode, returns to the normal reproduction speed. After that, the control returns to S3003 again.

Here, assuming that the updated AIT of the version 3 was detected in S3003, the process goes to S3601. The AIT monitoring unit 3502 inquires of the AIT allowing unit 3501 whether or not to allow the update of the AIT, but the current reproduction speed is 1.0 and therefore the update of the AIT is allowed. In response to this, the AIT monitoring unit 3502 starts analyzing the AIT which was detected this time. In other words, Yes is chosen, so that the process goes to S3004.

In the updated AIT of the version 3, "kill" is specified for the Java program with the Java program identifier 301 executed in S3005. Therefore, the AM 1704b terminates the Java program with the Java program identifier 302.

As described above, according to the eleventh embodiment, the analysis of the AIT is executed only in the case where the reproduction speed is 1.0, or in the case where the reproduction speed is a value other than 1.0 and the value of the trick play control flag is "true". In addition, it is possible to execute a separately registered termination processing handler when a Java program is terminated after the Java program instructs trick play of a service, so as to execute arbitrary Java language code.

Twelfth Embodiment

Hereafter, an apparatus and a method according to the twelfth embodiment of the present invention are described with reference to the drawings.

The twelfth embodiment provides another hardware configuration for implementing the above-described first to eleventh embodiments. The hardware configuration and the like used in the twelfth embodiment are shown in FIG. 24 and FIG. 25.

Figure 24:
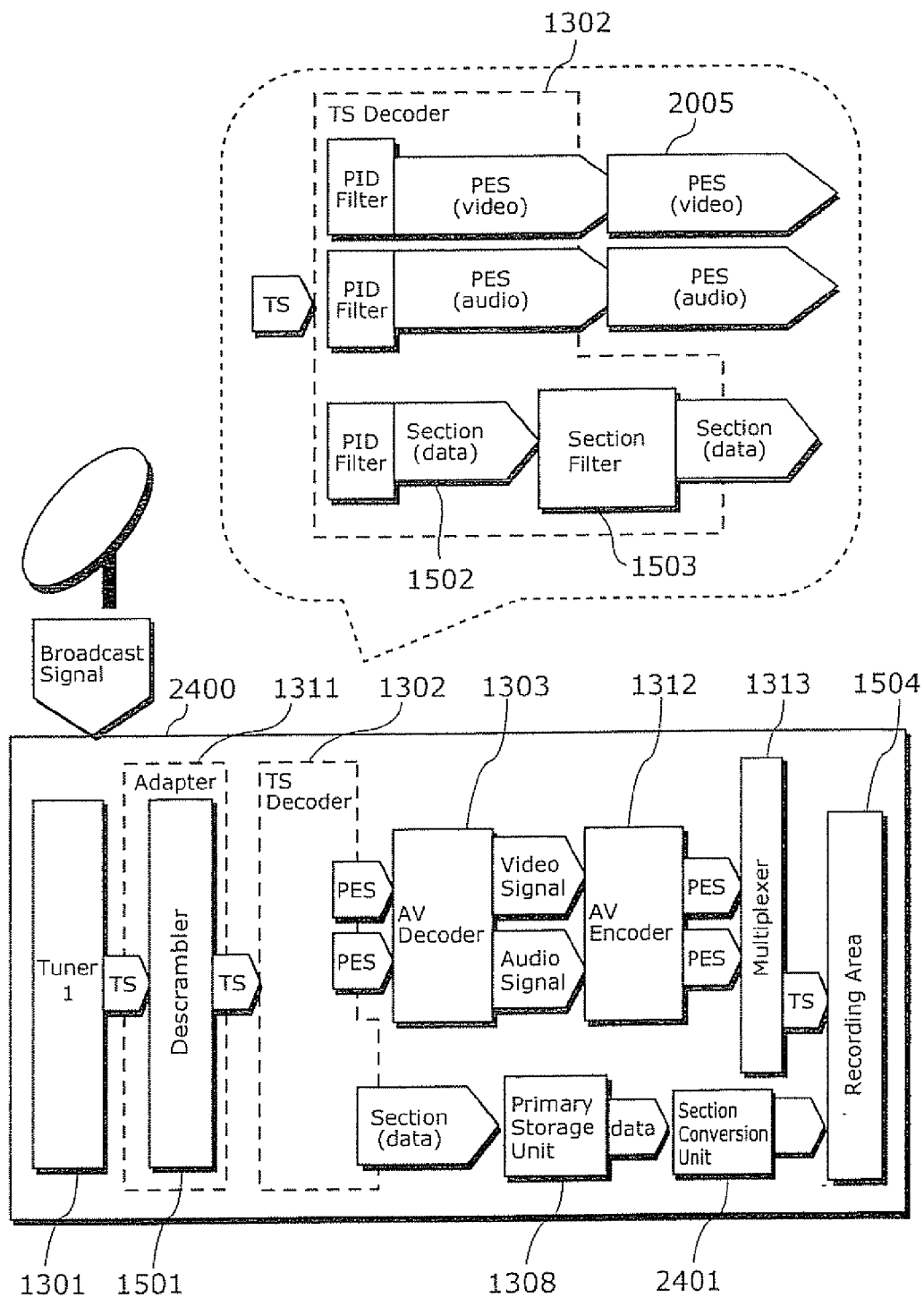
FIG. 24 is an example of a device connection at the time of recording, in the recording and reproduction apparatus according to the present invention.
Figure 25:
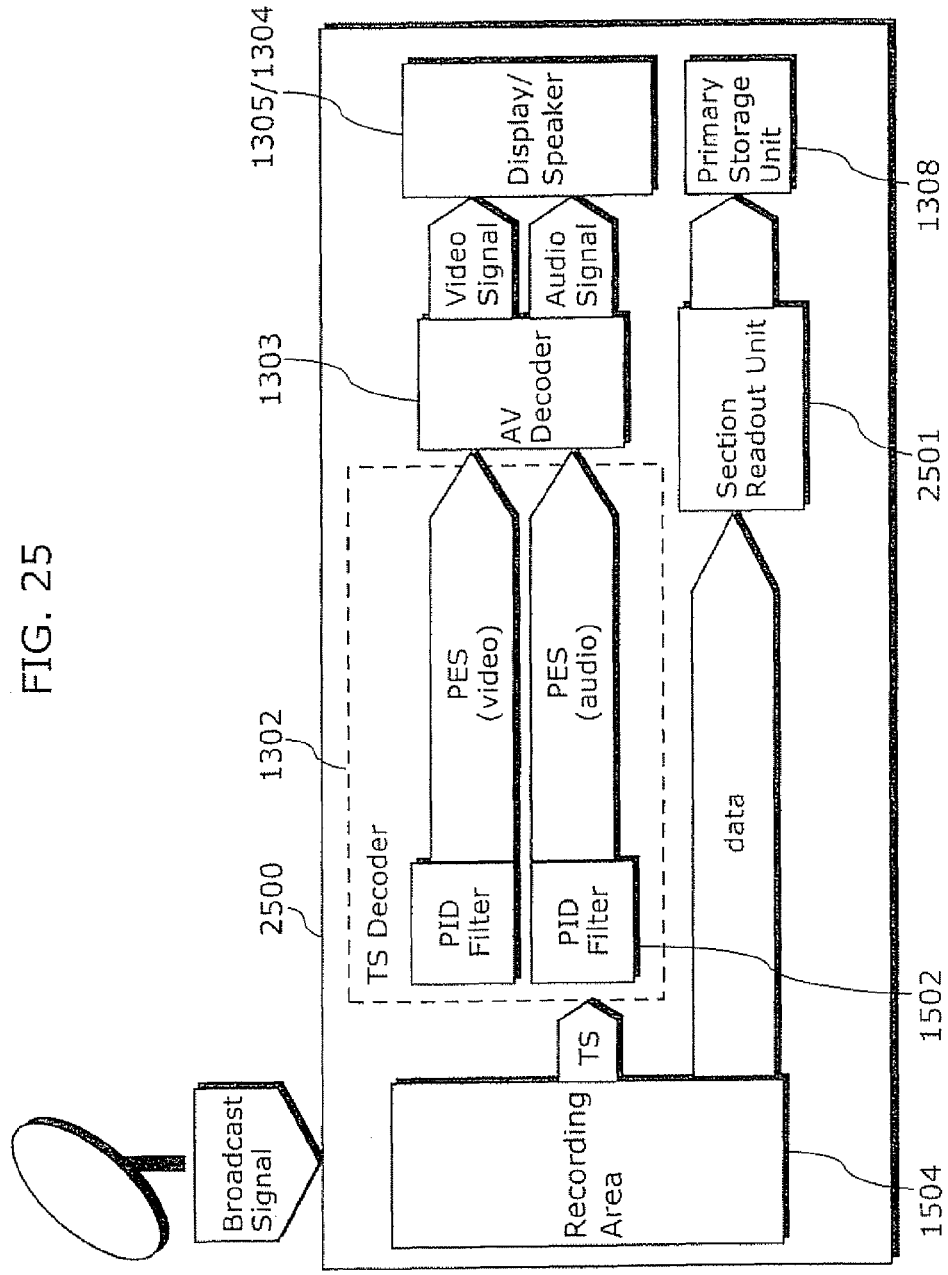
FIG. 25 is an example of a device connection at the time of reproduction, in the recording and reproduction apparatus according to the present invention.

FIG. 24 shows a conceptual diagram which represents the physical connection sequence, processing details, and input/output data format of each device during recording of the service. Constituent elements in the diagram that have identical numbers to the constituent elements shown in FIG. 15 have already been described in the first embodiment, and therefore descriptions are not repeated. As opposed to FIG. 15, with the hardware configuration shown in FIG. 24, after passing through the primary storage unit 1308, the section filtered by the TS decoder 1302 passes through the section conversion unit 2801 and is recorded into the recording area 1504 without going through the multiplexer. Here, a recording method when recording the section into the recording area 1504 differs depending on a format of the section.

In the case of a file system recorded within an MPEG-2 transport stream in a DSM-CC file system format, the section conversion unit 2801 converts this file system into a file system format unique to the recording area 1504, which is in turn unique to the terminal, and records the file system into the recording area 1504.

Figure 26:
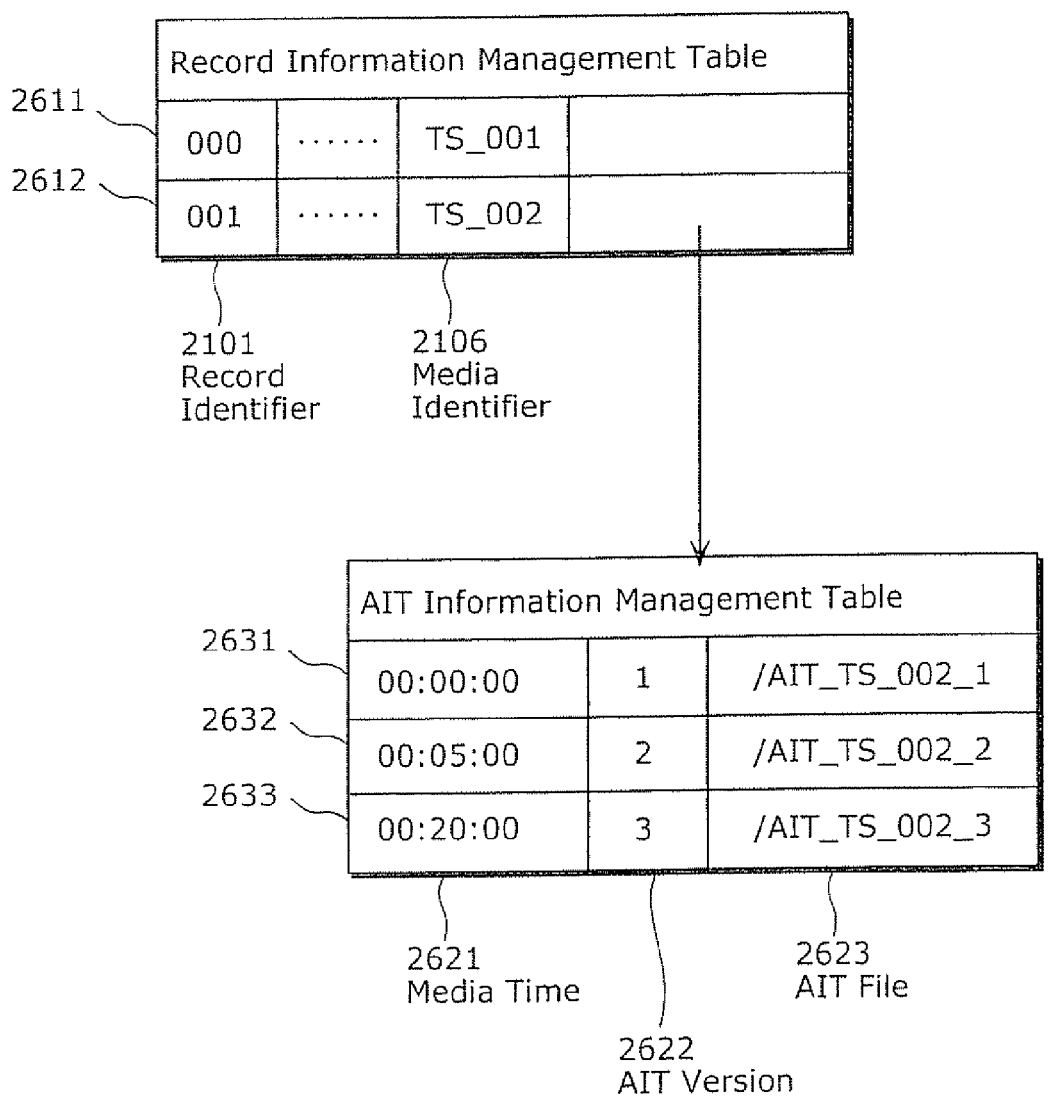
FIG. 26 is an example of a record information management table according to the present invention.

In addition, in the case of an AIT, the section conversion unit 2801 converts the AIT to an expanded record information management table format as shown in FIG. 26, and records the AIT into the recording area 1504. The record information management table shown in FIG. 26 is an expanded version of the record information management table shown in FIG. 21, and as the items identified by the same reference numbers in both tables have the same meaning as those in the record information management table shown in FIG. 21, descriptions are omitted.

Each of rows 2611 and 2612 shows record information for one service. Each of the rows 2611 and 2612 has a record identifier 2101, a channel identifier 2102, a program number 2103, a service record start time 2104, a service record end time 2105, a media identifier 2106, and a reference to an AIT information management table. The AIT information management table has a media time 2621 and an AIT version 2622 corresponding thereto. The media time 2621 is a time that is a time of reproduction of the corresponding MPEG-2 transport stream, and shows a position in the corresponding MPEG-2 transport stream.

An AIT version number 2622 corresponds to an AIT version 2200 in FIG. 22. For example, record information of a service that has a record identifier 2101 of "001" has a media identifier 2106 of "TS_002", and at the media time 2621 of "00:00:00" in the referred AIT information management table, the corresponding AIT version 2622 is "1". In the same manner, the AIT version 2622 corresponding to the media time 2621 of "00:05:00" is "2", and the AIT version 2622 corresponding to the media time 2621 of "00:20:00" is "3". At the time of reproduction of the service that has a channel identifier 2601 of "001", referring to the record information management table, the MPEG-2 transport stream that is multiplexed with the video and audio identified by the media identifier 2602 of "TS_002" is reproduced; in addition, referring to the AIT information management table, when the media time 2621 reaches "00:00:00", control for starting up or terminating the Java program is performed in accordance with the AIT with an AIT version 2622 of "1".

In a similar manner, the control for starting up or terminating the Java program is performed, in accordance with the AIT with an AIT version 2622 of "2" when the media time 2621 reaches "00:05:00", and in accordance with the AIT with an AIT version number 2622 of "3" when the media time 2621 reaches "00:20:00", respectively. The actual AIT is converted, as a binary file in private section format, into the file system format unique to the recording area 1504, which is in turn unique to the terminal, and is recorded into the recording area 1504. The recorded file is given a unique file name by which it can be uniquely identified, and which is recorded in the record information management table as an AIT file name 2623.

In an actual broadcast wave, AITs with the same AIT version are repeatedly transmitted any number of times, but in the present embodiment, by detecting a change in the received AIT version, only the first AIT that is updated at that point in time is recorded into the recording area 1504.

FIG. 25 shows a conceptual diagram which represents the physical connection sequence, processing details, and input/output data format of each device during recording of the service. Constituent elements in the diagram that have identical numbers to the constituent elements shown in FIG. 16 have already been described in the first embodiment, and therefore descriptions are not repeated.

The hardware configuration of FIG. 25 differs from that in FIG. 16 in that the section recorded into the recording area 1504 is read into the primary storage through the section readout unit 2901 without going through the TS decoder. The section readout unit 2901 searches for the media time that corresponds to the present reproduction time of the MPEG-2 transport stream read out from the recording area, and reads out, from a file, the AIT and DSM-CC file system corresponding to that media time, and passes these to the AIT monitoring unit 3502. In other words, the AIT monitoring unit 3502 shown in FIG. 46 and the like does not refer to a filtering result of the TS decoder, but rather obtains an AIT binary file and a DSM-CC file system from the section readout unit 2901.

Here, the case where the service corresponding to the channel identifier of "001" is reproduced from the recording area 1504 based on the AIT shown in FIG. 22 and the record information management table shown in FIG. 26 is shown as an example.

When the service corresponding to the channel identifier of "001" is identified as a service to be reproduced, video and audio belonging to the service as well as a Java program belonging to the service are respectively reproduced and started up.

In the case where the media time at which reproduction starts is not specified, reproduction starts at the media time 2621 of "00:00:00". To be more specific, as video and audio, an MPEG-2 transport stream having a media identifier 2102 of "TS_002" corresponding to a record identifier 2101 of "001" is reproduced from the media time 2621 of "00:00:00". Referring to the ATI information management table, the AIT version 2622 corresponding to the media time 2621 of "00:00:00" is "1", and therefore an AIT of the AIT version 2200 of "1" is read out from the AIT file. Based on the details of the AIT, a Java program corresponding to a program name 2204 of the control information 2202 of "autostart" is started up.

Next, reproduction of the service is continued, and when the position at which the MPEG-2 transport stream corresponding to the media identifier 3502 of "TS_002" is being reproduced reaches a media time 2621 of "00:05:00", a Java program corresponding to a program name 2204 of the control information 2202 of "autostart" is started up based on the AIT of the AIT version 2200 of "2" because the AIT version 2622 corresponding to the media time 2621 of "00:05:00" is "2" referring to the AIT information management table, and a Java program corresponding to a program name 2204 of the control information 2202 of "destroy" or "kill" is terminated. Here, referring to FIG. 22, as a program name of the control information 2202 of "destroy" is "/b/MusicXlet" and a program name of the control information 2202 of "kill" is "/z/StudyXlet", Java programs corresponding to these program names are terminated if they are being executed at the media time 2621 of "00:05:00".

Next, reproduction of the service is continued, and when the position at which the MPEG-2 transport stream corresponding to the media identifier 2106 of "TS_002" is being reproduced reaches a media time 2621 of "00:20:00", a Java program corresponding to a program name 2204 of the control information 2202 of "autostart" is started up based on the AIT of the AIT version 2200 of "3" because the AIT version 2622 corresponding to the media time 2621 of "00:20:00" is "3" referring to the AIT information management table, and a Java program corresponding to a program name 2204 of the control information 2202 of "destroy" or "kill" is terminated.

According to the twelfth embodiment as described above, it is possible to reproduce a service by combining video and audio multiplexed by a multiplexer, with a DSM-CC file system and an AIT file separately recorded in another format, according to the first to eleventh embodiments. Accordingly, a DSM-CC file system and an AIT, which have been transmitted repeatedly in broadcast, need to be recorded only once when they are updated, and therefore it is possible to reduce consumption of storage capacity of a recording area.

Some of the embodiments described above indicate the implementation examples of the present invention, but other embodiments can be implemented as long as the objects of the present invention are achieved.

In the embodiments, a configuration for a cable system has been shown, but the present invention can be applied independent of the type of a broadcast system. For example, the present invention can easily be applied to a satellite system, a ground wave system, or a TV show distribution system that uses an IP network. In addition, as the present invention has no direct relationship with the differences between respective broadcast systems, the present invention can be applied to an arbitrary transmission medium regardless of the broadcast system. The present invention is also applicable regardless of whether the system is a wired or wireless system.

It is not necessary for the AV decoder to decode video and audio at the same time. The present invention can be implemented even if the AV decoder is configured as separate video and audio decoders. In addition, the AV decoder may have a decoding function for data such as closed captioning and the like without any interference. The audio signal and video signal decoded by the AV decoder may be scrambled at any stage up until being stored in the recording area 1504.

In the embodiments, an example is given in which an adapter that controls conditional access system has been introduced, but the adapter is not always necessary for the implementation of the present invention. The adapter may be of any format, and a configuration without the adapter is also possible. In such a case, in FIG. 15, the MPEG-2 transport stream from the tuner is inputted directly into the TS decoder.

The present invention is applicable in such a case as well. In addition, descrambling the MPEG-2 transport stream by the adapter does not necessarily have to be carried out before the TS decoder. A configuration in which the adapter is in an arbitrary position and is used to descramble the MPEG-2 transport stream is easily implementable, and the present invention is applicable in such a case as well.

Regarding an encoding format into which the AV encoder encodes the audio and video signal, an arbitrary format is acceptable. The present invention is applicable regardless of the encoding format.

A multiplexing format of the multiplexer may also be an arbitrary format. The present invention is applicable regardless of the multiplexing format.

The display and the speaker may be contained within the broadcast recording and reproduction apparatus, or an external display and speaker may be connected to the broadcast recording and reproduction apparatus. The present invention is applicable regardless of the location and number of the display and speaker.

The present invention can be implemented even if the CPU itself is a system which performs multiple processes, the processes being all or some of TS decoding, AV decoding, AV encoding, and multiplexing.

As a format for recording the service, the MPEG-2 transport stream can also be recorded directly into the recording area after being outputted from the tuner, without going through the TS decoder; or, the format of the MPEG-2 transport stream from the tuner can be converted, by installing a translator that converts the format of the MPEG-2 transport stream, and recorded into the recording area. The present invention can be implemented regardless of the service recording method.

Some of the Java virtual machines translate the bytecode into an executable form which can be interpreted by the CPU and pass the resultant to the CPU, which executes it; the present invention is applicable in such a case as well.

The above embodiments describe a method for implementation regarding the AIT in which the transport stream is obtained from In-band; however, the method for referring to the Java program which the AM shall execute does not solely depend on the AIT. In OCAP, which is assumed to be used by the United States cable system, an XAIT, which has registered reference information of an application program in the OOB denoted in FIG. 3, is used. In addition, methods such as starting a program pre-recorded in the ROM, starting a program downloaded and recorded in the secondary storage unit, and so on can be considered.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

According to the recording and reproduction apparatus and the recording and reproduction method according to the present invention, it is possible to hold a program that instructed trick play of video and audio, to determine whether or not a program is identical to the program that instructed the trick play, when the program is terminated, and if it is identical to the program that instructed the trick play, to cancel the trick play of the video and audio, so as to cancel redundant trick play in a time interval unexpected by the program.

Therefore, it is highly possible that the present invention is used in the consumer electronics industry, particularly involving broadcast recording and reproduction apparatuses. For example, the present invention is applicable to a cable STB, digital TV, and the like. Furthermore, the present invention is also applicable in devices with a broadcast receiving function, such as, for example, a cellular phone device and the like.

What is claimed is:

1. A content reproduction apparatus, comprising:
   an AV data reproducer operable to reproduce AV data included in a recorded content;
   a program executor operable to start and terminate an application program included in the recorded content, based on synchronization information included in the recorded content;
   an AV data reproduction speed changer operable to change a reproduction speed of the AV data included in the recorded content based on an instruction from the application program;
   and
   a trick play instructing program termination processor operable to change, to a normal reproduction speed, the reproduction speed of the AV data being reproduced at a speed different from the normal reproduction speed, when said program executor terminates the application program based on the synchronization information included in the recorded content while the reproduction speed of the AV data reproduced by said AV data reproducer is different from the normal reproduction speed, the application program having instructed said AV data reproduction speed changer to change the reproduction speed of the AV data to the speed different from the normal reproduction speed.

2. The content reproduction apparatus according to claim 1, further comprising:
   a program receiver operable to receive the application program,
   wherein the application program received by said program receiver is executed by said program executor.

3. The content reproduction apparatus according to claim 1,
   wherein the synchronization information includes a trick play compliant flag that indicates whether the application program should be forced to terminate, and
   said program executor is operable to start and terminate the application program based on the trick play compliant flag in the synchronization information included in the content.

4. The content reproduction apparatus according to claim 1,
   wherein said program executor is operable to force the application program to terminate when an abnormality occurs during the execution of the application program.

5. The content reproduction apparatus according to claim 1,
   wherein said program executor is operable to refer to the synchronization information included in the content, only when the reproduction speed of the content is slow.

6. The content reproduction apparatus according to claim 1,
   wherein said program executor is operable to refer to the synchronization information included in the content, only when the reproduction speed of the content is one of equal to and less than the normal reproduction speed.

* * * * *

UNITED STATES PATENT AND TRADEMARK OFFICE
CERTIFICATE OF CORRECTION

| | | |
|---|---|---|
| PATENT NO. | : 7,962,001 B2 | Page 1 of 1 |
| APPLICATION NO. | : 11/383816 | |
| DATED | : June 14, 2011 | |
| INVENTOR(S) | : S. Hashimoto et al. | |

It is certified that error appears in the above-identified patent and that said Letters Patent is hereby corrected as shown below:

At column 56, lines 24-25, please delete ", only" after "content".

Signed and Sealed this
Eighteenth Day of October, 2011

David J. Kappos
*Director of the United States Patent and Trademark Office*